US009197600B2

(12) United States Patent
L'Heureux et al.

(10) Patent No.: US 9,197,600 B2
(45) Date of Patent: Nov. 24, 2015

(54) SMART ROUTER

(71) Applicants: Israel L'Heureux, Monaco (MC); Mark Alleman, Portland, OR (US)

(72) Inventors: Israel L'Heureux, Monaco (MC); Mark Alleman, Portland, OR (US)

(*) Notice: Subject to any disclaimer, the term of this patent is extended or adjusted under 35 U.S.C. 154(b) by 388 days.

(21) Appl. No.: 13/631,184

(22) Filed: Sep. 28, 2012

(65) Prior Publication Data
US 2014/0259147 A1 Sep. 11, 2014

Related U.S. Application Data

(63) Continuation-in-part of application No. 13/309,505, filed on Dec. 1, 2011, and a continuation-in-part of application No. 13/367,556, filed on Feb. 7, 2012.

(60) Provisional application No. 61/540,895, filed on Sep. 29, 2011.

(51) Int. Cl.
G06F 9/00 (2006.01)
H04L 29/06 (2006.01)
H04L 29/08 (2006.01)

(52) U.S. Cl.
CPC ............ H04L 63/02 (2013.01); H04L 63/0281 (2013.01); H04L 67/14 (2013.01)

(58) Field of Classification Search
USPC ................................. 726/11, 12, 13
See application file for complete search history.

(56) References Cited

U.S. PATENT DOCUMENTS 6,374,300 B2 * 4/2002 Masters ........................ 709/229
6,725,281 B1 4/2004 Zintel et al.
6,810,412 B1 * 10/2004 Chang ........................... 709/203
8,347,384 B1 * 1/2013 Preston ............................ 726/23
8,473,967 B2 6/2013 Weiser et al.
2002/0161884 A1 * 10/2002 Munger et al. ................ 709/224
2006/0291481 A1 12/2006 Kumar
2007/0094490 A1 4/2007 Lohr
2007/0097976 A1 * 5/2007 Wood et al. .................... 370/392
2008/0165964 A1 * 7/2008 Lewis et al. .................... 380/255
2008/0281606 A1 * 11/2008 Kitts et al. ......................... 705/1
2010/0162399 A1 * 6/2010 Sheleheda et al. .............. 726/24
2011/0161293 A1 6/2011 Vermeulen et al.

(Continued)

OTHER PUBLICATIONS

Israel L'Heureux, et al., Applicants' Response to Office Action for pending U.S. Appl. No. 13/309,505, Jul. 10, 2014, USPTO, United States.

(Continued)

Primary Examiner — Christopher Brown
(74) Attorney, Agent, or Firm — Michael J. Andri

(57) ABSTRACT

An example router device disclosed herein functions as a transport level proxy and application level proxy, is able to host both authenticated user and device sessions with stored session state and access control to resources for enhanced performance and ease of use. The device is able to function as a protocol proxy for improved performance and security. The device may be configured to implement a captive portal login mechanism, and may programmatically force unsecure LAN-side client requests to secure WAN-side connections. The device may execute an API for remote applications to utilize. The router device may pre-fetch content for client devices, and may communicate with other servers and peer routers to ascertain congestion on the WAN, and perform intelligent routing of WAN traffic based on the detected congestion. The device may also employ techniques to enhance privacy, virtualized address spaces, cookie filters, and traffic modification.

18 Claims, 40 Drawing Sheets

(56) References Cited

U.S. PATENT DOCUMENTS

| | | | |
|---|---|---|---|
| 2011/0271289 A1 | 11/2011 | Weiser et al. | |
| 2012/0192258 A1 | 7/2012 | Spencer et al. | |
| 2013/0005488 A1 | 1/2013 | Evans et al. | |
| 2013/0046893 A1 | 2/2013 | Hauser et al. | |
| 2013/0275228 A1* | 10/2013 | Milazzo | 705/14.66 |
| 2014/0025753 A1* | 1/2014 | Gronowski et al. | 709/206 |

OTHER PUBLICATIONS

USPTO, Interview Request and Summary for pending U.S. Appl. No. 13/309,505, Aug. 28, 2014, USPTO, United States.

USPTO, Office Action and Search Information for pending U.S. Appl. No. 13/367,556, Jul. 16, 2014, USPTO, United States.

Israel L'Heureux and Mark D. Alleman, Response to USPTO Office Action for pending U.S. Appl. No. 13/367,556, response filed at USPTO on Mar. 24, 2014, unpublished.

USPTO—Examiner Search Information for pending U.S. Appl. No. 13/431,095, Feb. 28, 2013, unpublished.

USPTO—USPTO Office Action for pending U.S. Appl. No. 13/431,095, notification date Feb. 28, 2013, unpublished.

Israel L'Heureux and Mark D. Alleman, Response to USPTO Office Action for pending U.S. Appl. No. 13/431,095, response filed at USPTO on Aug. 26, 2013, unpublished.

Israel L'Heureux and Mark D. Alleman, "Access Control Interfaces for Enhanced Wireless Router", Specification for pending U.S. Appl. No. 13/431,095, filed at USPTO Mar. 27, 2012, unpublished.

Israel L'Heureux and Mark D. Alleman, "Access Control Interfaces for Enhanced Wireless Router", Drawings for pending U.S. Appl. No. 13/431,095, filed at USPTO Mar. 27, 2012, unpublished.

USPTO—Examiner Search Information for pending U.S. Appl. No. 13/309,505, Jun. 24, 2013, unpublished.

USPTO—USPTO Office Action for pending U.S. Appl. No. 13/309,505, notification date Jun. 24, 2013, unpublished.

Israel L'Heureux and Mark D. Alleman, Response to USPTO Office Action for pending U.S. Appl. No. 13/309,505, response filed at USPTO on Sep. 4, 2013, unpublished.

Israel L'Heureux and Mark D. Alleman, "Gateway Router Supporting Session Hand-Off and Content Sharing Among Clients of a Local Area Network", Specification for pending U.S. Appl. No. 13/309,505, filed at USPTO Dec. 1, 2011, unpublished.

Israel L'Heureux and Mark D. Alleman, "Gateway Router Supporting Session Hand-Off and Content Sharing Among Clients of a Local Area Network", Drawings for pending U.S. Appl. No. 13/309,505, filed at USPTO Dec. 1, 2011, unpublished.

Israel L'Heureux and Mark D. Alleman, Response to USPTO Office Action for pending U.S. Appl. No. 13/431,095, response filed at USPTO on Nov. 26, 2013, unpublished.

USPTO—USPTO Notice of Allowance, Examiner's Search, and Search Information for pending U.S. Appl. No. 13/431,095, notification date Dec. 6, 2013, unpublished.

USPTO—USPTO Final Office Action, List of References, Examiner's Search, and Search Information for pending U.S. Appl. No. 13/309,505, notification date Jan. 10, 2014, unpublished.

USPTO—Search Information for pending U.S. Appl. No. 13/367,556, Oct. 23, 2013, unpublished.

USPTO—USPTO Office Action for pending U.S. Appl. No. 13/367,556, notification date Oct. 23, 2013, unpublished.

USPTO—Examiner Search Strategy for pending U.S. Appl. No. 13/367,556, Oct. 23, 2013, unpublished.

Israel L'Heureux and Mark D. Alleman, "Application Programming Interface for Enhanced Wireless Local Area Network Router", Specification for pending U.S. Appl. No. 13/367,556, filed at USPTO Feb. 7, 2012, unpublished.

Israel L'Heureux and Mark D. Alleman, "Application Programming Interface for Enhanced Wireless Local Area Network Router", Drawings for pending U.S. Appl. No. 13/367,556, filed at USPTO Feb. 7, 2012, unpublished.

United States Patent and Trademark Office, Office Action for U.S. Appl. No. 13/309,505, Office Communication, Feb. 4, 2015, 16 pages, United States.

United States Patent and Trademark Office, Search Information for U.S. Appl. No. 13/309,505, Office Communication, Feb. 4, 2015, 2 pages, United States.

United States Patent and Trademark Office, Examiner's Search Strategy and Results for U.S. Appl. No. 13/309,505, Office Communication, Feb. 4, 2015, 7 pages, United States.

United States Patent and Trademark Office, Office Action for U.S. Appl. No. 13/367,556, Office Communication, Apr. 13, 2015, 13 pages, United States.

United States Patent and Trademark Office, Search Information for U.S. Appl. No. 13/367,556, Office Communication, Apr. 13, 2015, 2 pages, United States.

United States Patent and Trademark Office, Examiner's Search Strategy and Results for U.S. Appl. No. 13/367,556, Office Communication, Apr. 13, 2015, 7 pages, United States.

Israel L'Heureux et al., Applicants' Response to Office Action for U.S. Appl. No. 13/309,505, Aug. 28, 2015, 18 pages.

Israel L'Heureux et al., Applicants' Response to Office Action for U.S. Appl. No. 13/367,556, Sep. 14, 2015, 31 pages.

* cited by examiner

FIG. 5: SPDY on TCP to HTTP(S) on TCP

FIG. 6: Changing L4 and L7: SPDY+ on UDP to HTTP(S) on TCP

FIG 7: HTTP on TCP+ to HTTP(S) on TCP

Historical Table

Device 1:
Mac Address: 60:33:4b:ff:fe:8e:fc:be
Reported link speed: 55 Mbit/sec
Packet loss last 15 seconds: 6%
Packet loss last 5 minutes: 1%
Packet loss last hour: 0.5%
Packet loss last week: 0.2%
Current limit: 90% of link Device 2:
Mac Address: c4:2c:03:28:63:60
Reported link speed: 1000baseTX
Packet loss last 15 seconds: 0%
Packet loss last 5 minutes: 0%
Packet loss last hour: 0.0%
Packet loss last week: 0.1%
Current limit: 99% of link Device 3:
Mac Address: 00:1c:42:00:00:08
Reported link speed: 12Mbit/sec
Packet loss last 15 seconds: 4%
Packet loss last 5 minutes: 17%
Packet loss last hour: 2%
Packet loss last week: 1%
Current limit: 72% of link

FIG. 9

Historical Table

Device 1:

Packet Loss:
last 15 seconds: 6%
last 5 minutes: 1%
last hour: 0.5%
last week: 0.2%
recommendation: 90% of link speed Hops:
last 15 seconds: 2
last 5 minutes: 2
last hour: 2
last week: 2
recommendation: 95% of link speed RTT
last 15 seconds: 120ms
last 5 minutes: 60ms
last hour: 75ms
last week: 75ms
recommendation: 92% of link speed Limit: 82% of link speed

FIG. 10

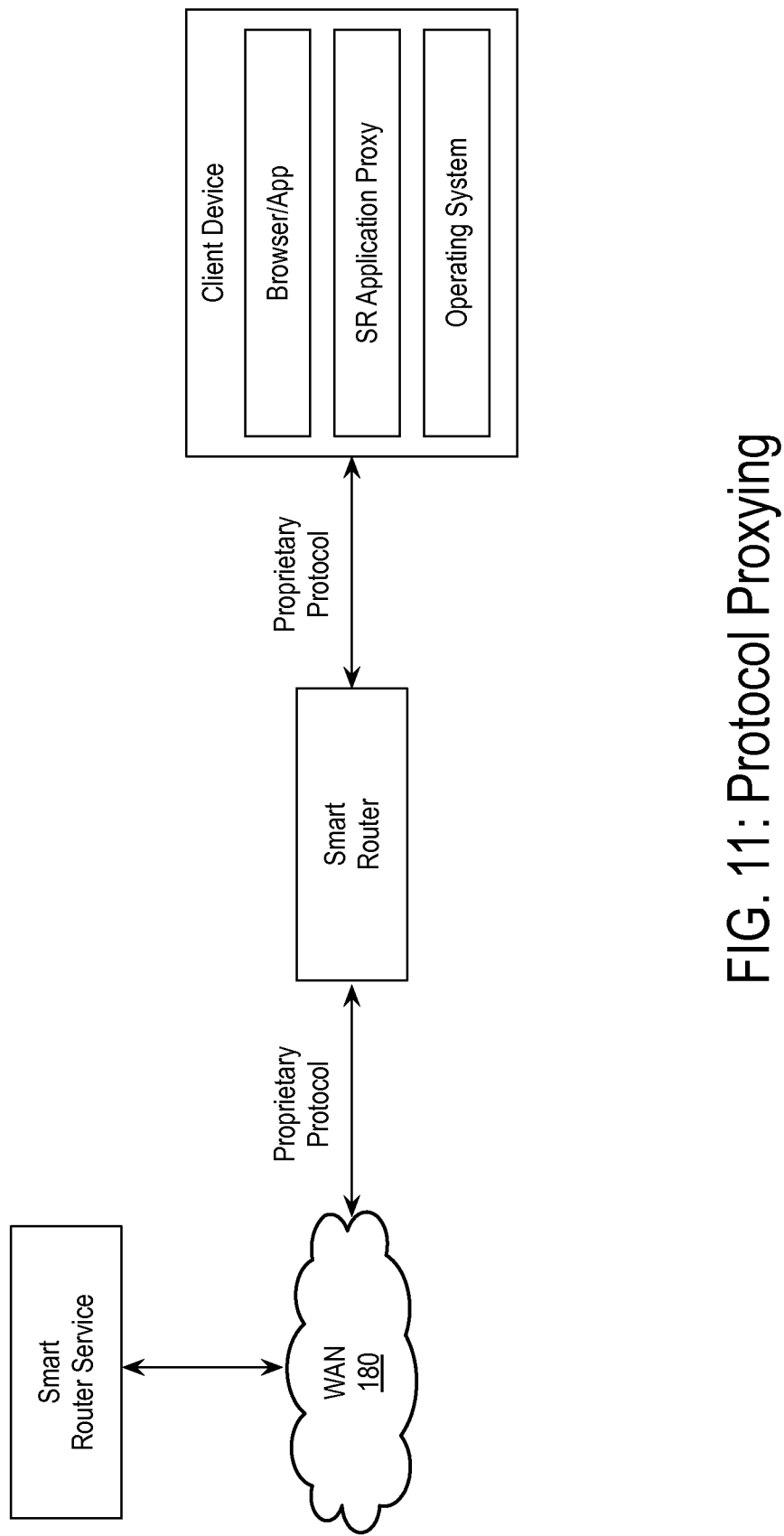
FIG. 11: Protocol Proxying

FIG. 13: Determine if destination supports secure protocols

FIG. 14: Upgrade to Secure Protocol

FIG. 16: Secure Communication – Device & AAA Authorization

FIG. 20: Captive Portal Page for Router Login

FIG. 21: Newly Registered User Accesses New or Existing User Internet Session

FIG. 22: User Login and Session Selection

Historical Table

Device 1:
Name: Mike's iMac Black

Device Fingerprinting
Sequence Number Analysis: OK
TCP Timestamp skew: OK
Recommendation: legit client

FIG. 26

GUESTS                                    CACHED BYTES
--------                                  -------------
CURRENT GUESTS: 4                         DATA CHUNKS: 22,302,293
GUEST BW: 7.5Mbit/sec                     OBJECTS: 4,393
COMPETING GUEST BW Overlap: 4%            TOTAL BYTES: 1.2TB

NETWORK
-------

| DETAIL of DEFAULT PATH to www.DELL.COM | Loss% | Pkts | Last | RTTAv | StDev | Gmean | Jttr | Javg | JLast | WARN | PEERS | PWARN |
|---|---|---|---|---|---|---|---|---|---|---|---|---|
| 1. 192.168.1.254 | 0.0% | 558 | 13.6 | 51.7 | 26.5 | 42.3 | 82.4 | 11.7 | 13.6 | | 0 | |
| 2. 1.88.209.88.dynamic.monaco.mc | 0.0% | 558 | 28.5 | 29.7 | 2.1 | 29.7 | 1.5 | 1.6 | 28.5 | | 0 | |
| 3. 1.2.113.82.monaco-telecom.net | 0.0% | 558 | 28.8 | 31.3 | 12.6 | 30.5 | 0.3 | 4.2 | 28.8 | | 1 | |
| 4. ae3-16-xcr1.prp.cw.net | 0.0% | 558 | 50.5 | 47.5 | 7.1 | 47.2 | 0.4 | 2.5 | 50.5 | | 4 | |
| 5. xe-0-0-0-xcr1.par.cw.net | 0.0% | 558 | 47.3 | 49.5 | 9.9 | 48.9 | 0.4 | 6.2 | 47.3 | | 16 | |
| 6. cogent-gw.par.cw.net | 1.6% | 558 | 57.7 | 184.1 | 296.0 | 59.1 | 0.0 | 25.3 | 57.7 | | 22 | 17 |
| 7. te0-2-0-4.mpd21.par01.atlas.cogentco.com | 1.1% | 558 | 58.1 | 58.7 | 1.3 | 58.7 | 0.7 | 0.9 | 58.1 | Y | 415 | 280 |
| 8. te0-5-0-4.mpd21.jfk02.atlas.cogentco.com | 2.3% | 558 | 135.5 | 134.6 | 1.0 | 134.6 | 0.4 | 0.9 | 135.5 | Y | 400 | |
| 9. te0-1-0-4.mpd21.dca01.atlas.cogentco.com | 1.8% | 558 | 136.4 | 137.2 | 1.0 | 137.2 | 0.3 | 1.2 | 136.4 | | 285 | |
| 10. te0-2-0-6.mpd21.atl01.atlas.cogentco.com | 1.8% | 558 | 162.9 | 164.4 | 2.4 | 164.4 | 0.4 | 1.5 | 162.9 | | 350 | |
| 11. te0-0-0-1.mpd21.iah01.atlas.cogentco.com | 1.8% | 558 | 163.5 | 164.2 | 2.4 | 164.2 | 3.3 | 1.6 | 163.5 | | 220 | |
| 12. te4-3.ccr01.aus02.atlas.cogentco.com | 2.2% | 558 | 166.1 | 181.1 | 41.7 | 177.9 | 0.4 | 9.1 | 166.1 | | 350 | |
| 13. b1astro.demarc.cogentco.com | 1.4% | 557 | 170.3 | 179.5 | 40.9 | 176.8 | 1.7 | 17.5 | 170.3 | | 300 | |
| 14. 10.180.73.10 | 1.3% | 557 | 170.7 | 174.4 | 23.0 | 173.3 | 0.4 | 7.5 | 170.7 | | 20 | |
| 15. pc1-www1.us.dell.com | 2.9% | 557 | 177.3 | 177.2 | 1.5 | 177.2 | 0.1 | 1.1 | 177.3 | | 7 | |

TCP_CONNS: 23
RTT: 177.3
EST Path BW: 14.2Mbit/sec

OPTIONAL PATH B
---------------
TOTAL HOPS: 14
PKT LOSS: 0.3%
CUR RTT: 150.2
GEOMEAN RTT: 155.1
JITTER: 0.2
WARN: 0
EST BW: 25.5Mbit/sec OPTIONAL PATH C
---------------
TOTAL HOPS: 18
PKT LOSS: 14%
CUR RTT: 275.5
GEOMEAN RTT: 200.1
JITTER: 4.2
WARN: 3
EST BW: 11.2Mbit/sec

FIG. 33

SMART ROUTER

CROSS-REFERENCE TO RELATED APPLICATIONS

The present application is a non-provisional of and claims priority to U.S. Provisional Patent Application Ser. No. 61/540,895, titled SMART ROUTER, filed Sep. 29, 2011, and is a continuation in part of and claims priority to U.S. patent application Ser. No. 13/309,505, titled GATEWAY ROUTER SUPPORTING SESSION HAND-OFF AND CONTENT SHARING AMONG CLIENTS OF A LOCAL AREA NETWORK, filed Dec. 1, 2011, and is a continuation in part of and claims priority to U.S. patent application Ser. No. 13/367,556, titled APPLICATION PROGRAMMING INTERFACE FOR ENHANCED WIRELESS LOCAL AREA NETWORK ROUTER, filed Feb. 7, 2012, the entire contents of each of which are incorporated herein by reference in their entirety for all purposes.

BACKGROUND

Wireless routers, such as those utilized in the setting of the home are one of the most important, but least innovative components in modern home networking topologies. Wireless home routers typically contain both wireless networking and Ethernet (i.e., wired) components, as well ADSL or Cable modem connections to an upstream ISP. Hence, home routers are often a jumbled mishmash of features pulled from old designs.

Home routers are often complicated to configure, and pose a number of risks and challenges to the home user in terms of security. Home routers also inexplicably disconnect, drop packets, and need frequent resetting. Feature sets on routers have been stagnant for many years and do not address the growing needs of consumers. Users are frustrated at the lack of innovation, are unwilling to spend more for little benefit.

A wireless home "smart" router is disclosed that has mass storage and processing power to implement communications optimization software that achieves better performance, privacy, ease of use, and data security.

SUMMARY

An example router device disclosed herein functions as a transport level proxy and application level proxy, is able to host both authenticated user and device sessions with stored session state and access control to resources for enhanced performance and ease of use. The device is able to function as a protocol proxy for improved performance and security. The device may be configured to implement a captive portal login mechanism, and may programmatically force unsecure LAN-side client requests to secure WAN-side connections. The device may execute an API for remote applications to utilize. The router device may pre-fetch content for client devices, and may communicate with other servers and peer routers to ascertain congestion on the WAN, and perform intelligent routing of WAN traffic based on the detected congestion. The device may also employ techniques to enhance privacy, virtualized address spaces, cookie filters, and traffic modification.

BRIEF DESCRIPTION OF THE DRAWINGS

FIG. 9 is a schematic view illustrating historical router-device communications data of the smart router, for each of a plurality of client side devices that connect to the smart router.

FIG. 10 is a schematic view illustrating historical data maintained by the smart router to implement an enhanced TCP protocol that takes into account historical packet loss, hops, and round trip time for a client device.

FIG. 11 is a schematic view illustrating the smart router configured for protocol proxying.

FIG. 19 18 shows a screen of a client device after a successful login to the smart router.

FIG. 26 is a schematic view of historical information of devices that connect to the smart router.

FIG. 33 is a table of network performance maintained by the smart router for all clients connecting to a particular web resource.

DETAILED DESCRIPTION

I. System Architecture

Figure 1:
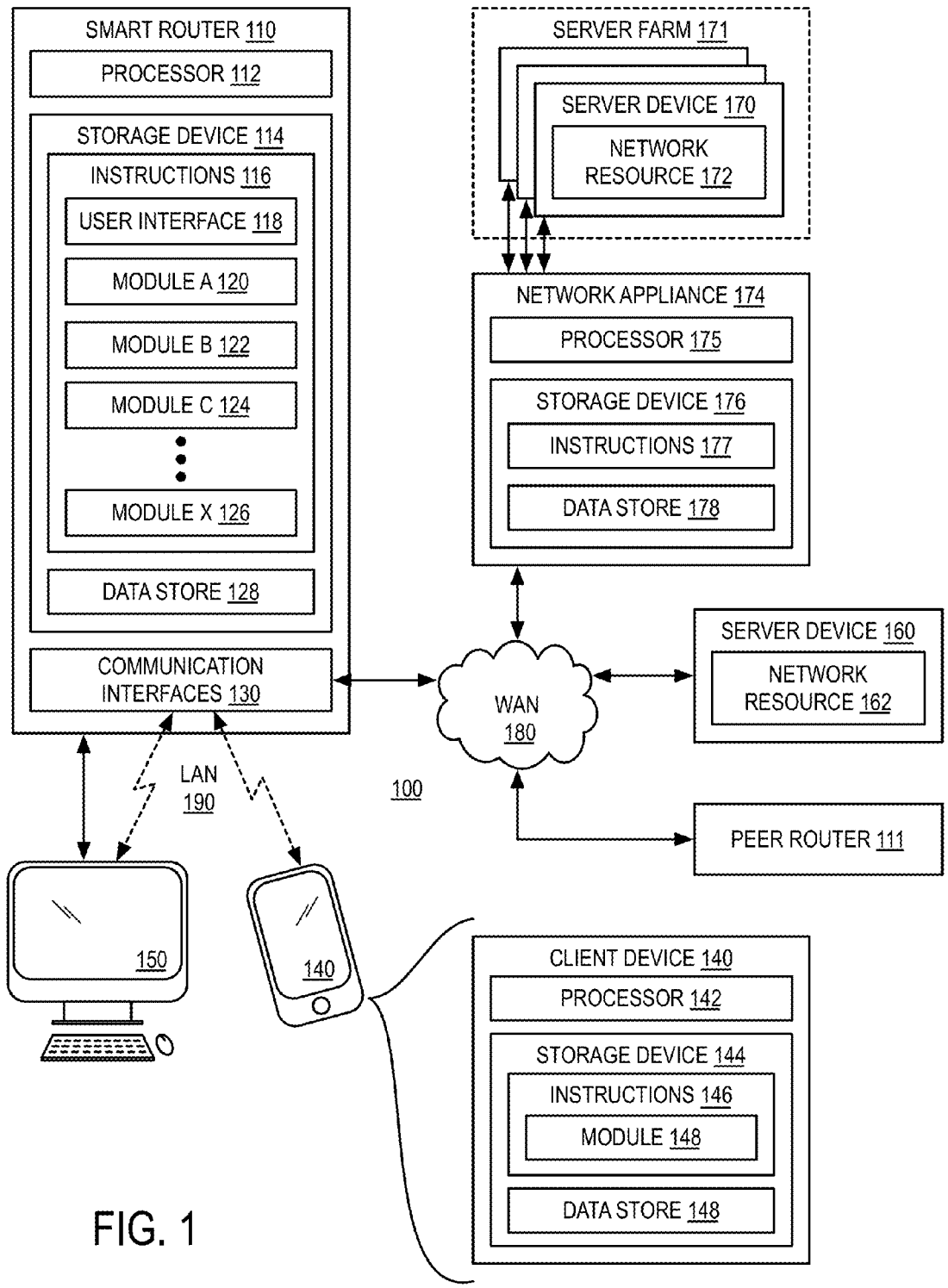
FIG. 1 is a schematic view of a computing system including a smart router through which client computing devices communicate with remote server devices and remote peer routers, according to one embodiment.

FIG. 1 is a schematic diagram depicting an example computing system 100 that includes a number of computing devices, such as smart router 110, client devices 140 (a personal computer) and 150 (an internet enabled mobile phone), and server devices 160 and 170. Smart router 110 may be positioned along a communications path between wide area network (WAN) 180, such as the Internet, and local area network (LAN) 190, such as a home network. Smart router 110 may establish communications sessions with client devices of LAN 190 and route communications between these client devices and server devices of WAN 180. For example, client devices 140 and 150 may request and receive network resources 162 or 172 from server devices 160 or 170 via smart router 110. Some client devices 140, 150 may be configured for WAN access without traversing the smart router, via a mobile broadband technology such as 3G or 4G.

WAN 180 may, for example, take the form of the Internet or a portion thereof. LAN 190 may support wired and/or wireless communications between smart router 110 and client devices 140 and 150. Wired communications within LAN 190 may include Ethernet, powerline Ethernet, or other suitable wired communications. LAN 190 may support communications through any suitable type and/or number of wireless standards such as, for example, Wi-Fi (e.g., 802.11), Wi-MAX (e.g., 802.16), LTE (e.g., 3GPP TS 36), UMTS (e.g., 3GPP TS 25), CDMA, Bluetooth, or combinations thereof.

Smart router 110 may include a processor 112 to execute instructions 116 held in non-volatile storage device 114, using portions of volatile memory. Storage device 114 may be a hard drive, flash memory, or other non-volatile storage device, etc. Instructions 116 may take the form of software or firmware, for example. Instructions 116 may form part of an operating system of smart router 110, an application program, and/or a software component such as a plug-in or other suitable instruction set.

Instructions 116 may include a number of functional modules 120, 122, 122, 126, etc. These modules may correspond to respective features of a feature set supported by smart router 110. As one example, module 120 may take the form of a connection terminator module that determines whether a connection between the LAN and the WAN is to be terminated or not terminated at smart router 110. Example features supported by smart router 110 are described in greater detail with reference to the process flow diagrams of FIGS. 12, 15, 27, 31, 32, 35, 36, 37, 38, 39, 40. Some of these features may include:

1. Smart router 110 may be configured as a Layer 7 device that can monitor, modify, and/or block information of at least the application layer of the TCP/IP Internet protocol suite.
2. Smart router 110 may configured to terminate connections between clients of LAN 190 and server devices of WAN 180 under select conditions, while refraining from terminating connections under other conditions.
3. Smart router 110 may be configured to apply encryption, decryption, protocol translation, or other suitable processing to communications between clients of LAN 190 and server devices of WAN 180.
4. Smart router 110 may be configured to monitor client sessions and store state information obtained from communications between clients of LAN 190 and WAN 180 to enable application level sessions (application sessions, browser sessions, etc.) to be handover from one client device to another client device of LAN 190.

5. Smart router 110 may be configured to retrieve and store content for the benefit of clients of LAN 190 based on past client behavior without first receiving requests for the content to thereby enable faster content retrieval.

6. Smart router 110 may be configured to re-route communications within WAN 180 for the benefit of clients of LAN 190 to enable faster communications.

7. Smart router 110 may be configured to cause client devices to display GUI elements at the command of the smart router (i.e. a router GUI), by inserting software code elements into the communications traffic stream between the browser and a remote server, which software code elements are rendered as graphical user interface elements by the browser program or application program operating at the client devices of the LAN.

8. Smart router 110 may be configured to "push" or send communications to client devices of the LAN.

9. Smart router 110 may support client device profiles and/or user profiles that may be associated with global identifiers.

10. Smart router 110 may support a number of different session types including program sessions (e.g., browser sessions, application sessions), user sessions, device sessions, etc.

11. Smart router 110 may support authentication via device and/or user credentials.

Functionality provided by smart router 110 may be supported by associated (e.g., paired) software operating at a client of the LAN (e.g., client devices 140 or 150) and/or associated software operating at a network device (e.g., server device 160 or network appliance 174) of the WAN. As one example, an operating system or application program of a client device of the LAN may operate in combination with software at smart router 110. As another example, software of a peer smart router (e.g., peer smart router 111) or network server device (e.g., server device 160) may operate in combination with software at smart router 110.

Storage device 114 of smart router 110 may include a data store 128. Information may be stored at and/or retrieved from data store 128 by processor 112. Such information may include, for example, user identifiers, device identifiers, profile information, session state information, etc. Unlike traditional caches, this device will contain short term information like session data, and permanent information like user profile, and objects like data dictionaries, or renderable content such as chunks of movie data. Accordingly, smart router 110 may include volatile and non-volatile storage short term storage (e.g., cache) and/or long term storage.

Smart router 110 may include communication interface 130 to support wired and/or wireless communications between client devices of the LAN and server devices of the WAN. Communications interface 130 may include one or more wired and/or wireless transceivers, modems, or other suitable hardware elements to facilitate communications with other computing devices via WAN 180 and LAN 190.

Client devices 140 and 150 may take the form of a personal computer, mobile computing device, or other suitable communications device. For example, client device 140 may include a processor 142 to execute instructions 146 held in storage device 144. Instructions may take the form of software or firmware. For example, software may include an operating system or portion thereof, or an application program. Instructions 146 may include a number of functional modules such as module 148. These modules may correspond to features supported by a client device. Storage device 144 may include a data store 148. Information may be stored at and/or retrieved from data store 148 by processor 142.

Some server devices, such as server device 170 may be one of a plurality of server devices of a server farm 171. A network appliance 174 may be positioned along a communications path between smart router 110 and one or more server devices of server farm 171. Network appliance 174 may take the form of a load balancer, application delivery controller, or other suitable network appliance. Network appliance 174 may include a processor 175 to execute instructions 177 held in storage device 176. Storage device 176 may include a data store 178. Information may be stored at and/or retrieved from data store 178 by processor 175.

Computing system 100 may further include a peer smart router 111. Smart router 111 may be identical to smart router 110 in some examples, and may provide a LAN for one or more client devices. As one example, peer smart router 111 may be a nearby/local smart router or may be a remote smart router that may communicate with smart router 110 via WAN 180.

Figure 2:
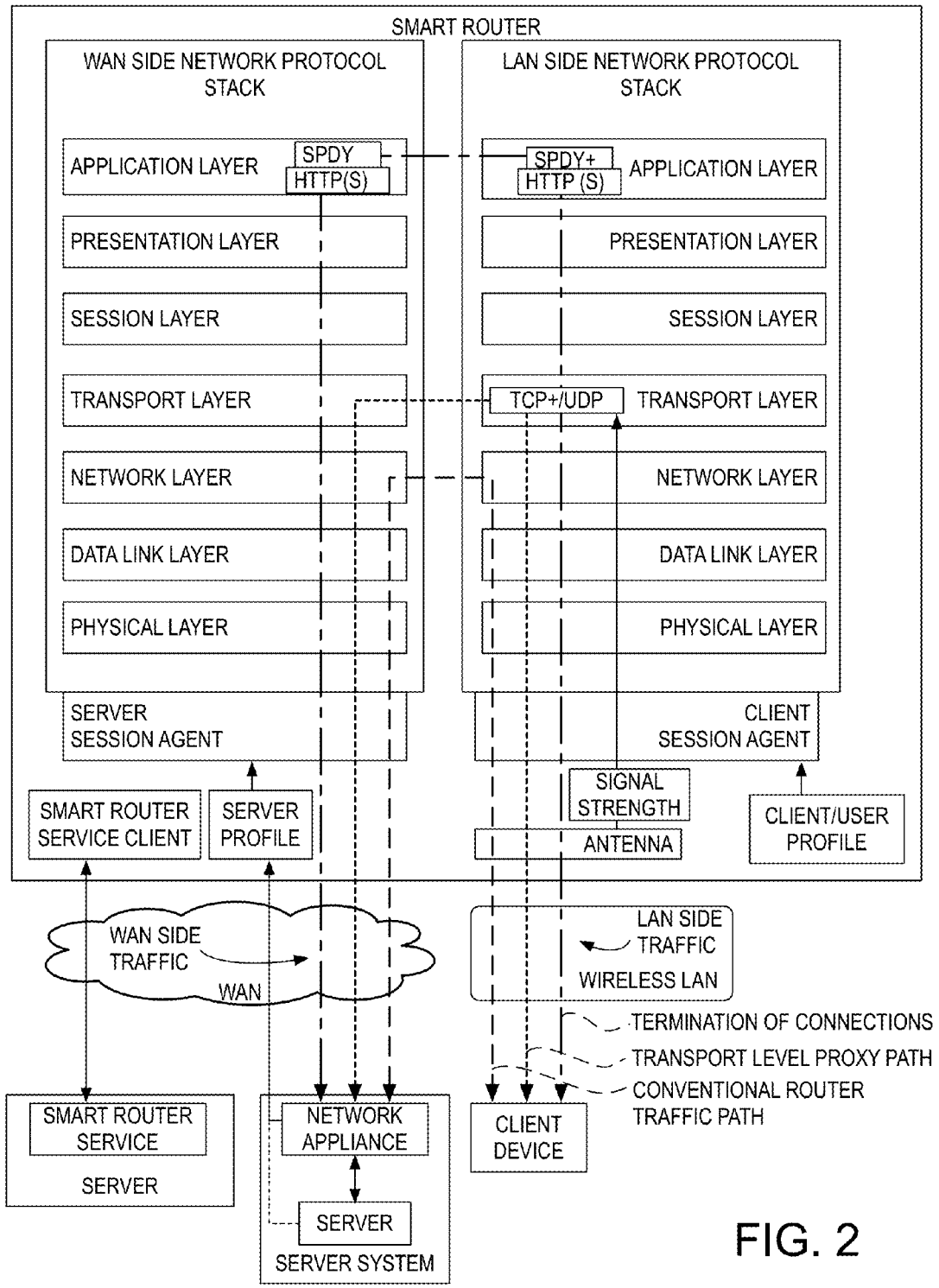
FIG. 2 is a schematic view of the smart router, illustrating a WAN side network protocol stack and a LAN side network protocol stack

As shown in FIG. 2, the smart router itself may include a WAN side network protocol stack and a LAN side network protocol stack, each of which may include optimized protocol modules configured to enable optimized communications between client devices on the LAN and remote servers over the WAN, via the smart router. FIG. 2 illustrates that a client session agent is assigned to each client session between client devices and the smart router, and a server session agent is assigned to each server session between the smart router and a remote server over the WAN. The client session agent instantiates an instance of the LAN side protocol stack. The LAN side protocol stack in turn modifies various aspects of the LAN side traffic between the client device and smart router to achieve the various functionalities described herein, before passing the traffic stream on to an instance of the WAN side protocol stack, which has been instantiated by a corresponding server session agent. The server session agent and WAN side protocol stack are tasked with managing connections between a corresponding server on the WAN, and the smart router. In the illustrated example, the transport layer of the client side network protocol stack instance performs TCP+/UDP protocol translation, explained in more detail below, and also receives performance data such as signal strength information for the antenna on the smart router, and adjusts the TCP settings based on the signal strength, as discussed in detail below. The application layer of the client side protocol stack instance performs translation from SPDY on the WAN side to SPDY+ (explained below), as one example, so that communications between the smart router and the client at the application layer are performed according to the SPDY+ protocol. Other application layer protocol translation schemes may also be implemented.

In some cases, the server may be a server system, such as a data center, which includes a network appliance, such as a server load balancer or application delivery controller, positioned logically in front one or more back end servers. Thus, it will be appreciated that the servers themselves, or the network appliances, may be configured to communicate in specialized protocols, such as described below, and the server side session agent and WAN side network protocol stack instance may be able to process responses from the server and forward them back to the requesting client device via the LAN side network protocol stack. To enable the smart router to understand which protocols the server or network appliance communicate with, the smart router may download a server profile, which contains data indicating any applicable server specific protocols.

The smart router may be in communication with a smart router service executed on a server connected to a smart router client executed on the smart router, via the WAN. The smart router client may upload user profile data so that users of the smart router may access and their user profile data from a cloud based management portal. In this manner, an admin of the smart router may easily edit user privileges, assign users to groups, etc. Further, the router settings themselves may be uploaded for cloud-based access, and thus a copy of the smart router settings may be uploaded to the smart router service and made accessible to an authorized user via a computing device over the WAN, for example. Finally, various protocol updates may be downloaded from the smart router service to the smart router client, to implement security updates, performance improvements, etc.

Figure 3:
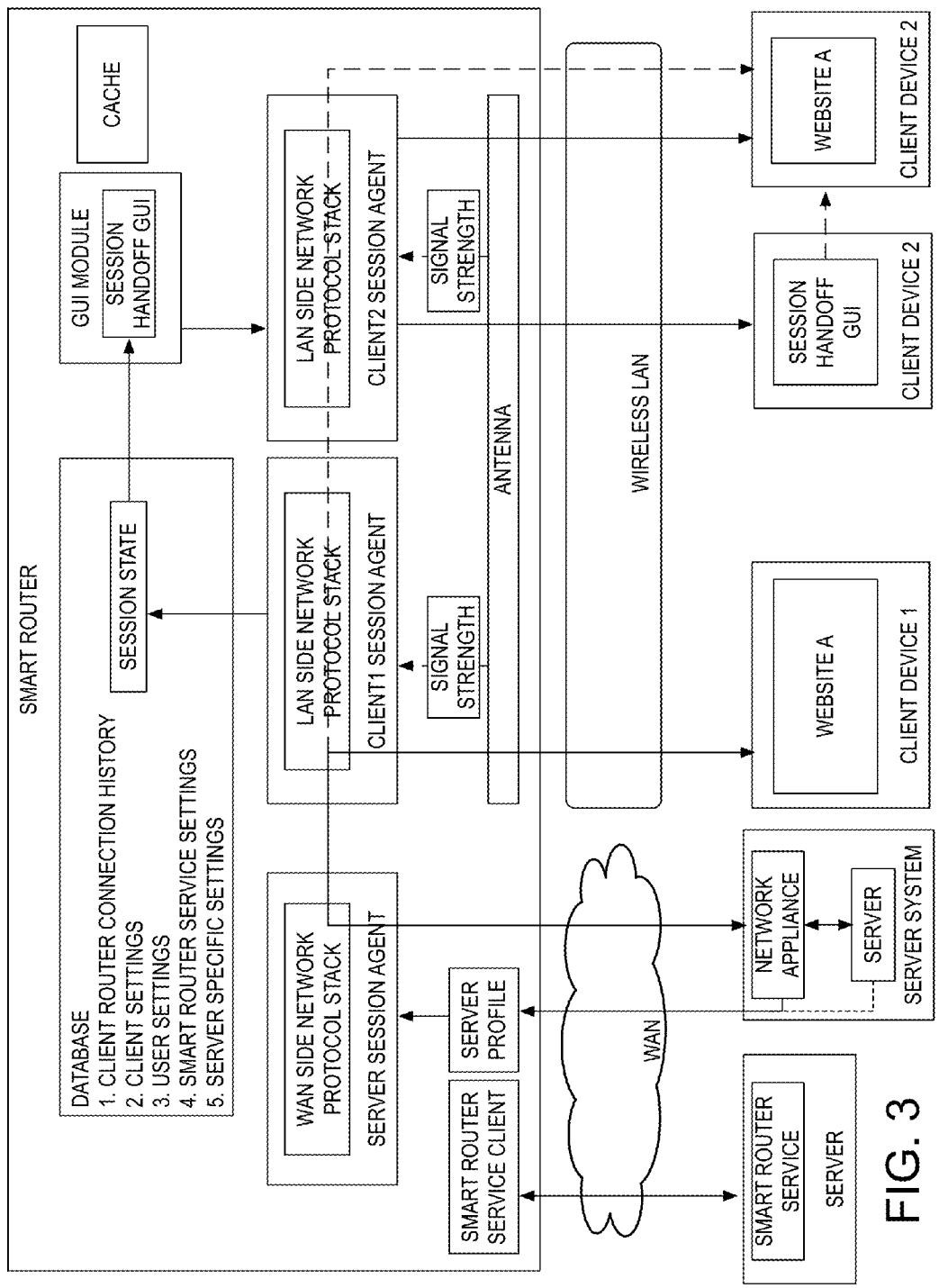
FIG. 3 is a schematic view of the smart router configured for session handoff between two client devices.

FIG. 3 shows a schematic illustration of the smart router configured for session handoff between two client devices. A first client device may be used to view a website from a server system. The session state of the first client device is stored in a database, at all times, and the website A is cached there. Another user, or the same user, picking up a second client device may wish to view the same website. In this case the second client device may download from the smart router and display a session handoff graphical user interface (GUI), which lists the website A session of client device 1. The user may select the website A session, and then the data necessary for displaying website A on the second device is downloaded from the smart router to the second client device. In the case that the second client device and first client device are of different device types, which would affect the rendering of website A on the second client device (such might occur as if the first client device is a PC and the second is a mobile device, or if two different browsers are used on each device), then the smart router is configured to view the device and OS type of each of the devices involved in the handoff, and to determine whether new suitable data is required from the server to properly display website A on the second client device, and if so to request and retrieve said data, and transmit the new suitable data to the second client device for display. In this manner, the handoff of the website session between mobile client devices may be aided by the smart router to be seamless from the user's point of view, and tailored to the destination device.

II. Feature Set Details

Feature 1: Faster and More Stable Wireless Connections Through Protocol Proxying Conventional HTTP over TCP protocols are poorly suited to the wireless transport commonly found in local networks. For example, HTTP is verbose, and sends repeating header data in non-compressed text formats. TCP often responds too drastically to packet loss that frequently occurs on wireless connections, such as may be supported on the LAN-side of the smart router with clients. Thus, these standard protocols are poorly suited for local wireless connections compared to optimized protocols.

To improve wireless communications between the smart router and connected computing devices, the smart router may be configured to function as a protocol proxy so the benefits of the optimizations can be achieved over a slow and lossy wireless network connection, but still communicate with the WAN via more-widely adopted protocols.

Figure 4:
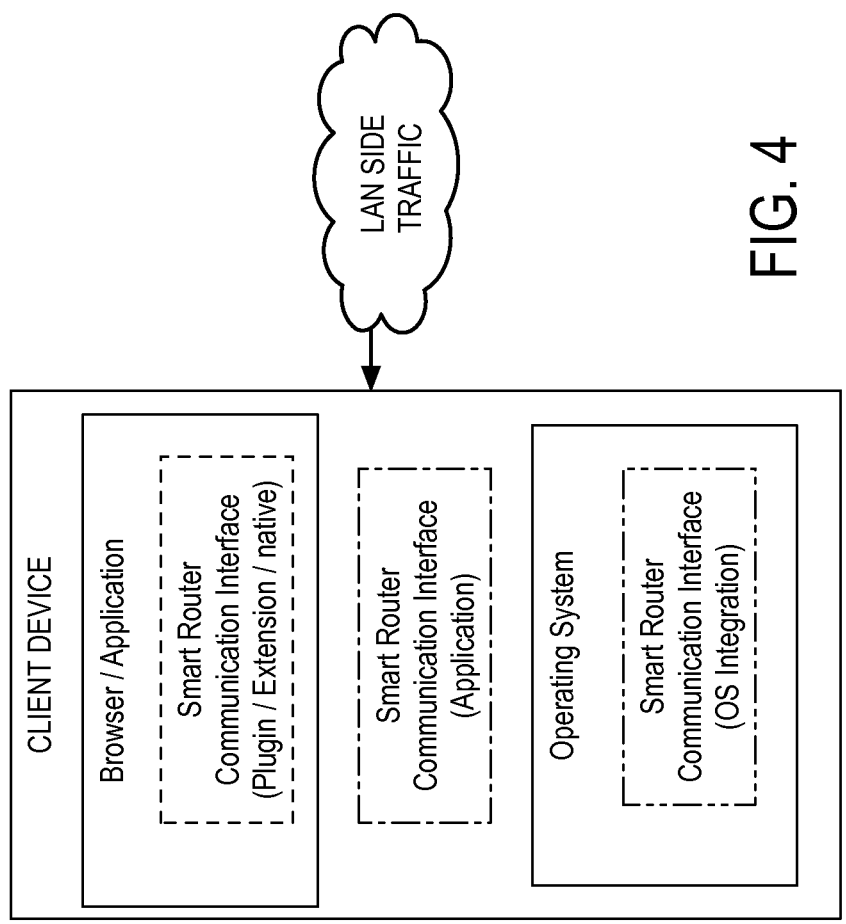
FIG. 4 is a schematic view that illustrates a client device provided with a smart router communication interface.

In some embodiments, enhanced or modified protocols may be used to communicate between the smart router and client devices over the LAN. Thus, as shown in FIG. 4, the client device may be provided with a smart router communication interface that enhances standard TCP/IP and application protocols. This smart router communication interface may be made available natively as a component of the client operating system. In other embodiments, the smart router communication interface can be added to the client via browser plugins, smart router applications or proxies running on the client device.

Google has developed SPDY, which is an application protocol (OSI Layer 7) similar to HTTP, but more efficient under many conditions. Specifically, SPDY reduces data requirements compared to HTTP, so would be better suited to lossy, congested, and slow networks. However, only a few servers on the WAN support SPDY.

Figure 5:
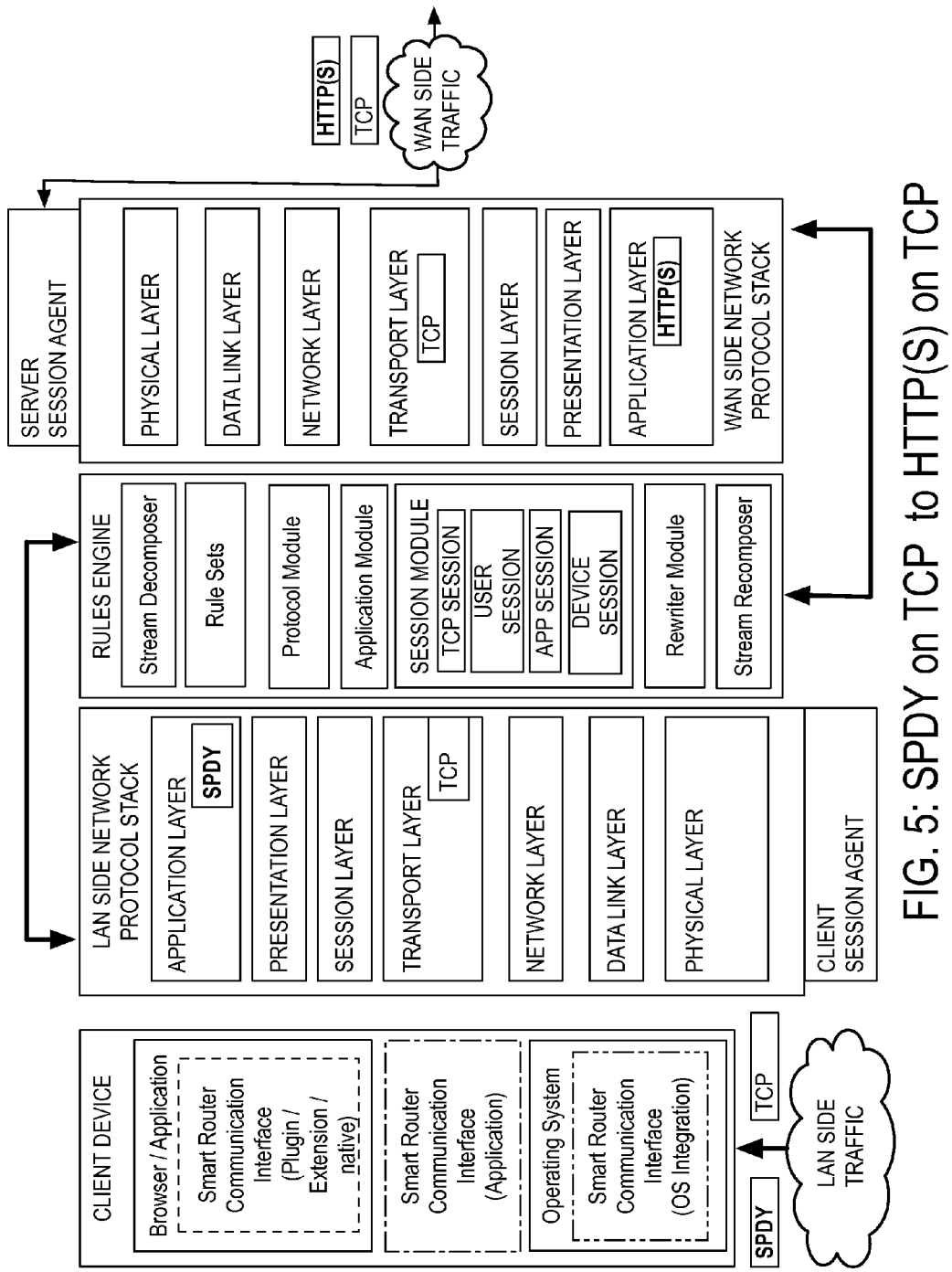
FIG. 5 is schematic view that illustrates the smart router configured to communicate with the client devices over the LAN via the optimized SPDY protocol, and translate the protocol to HTTP(S) when sending the data over the WAN to destination servers that do not support SPDY.

Thus, in one use case scenario illustrated in FIG. 5, the smart router can be configured to communicate with the client devices over the LAN via the optimized SPDY protocol, but then translate the protocol to HTTP(S) when sending the data over the WAN to destination servers that do not support SPDY. This enables the LAN side connection to take advantage of SPDY, even when communicating with non-SPDY servers across the WAN.

Figure 6:
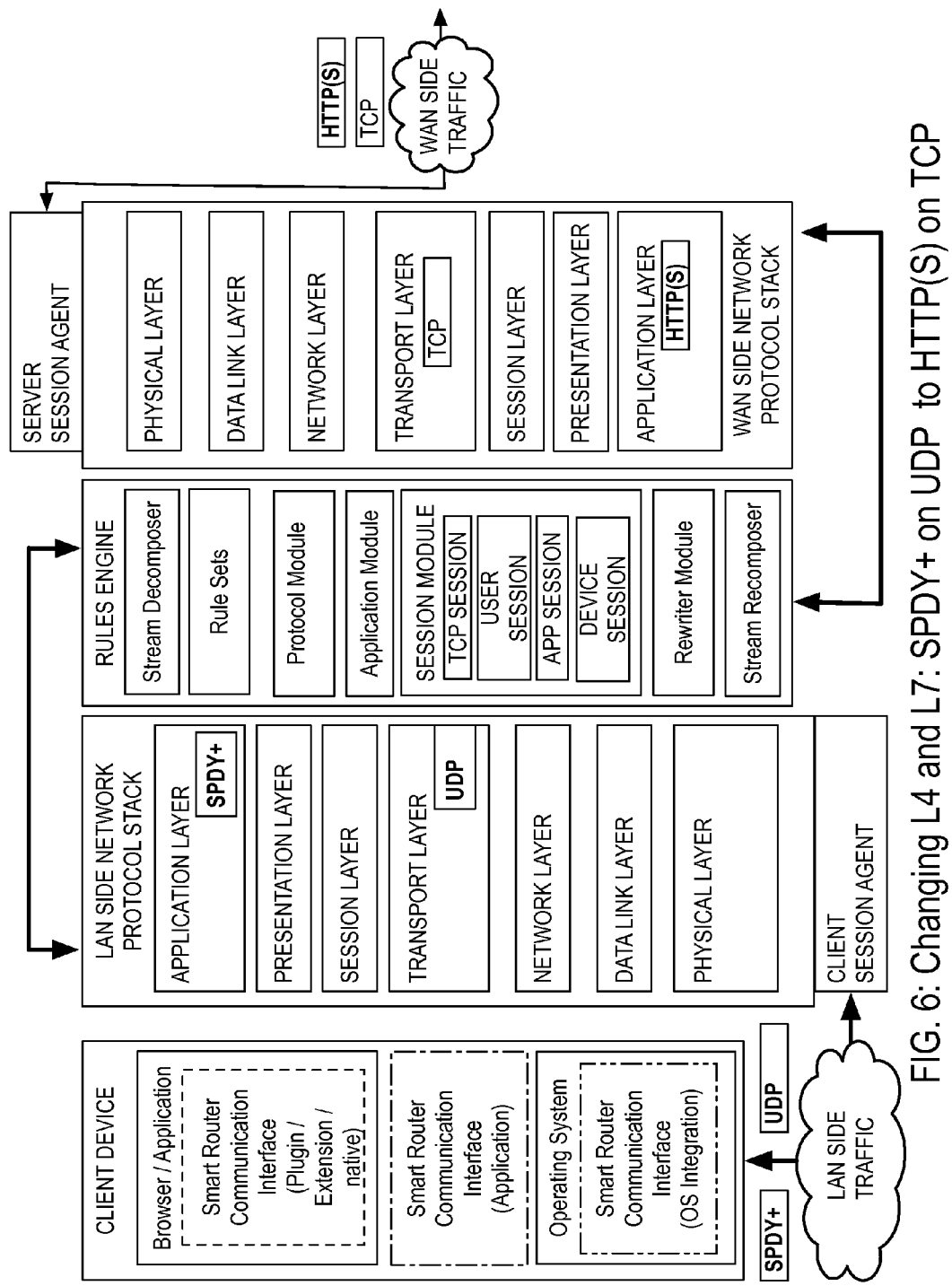
FIG. 6 is a schematic view that illustrates the smart router configured to communicate with improved application and transport layer protocols.

While SPDY has performance advantages compared to HTTP, the smart router implements further improvements to the application layer protocol itself (which may be thought of as SPDY+) also changes the transport layer (OSI Layer 4) from TCP to the lighter-weight UDP for additional performance gains, as illustrated in FIG. 6.

To increase the basic efficiency of SPDY the smart router may implement delta encoding. For example, the smart router may be configured with a non-volatile storage device such as FLASH memory, a hard drive, etc. and also with volatile memory, such as RAM. Large shared dictionaries on the clients could facilitate more data communicated with fewer bits sent over the network.

Switching the L4 transport protocol from TCP to UDP yields additional improvements, but since UDP doesn't have the delivery guarantees, flow control or congestion control that are built into standard TCP, these characteristics could be added to the SPDY+ protocol. Since the smart router doesn't have to rely on the standard TCP mechanisms, it can utilize optimized versions that are responsive to the traffic particulars of the SPDY+ protocol.

For example, by switching to UDP, TCP's latency inducing three way handshake could be eliminated, and replaced with application level data that could be lighter weight and more secure than the sequence numbers used by TCP for managing acknowledgements of receipt by the requesting client of data packets, while still providing in-order data reading and reliable re-delivery of lost information. This application level data contrasts to handling of these functions at the transport layer in conventional TCP. Furthermore, the smart router and client device could reuse security credentials granted in previous interactions, making communication more secure than using sequence numbers. As a further example, acknowledging data can often be imputed, rather than explicitly being set. And such an application level solution implemented by the smart router could provide this functionality using less data exchange than TCP uses for a similar purpose.

In sum, application level data transmission control packets that support retransmission may be configured to utilize fewer control packets as compared to TCP.

Figure 7:
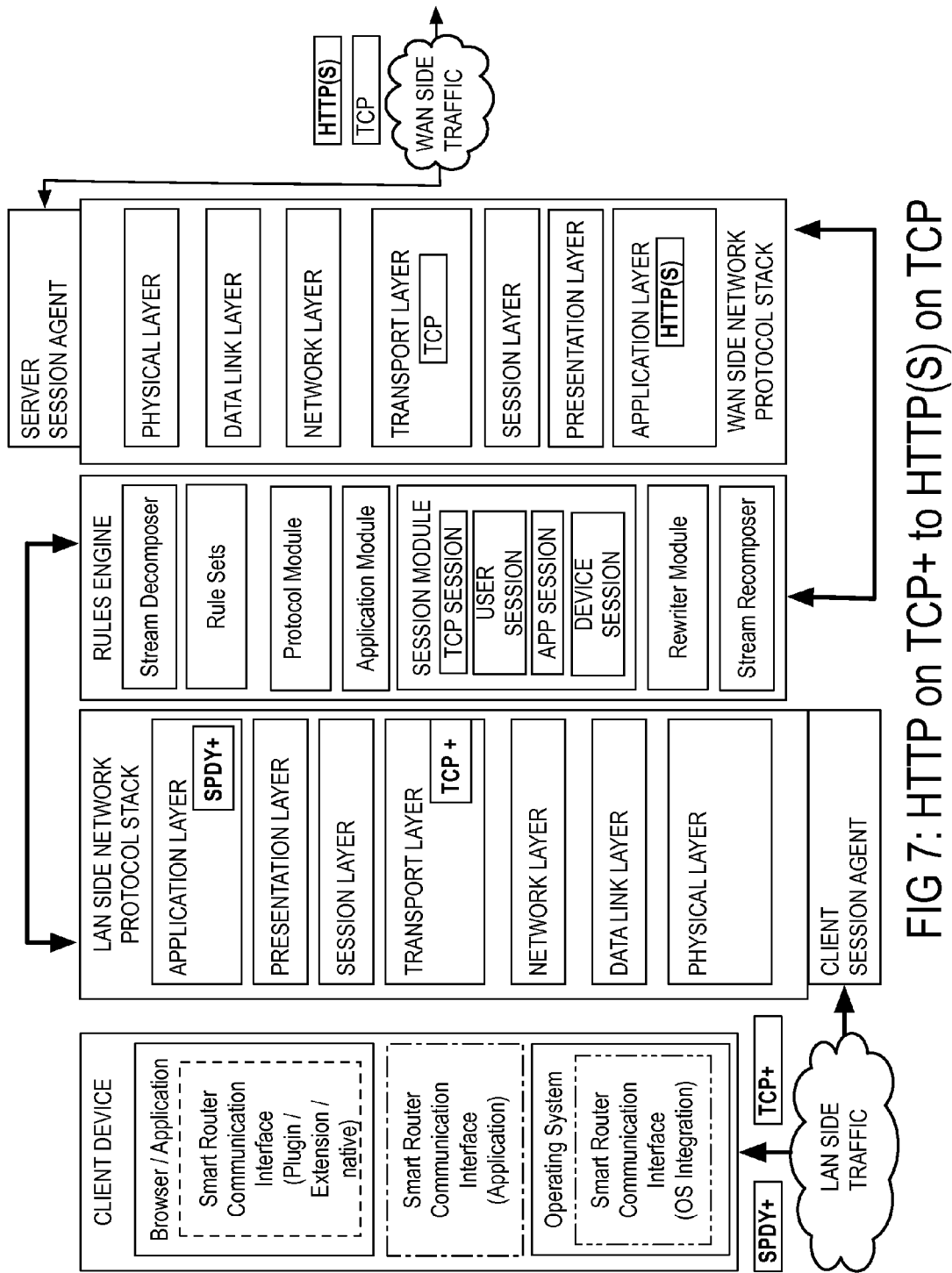
FIG. 7 is a schematic view illustrating the smart router configured to implement an improved version of the SPDY protocol.

An additional enhancement to SPDY is illustrated in FIG. 7 and described below.

Modifying Low Level Protocols

As an alternative to modifying the OSI Layer 7 application protocols such as SPDY or HTTP, a smart router may implement custom optimizations of lower layer protocols. For example, the smart router can have the optimizations at each of the following layers.

Layer 1, the Physical Layer capabilities beyond (802.11/or Ethernet),
Layer 2, the Data Link Layer (ARP/Ethernet),
Layer 3 (IPv4, Ipv6),
Layer 4 (TCP) and
Layer 6 (TLS/SSL) to Link, IP, TCP.

These may be supported on the client device by being built in to the kernel OS (in the so-called "protocol stack" modules that that implement each of the OSI level protocols within the operating system), or as application-level code that modifies network traffic. These different optimizations may be used in combination with each other.

TCP+

As used herein, the term "TCP+" refers to an optimized Layer 4 TCP-like packet based transport protocol with improved congestion control, retransmit, slow start, and/or data encryption optimizations designed to reduce or avoid the problems of conventional TCP connections over wireless networks.

Packet loss in wireless network is more transient than the wired networks for which TCP was initially designed. Additionally, the wireless communications link may have a capacity that varies over time, according to distance of the transmitter to the receiver, interference, and fixed and moving objects in the area.

Figure 8:
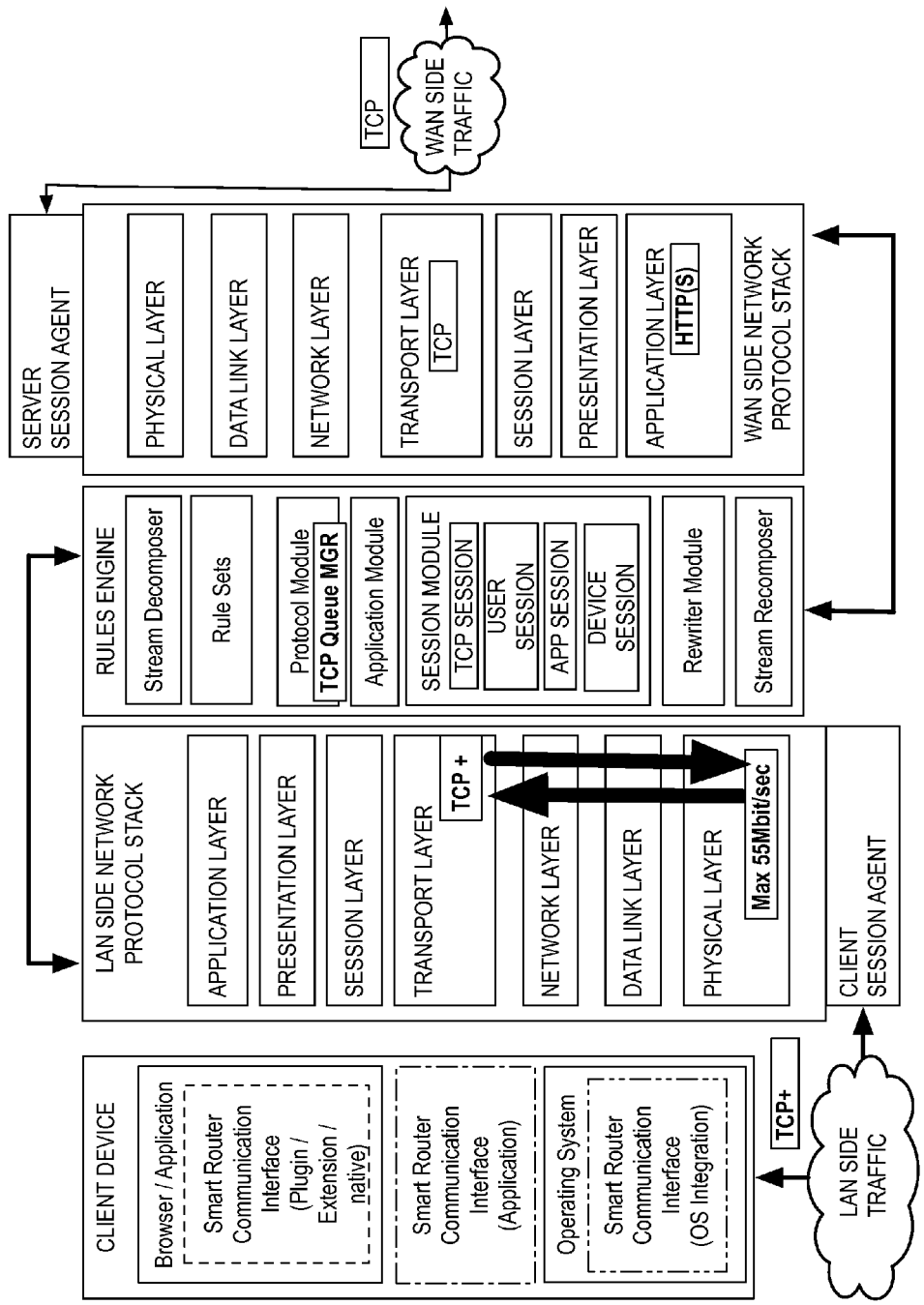
FIG. 8 is a schematic view illustrating the smart router configured to traffic shape so as not to exceed available bandwidth limits.

Referring to FIG. 8, for example, the smart router may be configured to determine that a maximum bandwidth is 54 Mbits/sec based on the radio signal strength to a connected client as measured at the smart router. Upon making this determination, the smart router may be configured to override normal TCP controls and not try to send or receive at 55 Mbits/sec or higher transmission rates. The smart router should rate limit/bandwidth throttle/Queue packets, or otherwise "shape" the traffic so the send/receive transmission rates don't try to exceed the physical bandwidth limits of the current signal strength of the connection.

This strategy is beneficial because if physical limits of the wireless link are attempted to be exceeded by a router and client, then packets will be lost between the two, which will cause existing TCP congestion control algorithms to halve the congestion control window and enter a "slow start" mode by which the window is very gradually increased. In many cases, the time spent in slow start mode will waste available bandwidth on the connection between the client and router, because the transient interference that caused the packet loss in the wireless connection may well have disappeared long before the TCP exits the slow start mode.

With traditional TCP, a computing device is directed to keep sending data until packet loss occurs, deliberately exceeding the bandwidth capacity of the link. At this point, packets are dropped, and TCP backs off, then tries again, as described above. Retransmitting dropped packets takes time, and because many 802.11 radios share time between users, the retransmits impair other users.

In contrast, with the improved TCP+ protocol proposed herein, the TCP+ algorithms in the smart router may recognize that wireless signals regularly fluctuate in strength and available bandwidth and therefore vary attempted sending speed in response to the current link speed as derived from the Layer 1 Physical Link.

In some implementations, the smart router implements device-specific connection performance monitoring and customizes the implementation of the communications protocols for each connected device based on past performance data.

The smart router monitors how signal strength and dropped packets relate over time for a particular mobile device communicating with a particular smart router. It will be appreciated that there are likely specific performance issues for each device-router pair due to different antenna placement, chipsets, etc. In real time as signal strength rises and falls for a specific device, the historical data, or a proxy thereof (lookup table), may be examined, and then the variable controls on the congestion control algorithm may be adjusted (retransmit timing and number of attempts, maximum segment size in TCP, congestion control window, etc.), based on the signal strength as it is known to affect the performance of a particular smart router with a particular device. One example of such device specific historical data is illustrated in FIG. 9.

The smart router adjusts these parameters in an attempt to control the communications algorithms, particularly TCP+, from sending data too fast, which will eventually cause the TCP session to hit congestion control. In the past, some prior approaches have been proposed that used bandwidth shaping, queuing, etc., to attempt to prevent TCP from hitting congestion control, however, none have utilized attempted to vary these parameters based on a measured connection parameter on a wireless router, such as radio signal strength, nor based on historical communications performance data between a device-router pair.

The smart router may be configured to store the historical router-device communications data, such as depicted in FIG. 9, in a database in the router mass storage, or in a location accessible by the router via the LAN or WAN, such as at the smart router service depicted in FIG. 2. The router-device connection statistics are continually updated based on each new communication session between a particular device and the router. Since this data typically is stored at the router, the client device typically does not have access to it. Rather, the smart router stores the router-device pair connection history data, and based on that data can adjust its own communications protocol parameters accordingly. Many of the settings that would be adjusted (retransmit, MSS, and congestion control window) are TCP settings and could be programmatically set in TCP, or TCP+.

As illustrated in FIG. 10, TCP+ may be aware of and store in historical data the number of hops between router devices that a datagram must travel to arrive at a selected endpoint along a communication path. Each hop represents a potential problem point that the smart router might need to route around, for example in the case of a router device that is dropping packets. Further, each hop typically adds latency to the overall transmission time, and in turn to the overall round trip time between client request and server response. TCP+ can also be aware of the transport type (wired/wireless), distance, and measured latency (e.g., average RTT). The TCP+ protocol may dynamically set values based on imputed conditions on the network for the communication session. For example, if the protocol detects over a threshold large number of hops, the TCP+ protocol could be programmed not to send at a maximum transmission rate, and also to be conservative when dropped packets are detected and slow down the transmission speeds.

As illustrated in FIG. 11, the smart router, for example, may communicate with various cloud services of the WAN using optimized and/or proprietary protocols. In FIG. 11 the smart router application proxy is illustrated on the client device, which is one type of smart router service client as depicted in FIG. 2. While the smart router application proxy is illustrated communicating using proprietary protocols with the smart router service, it will be appreciated that other services across the WAN may also be communicated with using proprietary protocols. In some embodiments, instead of proprietary protocols, optimized versions of existing protocols, or standard protocols themselves may be used, for example, when the cloud service does not "speak" the proprietary or optimized protocols described herein.

Figure 12:
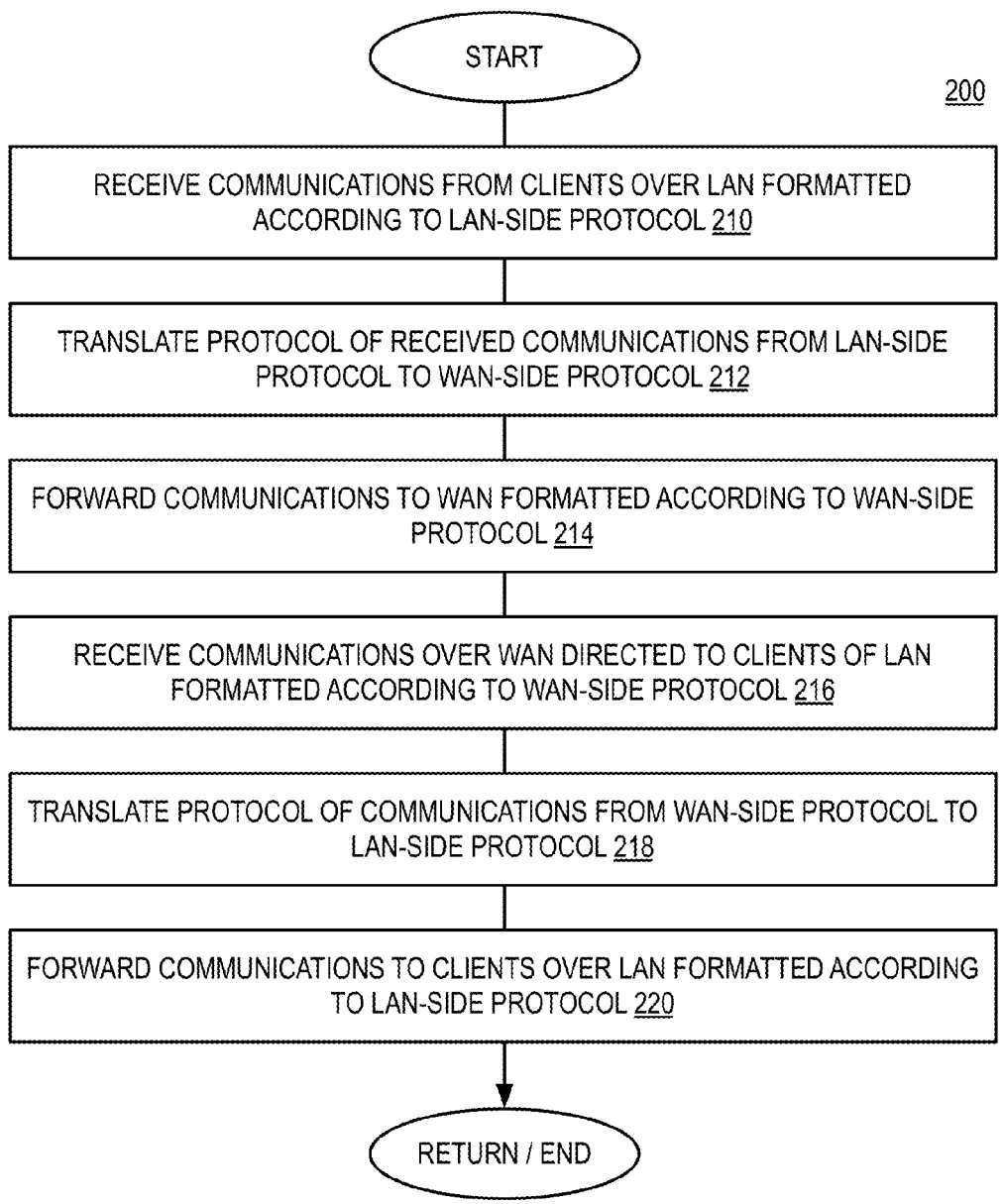
FIG. 12 is a schematic diagram depicting an example method for protocol proxying and translation.

The various specific methods described above in FIGS. 2-11 for protocol proxying and translation are generally and schematically illustrated in FIG. 12. FIG. 12 is a schematic diagram depicting an example method 200 generally for protocol proxying and translation. At 210, the method may include receiving communications from client computing devices over a LAN that are formatted according to a LAN-side protocol. At 212, the method may include translating the protocol (e.g., transport layer and/or application layer) of the received communications from the LAN-side protocol (e.g., TCP+) to the WAN-side protocol (e.g., TCP). At 214, the method may include forwarding the communications received over the LAN to the WAN formatted according to the WAN-side protocol. At 216, the method may include receiving communications from the WAN directed to clients of the LAN that are formatted according to the WAN-side protocol. At 218, the method may include translating the protocol (e.g., transport layer and/or application layer) of the communications received over the WAN from the WAN-side protocol (e.g., TCP) to the LAN-side protocol (e.g., TCP+). At 220, the method may include forwarding the communications received over the WAN to the appropriate clients over the LAN formatted according to the LAN-side protocol. In some examples, the application layer protocol may be upgraded or translated by the smart router between the WAN-side and LAN-side as previously discussed, and the transport layer protocol may be translated from TCP on the WAN-side to User Datagram Protocol (UDP) on the LAN-side to communicate with clients.

As described above, TCP+ may also include a collection of techniques that improves TCP over wireless networks such as Wi-Fi. Packet loss in wireless network is more transient than the wired networks for which TCP was initially designed for. As one example, TCP+ may be configured for wireless networks to utilize proportional congestion control, as discussed below.

In some implementations, the smart router may upgrade or translate the application layer protocol, (e.g. HTTP to HTTP+ (e.g., SPDY)), but utilize UDP instead of TCP, as described above. This approach may be performed without requiring changes to the operating system network protocol stack. The smart router may use information identified from the wireless connection to adjust transport level protocol parameters to optimize transmission. By utilizing transport over UDP, the application layer, i.e., the browser or application program, may handle retransmits, etc. responsive to the varying capacity of the wireless link.

Feature 2: Improved Security Through Auto Encryption of Data Sent Over Wireless Connections A LAN can be "open" at the data link layer, such as 802.11, so any compatible client can connect, or be an encrypted or "closed" network and only allow access to devices that supply the correct WEP, WPA, WPA 2, or AES or similar password.

Auto Upgrade HTTP to HTTPS

Wireless router passwords may be difficult for users to remember or implement to gain access to a closed LAN. This is exasperated by the fact that client software accessing the router often "forgets" the network/password association, so the user must enter the cryptic information all over again.

Closed LANs are more secure, but harder to manage on a day to day basis. Open networks let anyone with a packet sniffer program grab HTTP cookies and impersonate users on the network. One solution is to upgrade all of the local unsecure traffic to secure protocol by rewriting the stream, even if the WAN server isn't available in a secure protocol. The security certificate used to set up a secure local connection may be issued by the smart router or by a service associated with the smart router.

Figure 13:
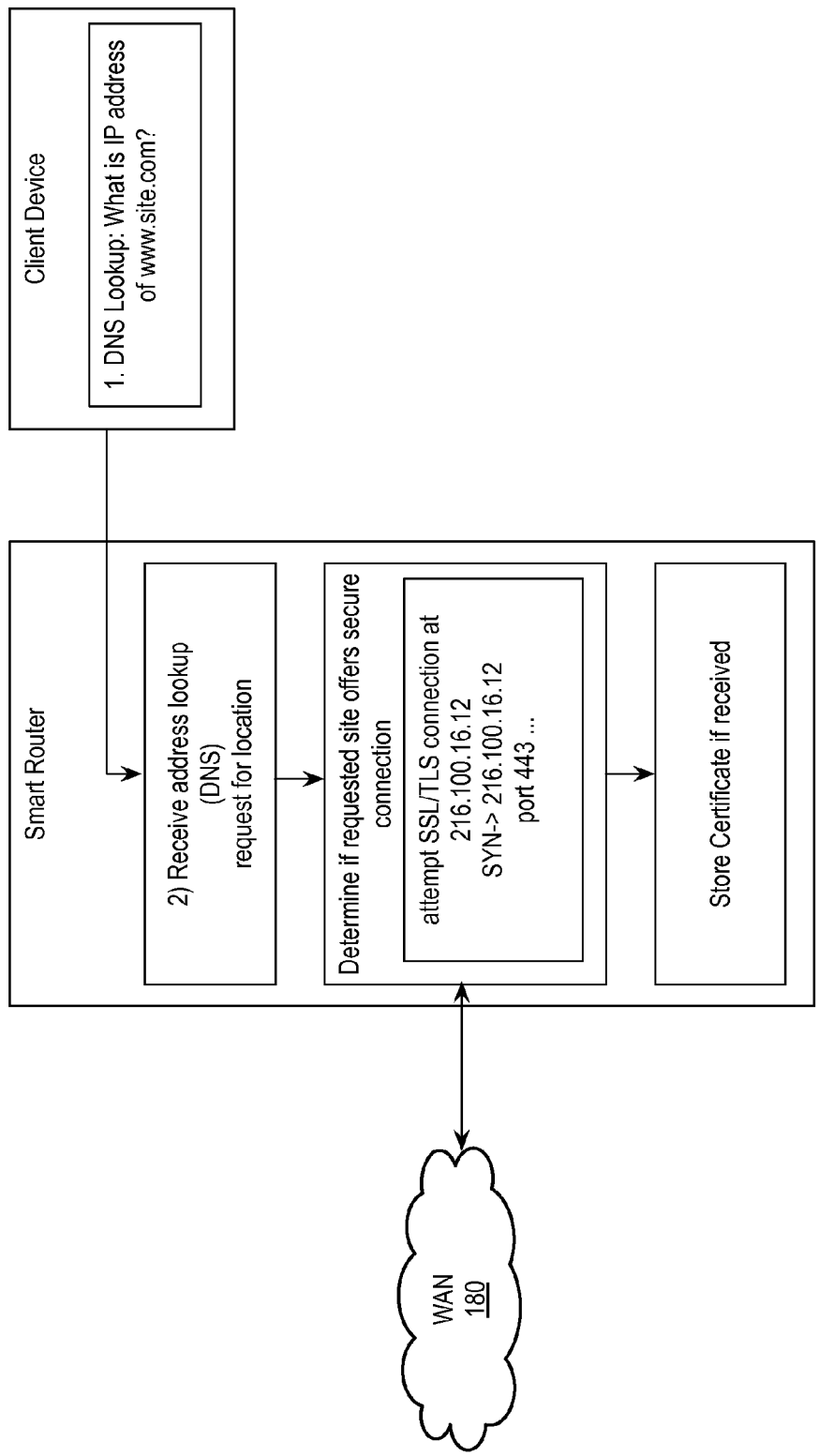
FIG. 13 is a schematic diagram illustrating the smart router configured for to determine if a WAN side destination server supports a secure communications protocol.

As shown in FIG. 13, a computer networking method may be implemented according to which, at a smart router configured to connect via a LAN to a client computing device, and function as a gateway for communications from the client computing device to one or more remote servers over a WAN, the smart router programmatically upgrades the security level of requests sent via unsecure protocols from LAN-side client computing devices to the smart router, by sending those requests using secure protocols to destination servers over the WAN. In order to achieve this programmatic upgrading, the smart router may be configured to receive from one of the client computing devices a request for a web resource served by a destination server, sent via an unsecure protocol, and determine if destination server supports a secure protocol. If it is determined that the destination server supports a secure protocol, then the smart router may be configured to send the request to the server via the supported secure protocol, receive a response in the server supported secure protocol, and forward the payload of the response in an unsecure response to the unsecure request received from the client device. If it is determined that the destination server does not support a secure protocol, then the smart router may send the request to the destination server via the unsecure protocol.

In some examples the smart router may determine if the destination supports secure protocols, and upgrade communications between the LAN and WAN from HTTP to HTTPS, from IMAP to IMAPS, or from POP to POPS, etc. The smart router may thus be configured to receive a DNS look up request from a client device on the LAN side of the smart router, determine if the requested site offers a secure connection, and store a certificate from the requested site, if received.

Figure 14:
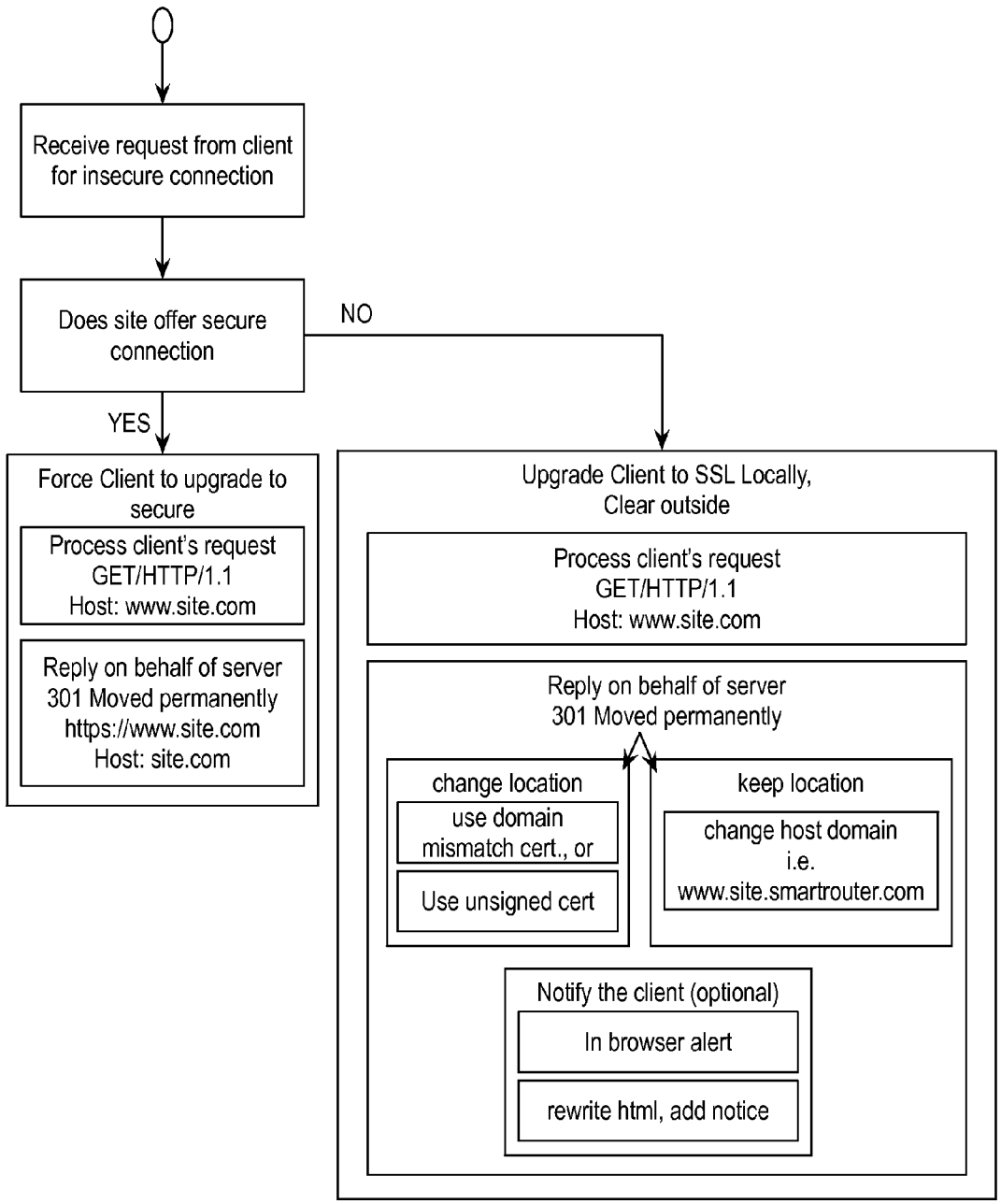
FIG. 14 is a schematic diagram illustrating the smart router configured to upgrade LAN-side communications to the secure communications protocol determined by the router by the determination of FIG. 13, for WAN side transmission.

As shown in FIG. 14, an alternative method is using a browser in proxy mode, and having the smart router implement a redirection, by replying 302 and forcing encrypted connections via a different URI. Another preferred option is having the browser go through a client-side proxy on the smart router which forces the WAN-side connections from the smart router to remote servers to be implemented via secure SSL connections.

In the event that the WAN located server does support a secure protocol, the smart router might still choose to maintain a separate secure connection to the client. In this way, the smart router would still have the option of rewriting the data before it reaches the client device, including adding, deleting or modifying cookie data, protocol headers, or sent or received application data.

By maintaining two separate secure connections, the smart router may be able to employ more rigorous security checking that many clients. As an example, while many browsers accept certificates signed by hundreds of issuing parties, including many authorized by foreign sovereign governments, the smart router could limit the number, type, identity, etc., of Certificate Authorities that are allowed to sign host site certificates, such that certificates from Certificate Authorities known to have been used for fraudulently issued certificates are not accepted. As a further step, a smart router could also detect when WAN-side man-in-the-middle attack might be occurring by comparing SSL certificates used to authenticate each SSL connection. To with, if one certificate was issued by a "rogue" authority, or is otherwise not matching the historically known-safe versions, then a man in the middle attack might be suspected and the smart router could alert the client or refuse connections with malicious parties.

In some implementations, the smart router may be configured to perform certificate validation tests. The smart router may perform a DNS lookup from a trusted service of the WAN to verify the identity of a host or network server of the WAN that the client device is communicating or requesting to communicate with. The router may also be configured to implement a more secure DNS (for example, by querying multiple sources when records deviate from expected values.

In some implementations, the smart router may upgrade, vary, apply, or discontinue encryption or other secure protocols to communications on the LAN side or WAN side. Hence, the clients of the LAN do not need to support encryption/security protocols to have those protocols applied to communications passed to the WAN by the smart router.

Figure 15:
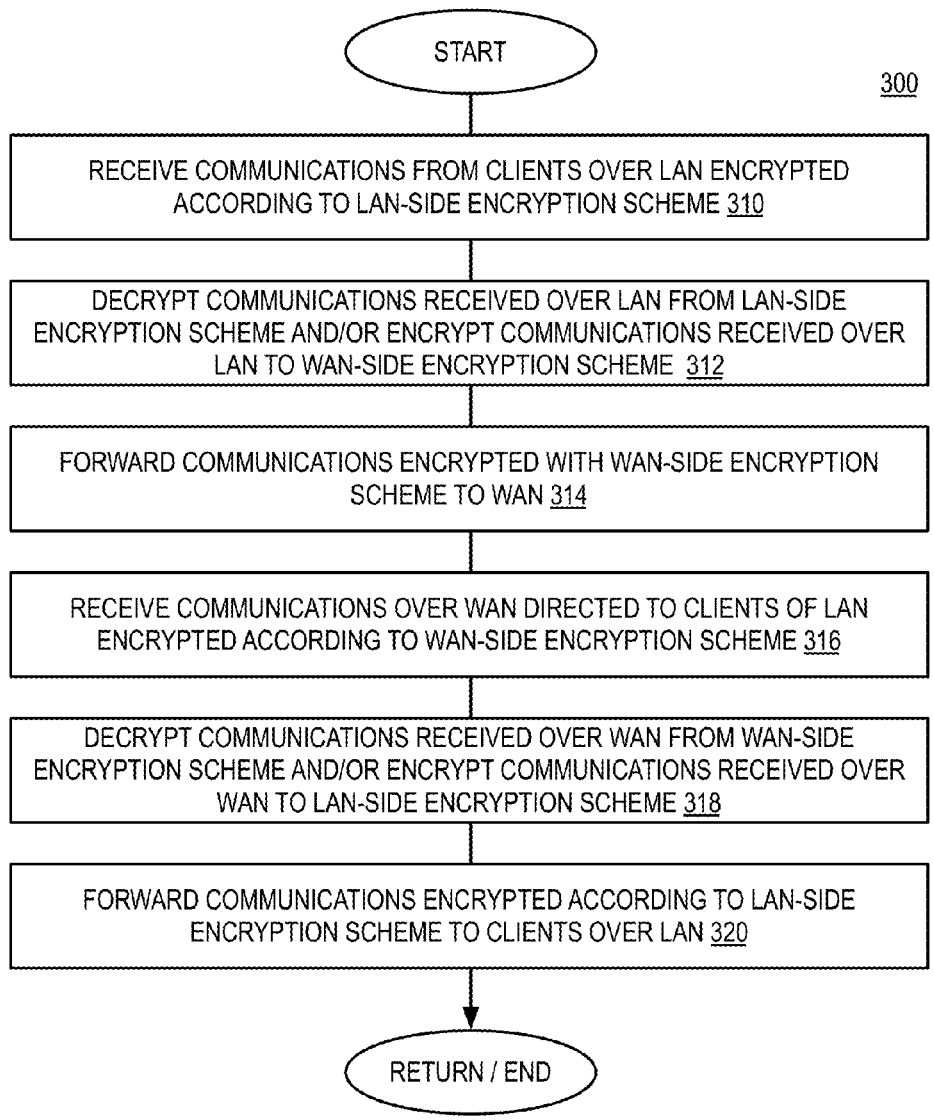
FIG. 15 is a flow diagram illustrating a method for proxying between two different encryption methods at the smart router.

The various specific methods described above in FIGS. 13 and 14 for upgrading to secure protocols are generally and schematically illustrated in FIG. 15 above. FIG. 15 is a schematic diagram depicting an example method 300. At 310, the method may include receiving communications from clients over a LAN encrypted according to the LAN-side encryption scheme. At 312, the method may include decrypting the communications received over the LAN from the LAN-side encryption scheme and/or encrypting communications received over the LAN to the WAN-side encryption scheme. At 314, the method may include forwarding communications encrypted with the WAN-side encryption scheme to the WAN. At 316, the method may include receiving communications encrypted according to the WAN-side encryption scheme over the WAN directed to clients of the LAN. At 318, the method may include decrypting the communications received over the WAN from the WAN-side encryption scheme and/or encrypting the communications received over the WAN to the LAN-side encryption scheme. At 320, the method may include forwarding communications encrypted according to the LAN-side encryption scheme to the clients over the LAN.

Even if a LAN-side client requests HTTP port 80 traffic of a WAN-side server, the smart router may probe the WAN-side server for TLS/SSL connections. For example, the smart router may initiate one or more requests to one or more other ports of the WAN-side server in addition to or as an alternative to port 80 in order to identity suitable SSL connections. If an SSL connection is supported by the WAN-side server, then the smart router may route or redirect client communications to the SSL connection on the WAN-side server.

Most home routers have one access point (SSID) and one password. For anyone, even guests, to obtain access to the network, they have to type in a difficult to remember WEP, WPA type password. This has several disadvantages, perhaps the most frustrating being that the passwords themselves are hard to remember and usually complicated to type in.

Furthermore, from a security perspective, the single password is a disaster: the single password is an all-access pass to the entire network, no clients have restrictions on what they do or where they go. There are no restrictions on bandwidth consumed, packets per second initiated, they are free to send illegal requests, and attempt to break in to any other devices on the network, with no restrictions, as long as they have the key.

Additionally, the passwords are not revocable—after a temporary guest is given a password, he can continue to access the supposedly secure network indefinitely, from any number of devices. Once a malicious user obtains, or cracks the single network password, all data the TCP/IP data to all clients is decrypted, and the attacker is free to carry out attacks against any and all devices connected to the network.

Conventional Captive Portals

In an effort to provide additional control, enterprise and hotel wireless access routers are often configured with a so-called "captive portal", which provides primitive device and user-level authorization.

Figure 16:
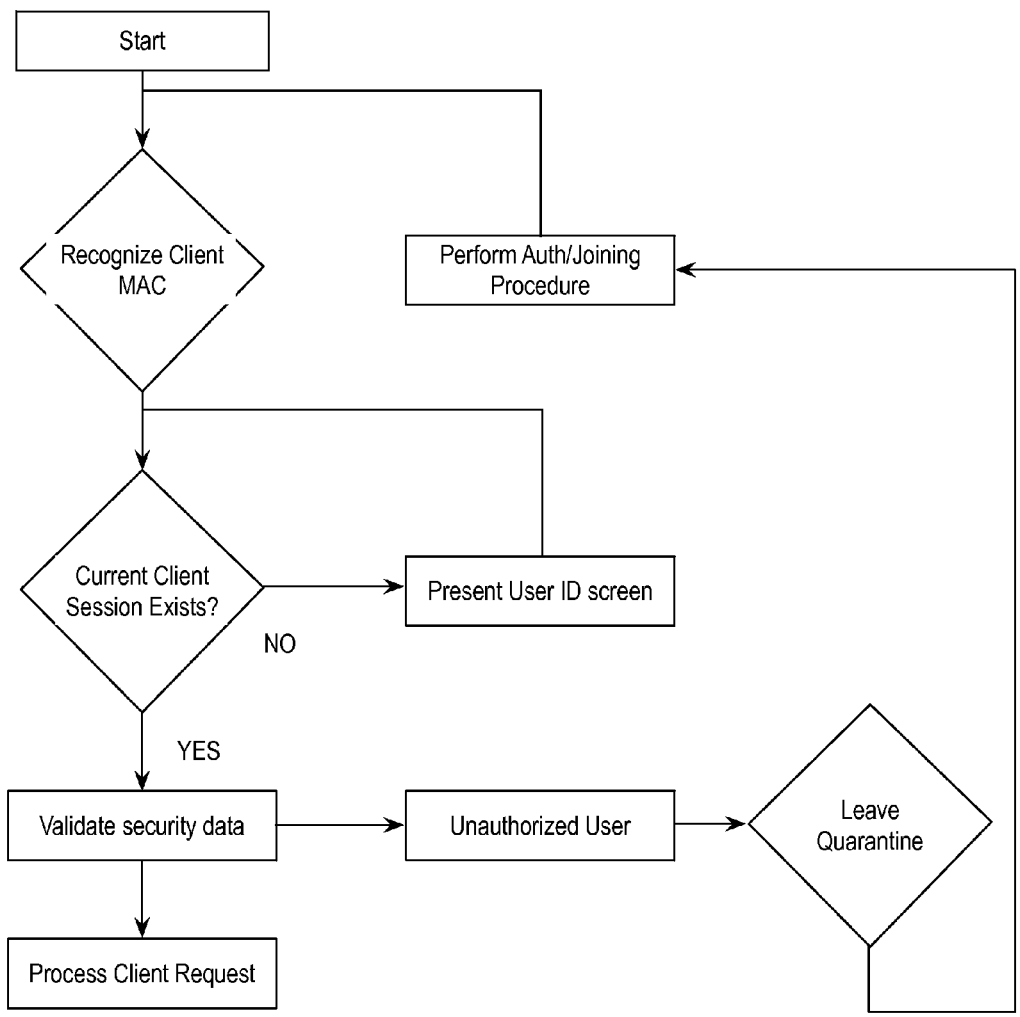
FIG. 16 is illustrates a schematic view of a secure authentication process flow implemented by the smart router.

As shown in FIG. 16, a captive portal typically operates without network encryption, i.e., as an "open" network. After a client device connects to the wireless network, and attempts to send data, the captive portal router will check the MAC address of the client and see if the client has a current session that is allowed to access the requested network resource. If the client does not have a current session, the router will send the unauthorized client a web page where the user typically enters a user ID and password or agrees to policies and subsequently obtains network access.

After a session ends, the user once again has to type in the username and password to access the network, which can be tedious. As a result, sessions tend to be long lasting. But, when there is no network-level encryption, any nearby devices are free to see or capture all the TCP/IP data and unencrypted application traffic such as HTTP (web) or POP/IMAP (email) without even being authenticated. And, with all the low level traffic in unencrypted form, it is trivial for a hacker to identify a MAC address of an authenticated client, replace a rogue device MAC with the stolen, authenticated MAC, and thereby impersonate that device and receive the access privileges of that user.

Smart Router AAA

To overcome the numerous limitations of traditional routers and captive portals, we disclose an improved access, authorization and accounting framework for the smart router described herein.

Figure 17:
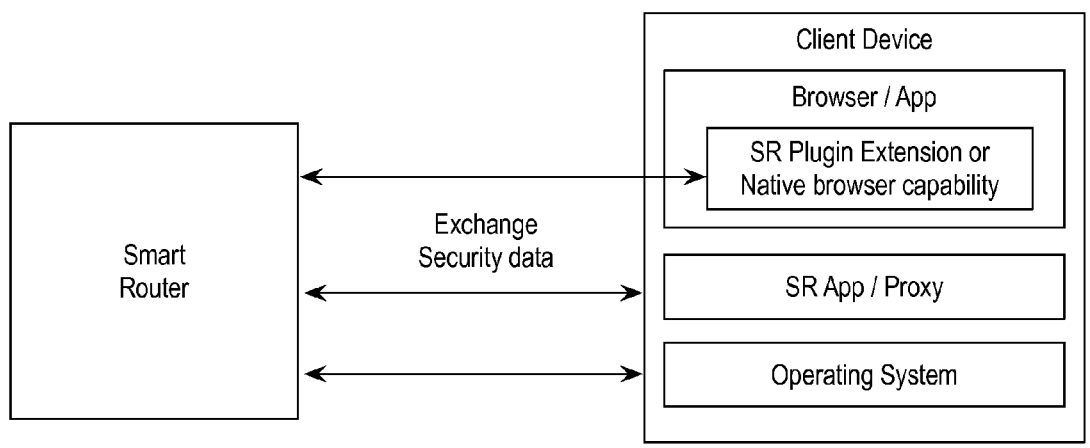
FIG. 17 is an illustration of software components that may be utilized in the authentication process of FIG. 16.

As illustrated in FIG. 17, client side software allows the exchange of security information with the routers. Such software is not limited to 802.11 standards. Examples include SSL/TLS, and Forward Encrypting Algorithms. This security information is continuously validated. In this manner the problems of rogue devices may be mitigated, since client devices not able to present this secret data on demand are quarantined.

First Pairing

In some implementations, all communications between the client devices and the smart router may be encrypted over the wireless communication links. In some implementations, only certain client devices and/or users (e.g., those possessing credentials) may be able to join the LAN. In some implementations, guest client devices/users may be permitted to join the network, but may be provided with different capabilities/functionality than registered users or administrators by the smart router. In some implementations, guest client devices may be provided with access to an encrypted network even if they are not registered/authenticated by the smart router.

In some implementations, the smart router may support an authorization module that includes AAA (Authentication, Authorization and Accounting) of credentials, and permission levels (e.g., guest, peer, smart router peer, administrator, etc.). Device and/or user credentials and/or identities (e.g., profiles) can be managed by a network service of the WAN that is paired with the smart router, such as the smart router service described above. Credentials may be revoked to limit access or functionality available to client devices and/or users by the smart router.

In some implementations, a client device may be paired with the smart router by one or more of the following operations:

A physical touch or bump of the client device to the smart router.

A user pushes a button or selector at a client device to request access to the smart router, and an administrator user is prompted with an access request that the administrator user can approve or decline. Approval may be indicated by a software token at the client device and/or smart router.

A user interface (e.g., GUI or other suitable interface) on the smart router, which can display or present a code, the requesting user or administrator user may enter that code at their client device, which proves that user is nearby the smart router A user may add the identity of another user or client device to a whitelist accessible by the smart router. The whitelist may be a list of email addresses, social network IDs, etc. In addition, the administrator of the smart router may indicate that "friends" or "friends of friends" in a social network should be allowed access, and the smart router may prompt the new user to provide a social network logon credentials so that the new user's social network ID may be checked against the smart router administrator's social graph on the social network.

A user may request access via a client device, and a code may be displayed at the client device, which may be entered by the user via the client device.

Figure 18:
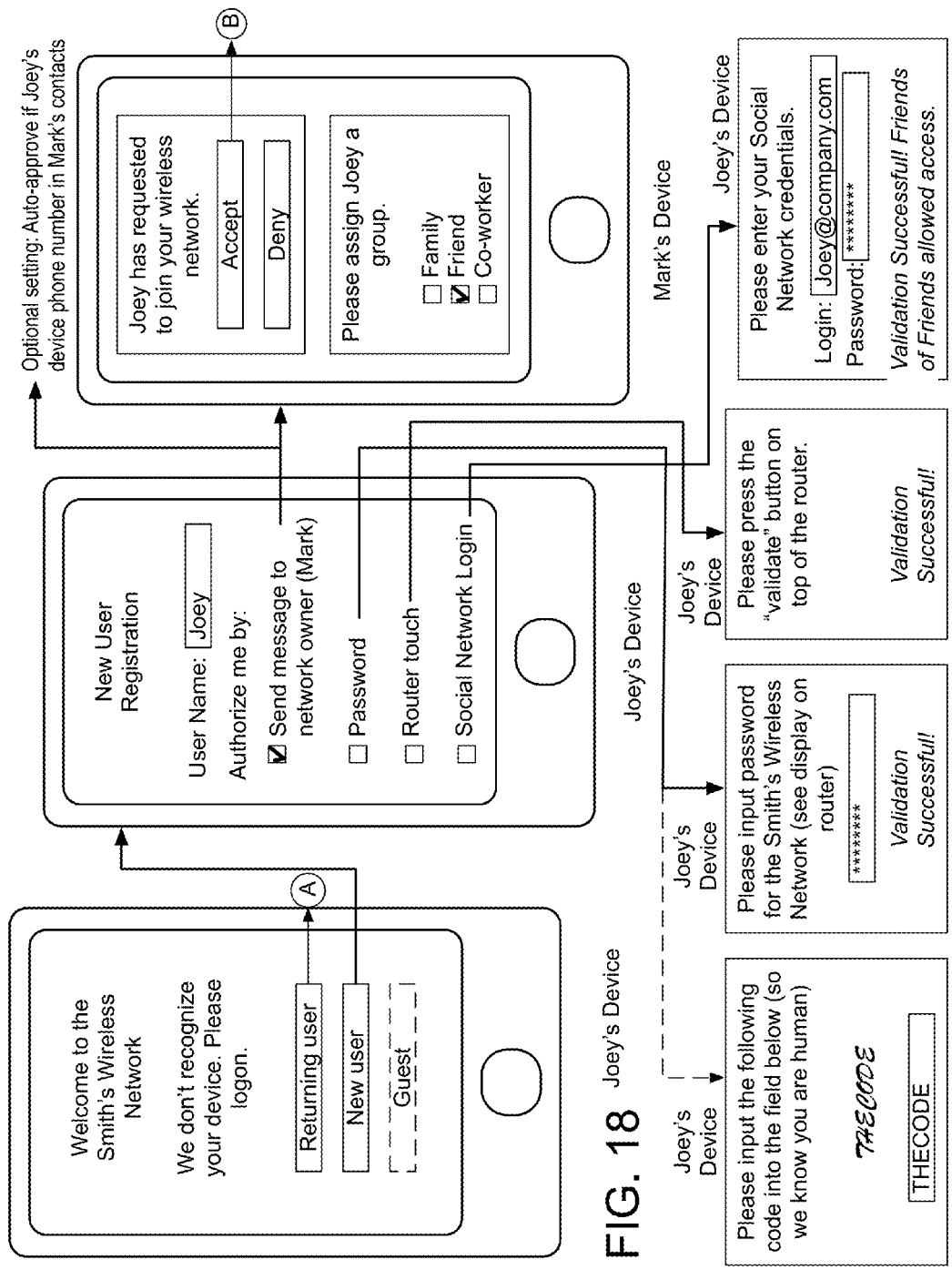
FIG. 18 shows screens of client devices that illustrate the login process for the smart router.
Figure 19:
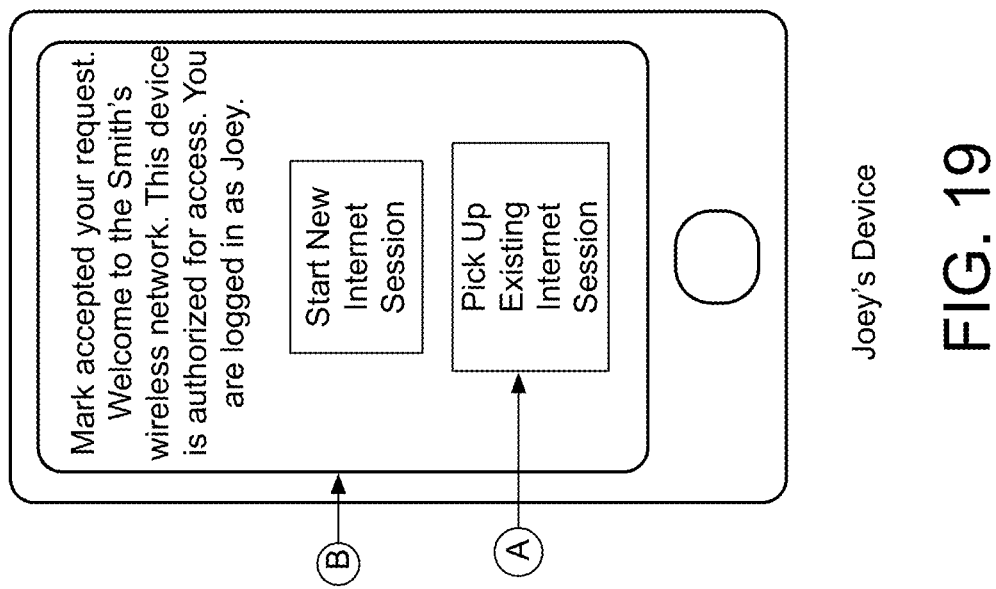

Some of these example device-router first pairing scenarios are illustrated in FIGS. 18 and 19.

Figure 20:
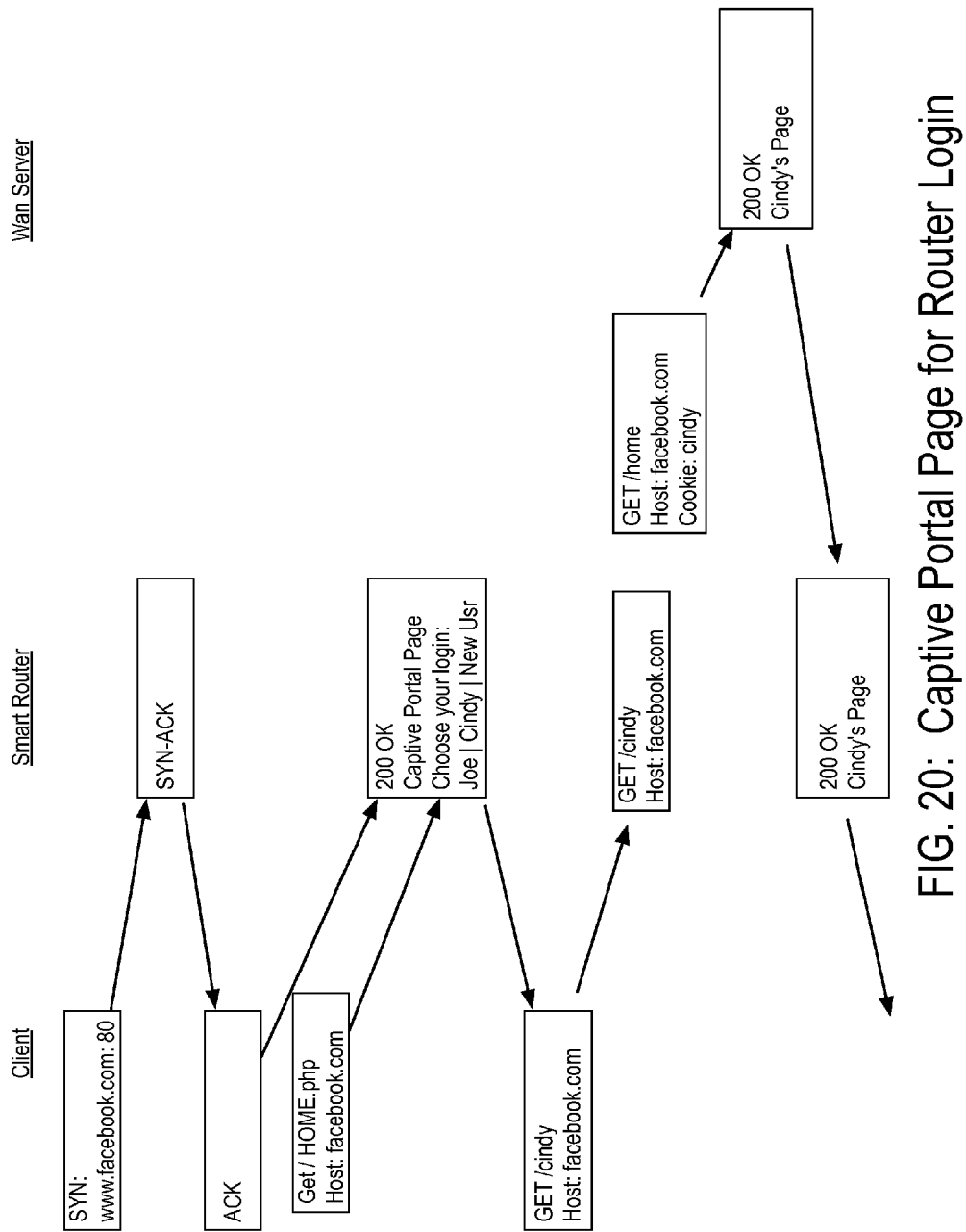
FIG. 20 is a communications flow diagram illustrating a captive portal login process for the smart router.

As illustrated in FIG. 20, one way in which the smart router may present the user login interface is illustrated below. When a client device/client user accesses the smart router for example by attempting to send a request to access a resource at destination server on the WAN, the smart router modifies the request and presents a login interface to the requesting device instead of immediately forwarding the request on to the destination server. FIG. 20 illustrates an example communication flow between the client device, smart router, and WAN server used to present the captive portal page for router login.

It will be appreciated that according to the communication flow of FIG. 20, when a user starts a new browsing session from a new device, or from a registered device after a period of registered device inactivity, the smart router intercepts the request, and asks for the user's identity (along with a password if so desired), and then passes the request and appropriate set of cookies to the destination website.

Subsequent Pairing, Switching Users, & Accessing Existing Sessions

The captive portal page with login interface can also function as way to switch between authorized users on registered client devices and to access existing user sessions. Those users may be prompted to "tap-to-continue" or may be required input additional passwords, as illustrated in FIG. 21.

One example of a user ID selection interface is illustrated below. Upon selection of an appropriate user name, which could be password/biometrically protected if desired, a customized menu is served by the smart router to the requesting device showing cached sessions for the user from sessions initiated by the user on all devices connecting through the smart router. The user can then select to view an existing session, in which case the state of the cached webpage will be displayed, and cookies downloaded to the requesting device, so that any subsequent requests from that webpage will properly be sent to the remote server through the smart router.

Figure 21:
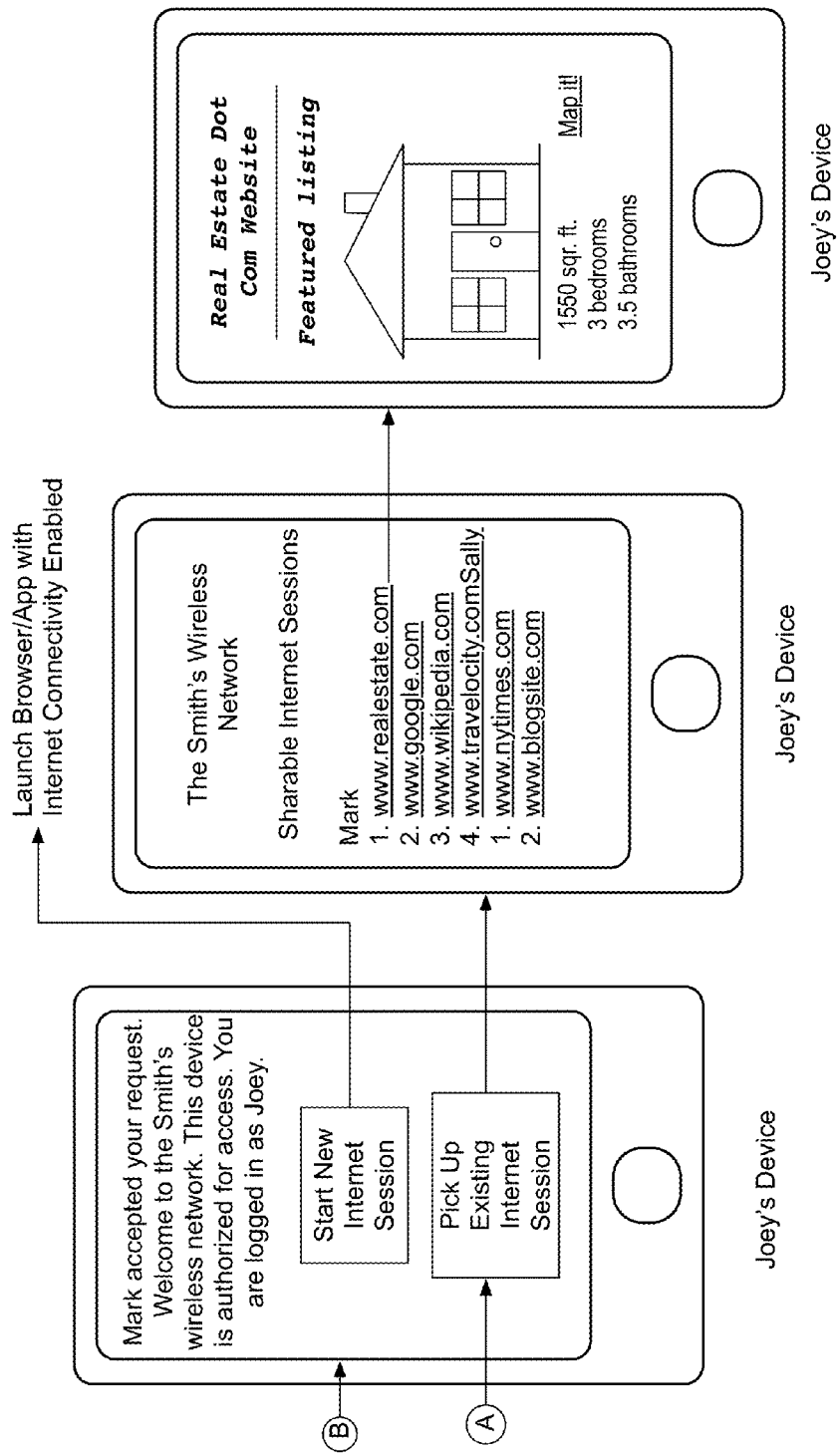
FIG. 21 shows screens of a client device illustrating a newly registered user accessing a new or existing user internet session via the smart router.

FIG. 21 illustrates how a newly registered user can be presented with options of starting a new internet session, or picking up an existing internet session.

Figure 22:
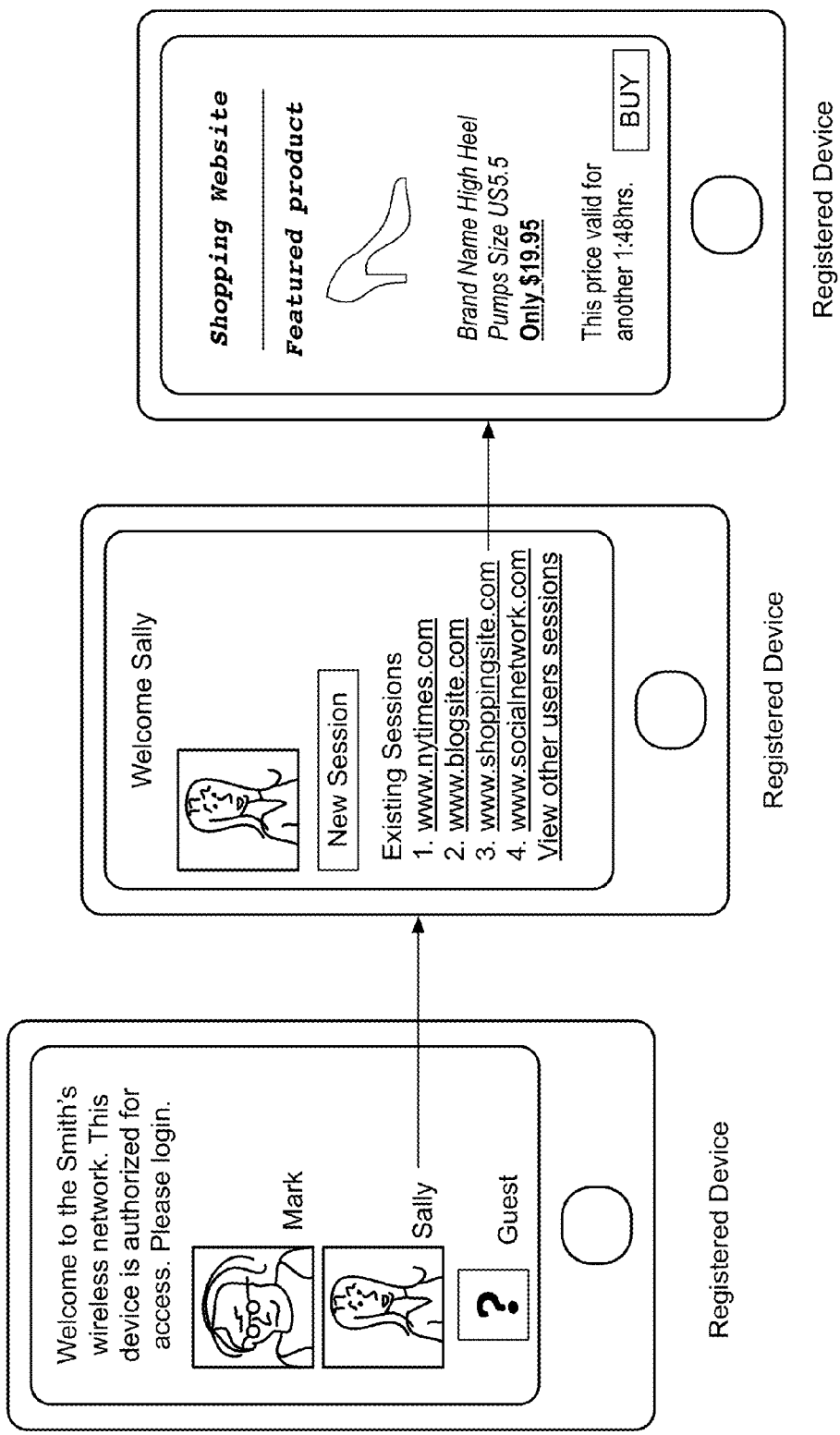
FIG. 22 is shows screens of a client device illustrating a registered user selecting and accessing a stored internet session via the smart router.

Further, as shown in FIG. 22, when registered users pick up registered devices, they are prompted by the smart router with the following login screen, and may select from a new session, a prior session of the same user, or to view all public sessions of other registered users of the wireless network, for session handoff.

Figure 23:
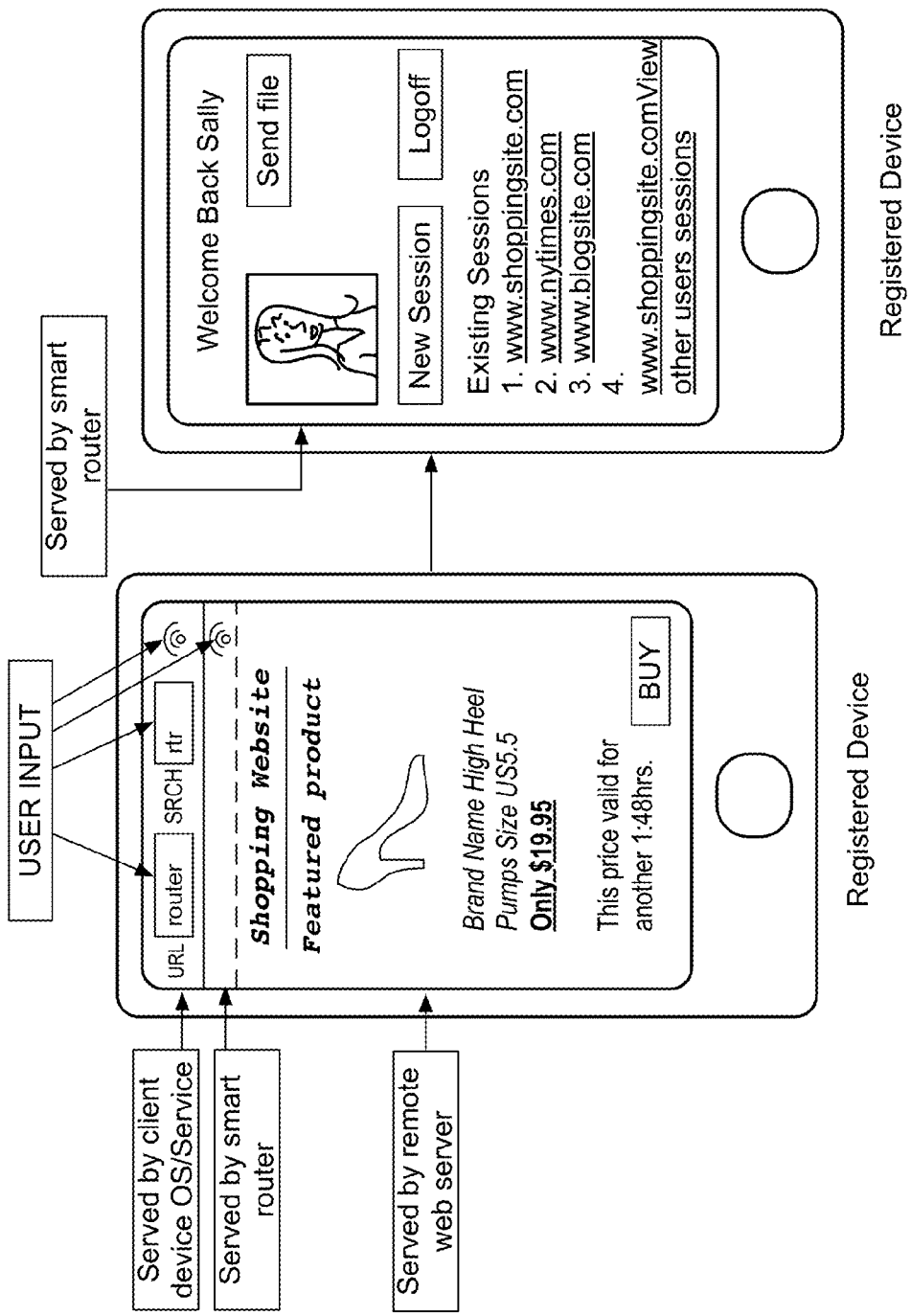
FIG. 23 is shows screens of a client device illustrating a user transitioning from browsing the internet, to a router interface for accessing shared internet sessions.

Once a user is established, the smart router may also provide a router interface for users to access the smart router to logoff from the existing user session, or access other existing sessions. FIG. 23 illustrates example of such an interface, and various alternative mechanisms for accessing it. Generally, it is preferable for the smart router interface to be as unobtrusive as possible during the user browsing experience, but accessible when needed. To that end, the smart router may be configured to receive search bar entries, or address bar entries, that, when they contain a matching term, such as "router" or "rtr", cause the smart router to not send the search request or DNS query on to a remote server/DNS server. Rather, the smart router could "eat" these requests and in response display the interface shown at the right in FIG. 23, which includes various links to access existing sessions. In addition, a dedicated router interface selector icon could be provided proximate the address field/search field in the address/search bar. Selection of the icon by tapping or clicking would cause the interface at right in FIG. 23 to be displayed. This bar is served by native programs on the client device, and is typically scrolled in from off screen by a user to be unobtrusive. Alternatively or in addition, the smart router could insert code into the web page code received from the web server, to cause a router interface selector icon to be displayed in a dedicated field proximate the web page, or the web page itself. This dedicated field could be transparent until tapped/mouseover, or could "fly in" or scroll in from off screen when tapped/mouseover, so as to be as unobtrusive as possible. This manner of providing a smart router interface in the traffic stream is further described at FIG. 41, step 810 and accompanying description below.

Remote Access as Secure Proxy

Figure 24:
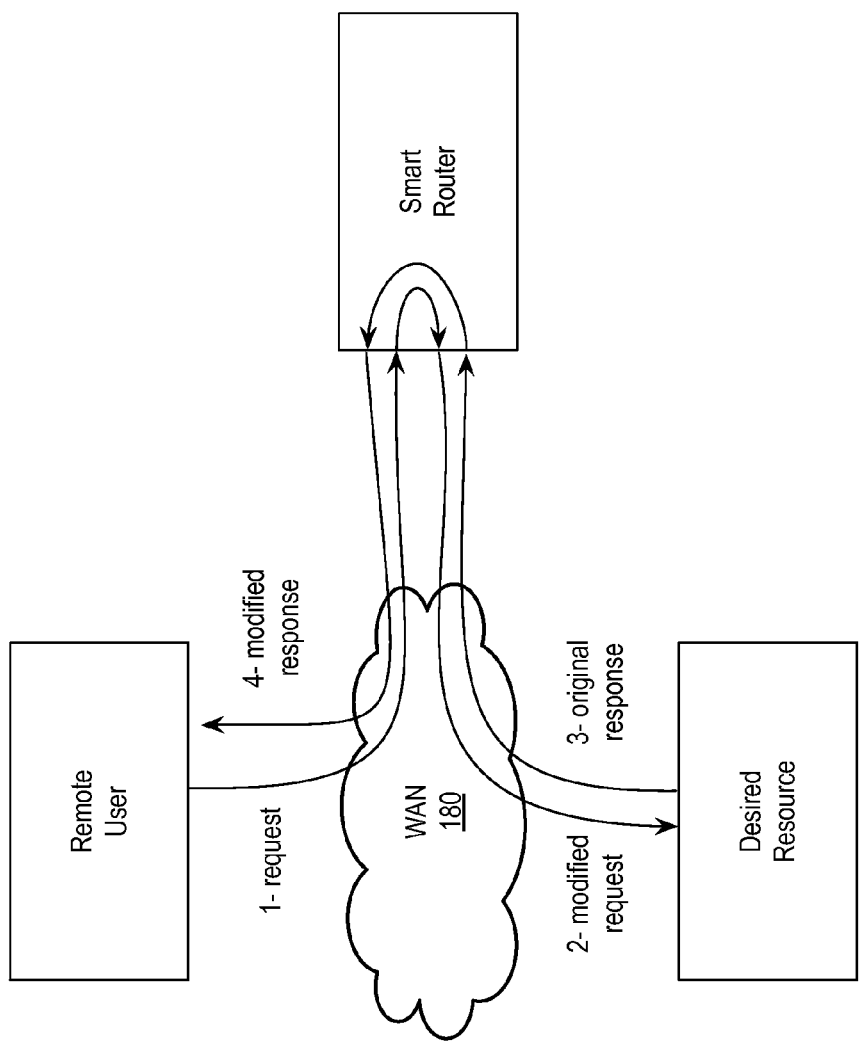
FIG. 24 is a schematic view showing a remote user accessing the smart router over the WAN, and utilizing the smart router to access a stored internet session and retrieve a desired resource from the WAN, via the smart router, and return the resource to the remote user.

Referring to FIG. 24 below, since the smart router is secure in transport and can maintain identities as well as session and cookie data, the smart router may be accessed even by users in remote locations, in order to provide these benefits to the users' network communications. Thus, it may be desirable to access the smart router as a "proxy" even when the user is physically remote. Requests from the user can be modified to mask IP addresses, add or delete session information contained in the router, by the smart router acting as a proxy.

Multi-Hop Secure Remote Access

Figure 25:
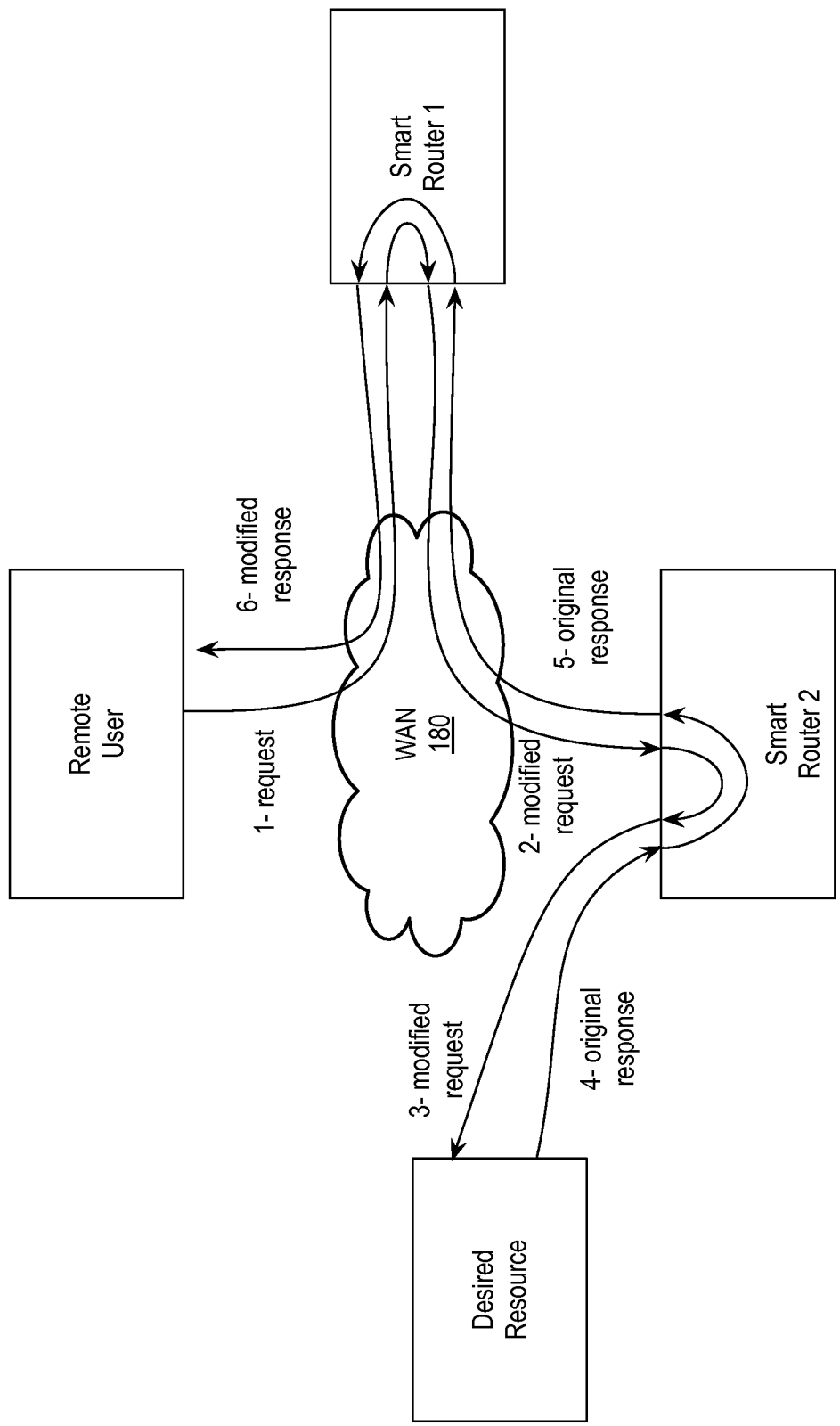
FIG. 25 is a schematic view showing a remote user accessing the smart router via the WAN and retrieving a desired resource through a peer router of the smart router.
Figure 27:
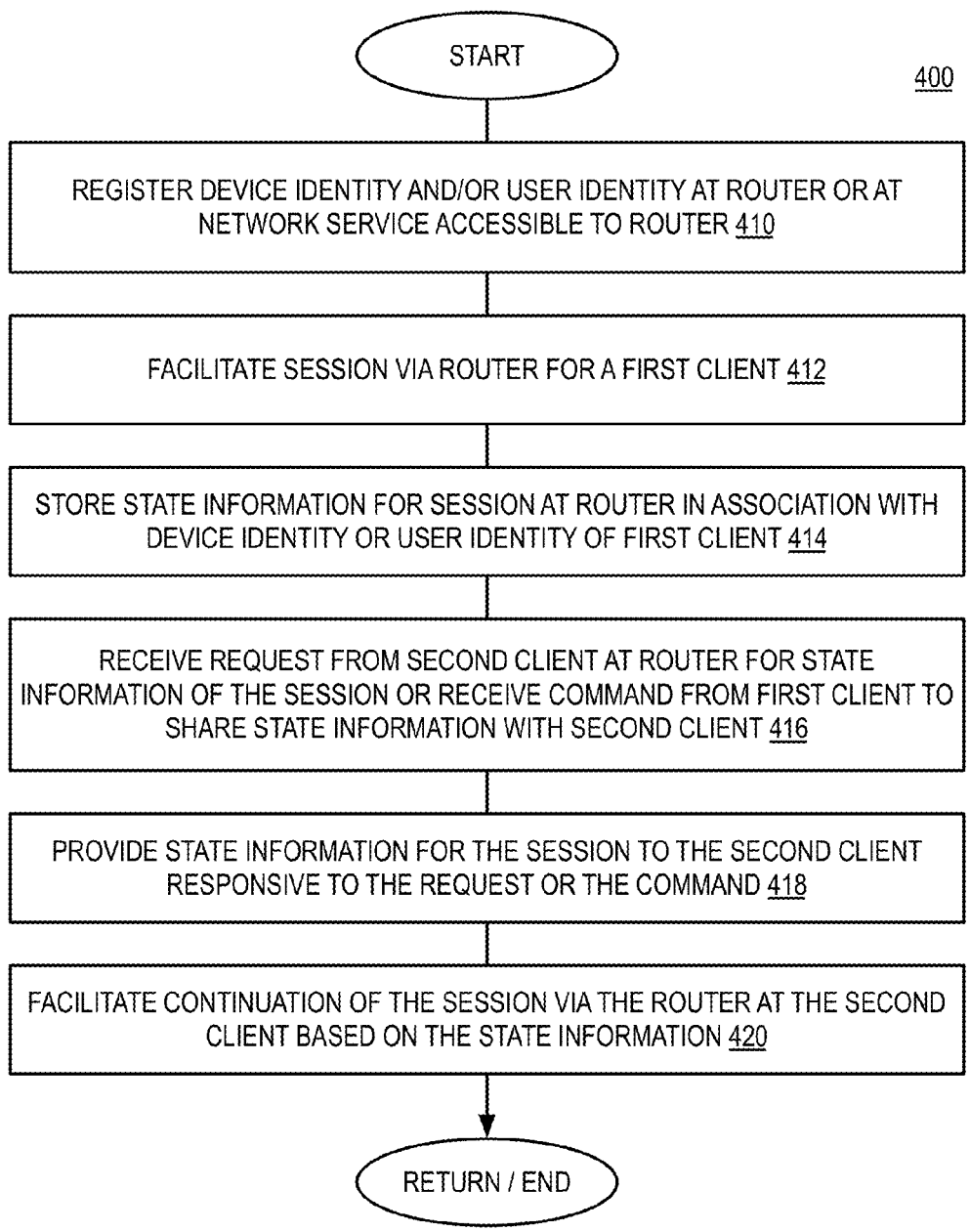
FIG. 27 is a flowchart illustrating a method for sharing state information between two client devices via the smart router.

Referring to FIG. 25, in a further implementation, a smart router 1 may decide to use one or more additional smart routers to route around bad WAN stretches, to pass or other obstructions, to further obfuscate the true IP of the client requesting the network resource. To this end, smart router 1 may choose to employ a plurality of other smart routers (for example, many dozens or hundreds) to send and receive WAN traffic. The other smart router used could be changed periodically, or a) on a request by request basis, b) after a predetermined number of bytes sent or received, c) in response to predetermined latency and performance thresholds as compared to measured latency and performance.

Securing ARP and DNS

On LAN-connected clients, ARP and DNS are subject to impersonation. A smart router may add security layers on top of these protocols. For example, clients connected on the smart router LAN could periodically issue application layer challenges to other clients and to/from the smart router itself to ensure that those devices are who they say they are. One example of a challenge could be to recall the packet with a particular sequence number, and hashing that with a preshared secret. In this way, the queried device would have to both maintain a history of conversation with other devices, and be able to present a preshared key. Devices spoofing or impersonating the identity of others would not be able to respond with the correct data, and their rogue nature could be revealed. Additionally, once the challenge is passed, a new shared secret can be agreed upon, mitigating risk of secret leakage. In this way DNS may be more secure and ARP more trusted.

Obfuscation of Destination Address to HTTPS

If the client device is communicating with a router over an open network, the TCP/IP data is visible to all eavesdroppers, even if the eavesdropper is not authenticated. This means that even though a client may have its Layer 7 Application data encrypted with SSL/TLS with origin servers, the destination address is visible to eavesdropping programs such as packet sniffers.

To overcome this problem, we propose that when a request is received the smart router resolve the DNS to itself. The client device will send all traffic to the router and the destination IP of packets will be router. The Real IP address is therefore not observable by packet sniffing programs. To accomplish this, the smart router maintains a table of client source IP addresses and ports, and corresponding real destination IP addresses and ports. Alternatively, the smart router may upgrade all traffic to HTTPS connections, and use the HTTP "Host:" header to determine where to send the requests.

Device Fingerprinting and Identifying Rogue Clients

Routers often identify clients by MAC addresses, which are easily spoofed. As such, current routers are unable to detect if connected MAC addresses are legitimate, or if they are forged MAC addresses coming from rogue clients. To combat this threat, the smart router may maintain a historical table for each client that is used in positively fingerprinting clients.

For example, while MAC addresses are easily spoofed, it is significantly more difficult to for rogue clients to use TCP sequence numbers that mimic those coming from the legitimate client. A legitimate client may have a longer lasting connection with the router, and may be at a higher TCP sequence number than a newly connected rogue client.

The smart router keeps a historical table to record expected sequence numbers for each of the connections, and can take action if the sequence numbers vary from the expected values. An illustration of an entry in such a historical table is provided in FIG. 26. The smart router might refuse service, force a client to renegotiate or re-authenticate itself, via a password, by sending a secret via Bluetooth data, or some other manner.

Every TCP packet from each client contains a timestamp. The minute fluctuations between timestamps, known as "timestamp skew" can be used as a signature to determine a unique client. The smart router may be configured to keep a historical record of the actual timestamp skew, and take action if the TCP timestamp skew varies from the expected values.

FIG. 26 shows an entry in such a historical table, including entries for the outcome of TCP sequence number analysis and timestamp skew analysis.

Another method the Smart router may take to identify rogue clients on the network is to send ICMP ping or ARP request to a MAC address that is known to not be connected to the network. If any device responds to that request, the smart router can suspect a rogue client on the network who is listening to traffic in with the WiFi/Ethernet interface set to promiscuous mode.

Advanced attackers may take additional steps to penetrate the network. Rather than just creating fake MAC and IP addresses, an advanced attacker might want to clone an existing MAC/IP he detects from the network. To combat this attack vector, the smart router may create a virtual MAC and IP address that simulates a legitimate client. The smart router would periodically send that virtual device programmatically generated traffic, which would be sniffable/detectable by rogue clients listening in. Any extra traffic using that MAC detected by the smart router would be known to be a rogue client. Additionally, the smart router may periodically send ARP requests and listen for replies that it doesn't generate.

Feature 3: Improved Usability Through Multiple Device Coordination

The smart router may capture state information for one client of the LAN to be shared with another client of the LAN, enabling coordination of multiple client devices. The following sub-features may be supported by the smart router: (1) cross device hand-off of user session state by the smart router to another device of the user, as illustrated above in FIGS. 2 and 21, (2) sharing of content from one client device to another client device of the LAN through the smart router, (3) data syncing between client devices with "profiles", and (4) each of these LAN activity outlined in (1)-(3) via a secure WAN connection, as described in Feature 2, FIGS. 24 and 25.

FIG. 4 is a schematic diagram depicting an example method 400. At 410, the method may include registering a device identity and/or a user identity at the smart router or at a network service accessible to the smart router. The device identity may be associated with a device group. The user identity may be associated with user credentials. Associating such information at a data store may enable the smart router to retrieve session information for a given client identifier and/or device identifier, or vice-versa. At 412, the method may include facilitating a session via the smart router for a first client. The first client may be associated with the device group and/or may be authenticated with the user credentials associated with the user identity. At 414, the method may include storing state information for the session at the smart router (or at a network service accessible to the smart router) in association with the device identity and/or user identity. At the 416, the method may include receiving a request from a second client at the smart router for the state information of the session. The second client may be associated with the device group also associated with the first client and/or the second client may be authenticated with the user credentials associated with the user identity. Alternatively, a user at the first client may initiate a command to the smart router to share state information with a second client operated by another user. At 418, the method may include providing the state information for the session to the second client, for example, responsive to the request or command. At 420, the method may include facilitating continuation of the session via the smart router at the second client based on the state information.

In some implementations, cross device hand off of user session state by the smart router from a client device to another client device of the user may be supported. Multiple devices owned by a user of the LAN may be registered with the smart router. When a user uses a browser program of a first client, the state information (e.g., browser session state and cookies) for that user are saved at the smart router. If, for example, the user discontinues or sets down one device with a set of browser windows open in multiple tabs, the state of those tabs may be saved at the smart router. When the user connects to the smart router with a second device and launches the browser, the smart router communicates the same tabs to the second device, and coordinates cookie proxying so that the cookies are transmitted to the second device. Thus, a user browsing a webpage for products on a first device wouldn't necessarily be required to re-login with a userID and/or password on the second device in order to purchase the products via the second device. Instead, the user could push a button, browse to the smart router to pick up, or just be configured to "continue sessions". Some or all of the states of the browser windows would be accessible on any device. A user watching a broadcast television stream on a first display device wouldn't have to remember the address/channel when picking up the same stream at a different display device. If the cookies saved the user's state, the user could easily resume at the same place the user left off at via the second device.

Figure 28:
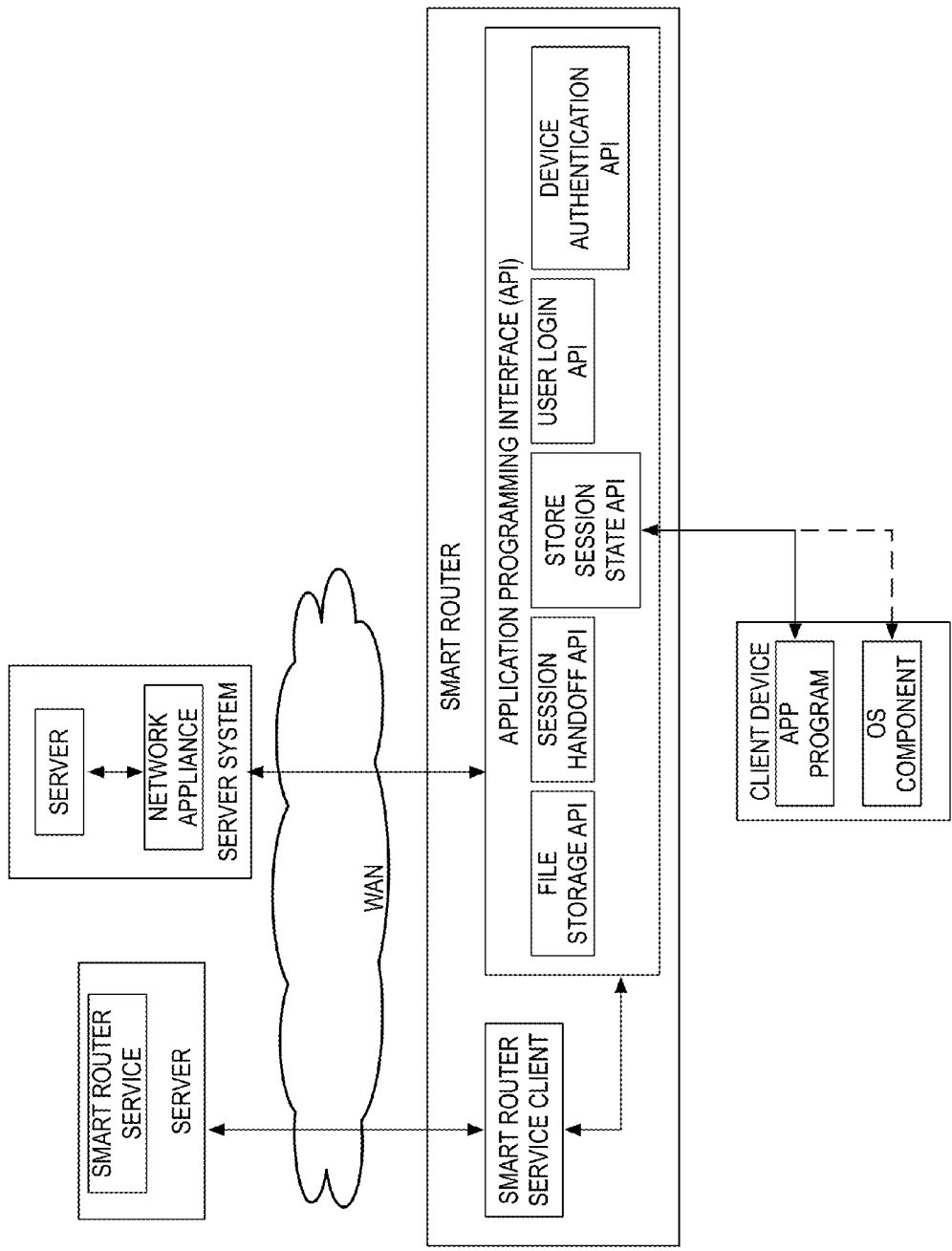
FIG. 28 is a schematic view of an application programming interface (API) executed on the smart router.

As another example, software applications could maintain state across devices via the smart router. The applications do not necessarily speak HTTP, but the applications may access APIs on the smart router that allow different devices to "report" their state, and "access" the state of other devices that the user has been interacting with. In effect, a bundle of such APIs in a smart router may take the form of an OS for the home, where each client device may be a registered, trusted device, used by an authorized user, and may be integrated with other client devices of the user or associated with each other via the smart router. One goal is to achieve seamless user experience online and in media consumption even with the reality of device proliferation. One example of such as API set on the smart router is shown in FIG. 28 below. In the illustrated example, an application program or OS component on each client device may be configured to communicate with an API on the smart router, such as a file storage API, session handoff API, store session state API, user login API, device authentication API, etc. The APIs may handle operations performed on the smart router, such as storing a file, storing session state, handing off a session, logging in a user to the smart router, or authenticating a device to the smart router. Other APIs may also be provided, such as a prefetch API, device data sync API, etc. The APIs may also in some instances interact with cloud services by communicating with a server and/or network appliance of a server system via the WAN. For example, a file may be stored local on the smart router and also backed up in a cloud based storage location. As another example, the APIs may also communicate via a smart router service client on the smart router with a smart router service across the WAN, and send/retrieve smart router user profile data, etc. that may be used for user login for example. Various other APIs may be provided to provide enhanced functionality directly from the smart router and/or from the smart router combined with cloud based servers.

In some implementations, the smart router may enable sharing of content from one user to another user through the smart router. In addition to enabling a user to drop one device and pick up another, and resume a browsing session with the same session state, or resume using an application on the second device with the same session state, the smart router can enable multiple users to share links and content with each other through the smart router. For example, if one user wants to share information with another user of the LAN, the user can select a pop up interface on the client device (or navigate to a locally served web interface hosted by the smart router) or push a notification to the other user's device via the smart router.

As one example, a user could navigate to a well known URI, or capture DNS. As another example, a user could enter a malformed, but easy to remember URI in the browser address bar (such as "ROUTER" or "SHARE"), and the smart router could intercept the DNS query and interpret it as a SHARE command, then serve a SHARE interface back to the mobile device that would enable the user to share information with another user of the LAN.

The smart router can be configured to listen for names, and serve interfaces in response to the SHARE request from the client device. For example, the smart router may be associated with a number of functions, such as "SHARE", "SETTINGS", "PICKUP SESSION", etc., and each one causes a different functional interface to be displayed by the smart router at the client device. The SHARE interface may include a list of other connected client devices, and the user may select a client device with which to share a link. The smart router may be configured to insert a notification for that user in communication stream to enable sessions to be maintained. This could also be implemented as browser buttons.

In some examples, the smart router may enable data syncing between devices with "profiles". Device "A" may belong to a user, and may have applications, media content, and session state information stored thereon. The user may purchase Device "B", and configure it with the applications, media content, and session state information of Device "A" via the smart router based on the user's profile maintained at the smart router. A second may login to Device "A" under another profile to enable the application, media content, and session state information associated with the second user to be accessible at Device "A" via the smart router.

In some examples, the smart router may utilize a MAC address of a client device as a device identity. As discussed above, the smart router may have user accounts that correspond to user identities. The smart router may enable users to name client devices. Client devices may be registered to one or more users at the smart router.

Figure 29:
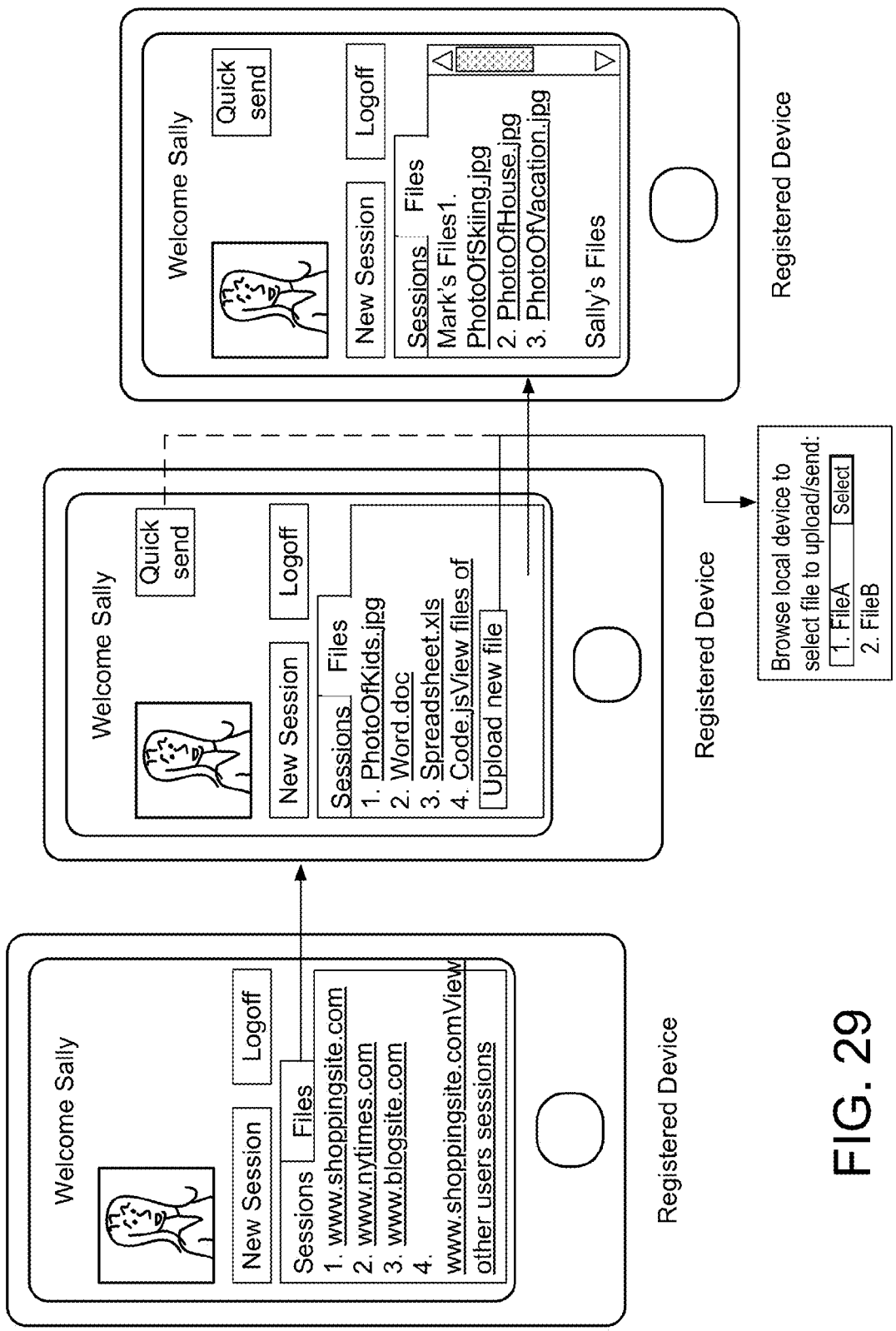
FIG. 29 shows screens of a client device illustrating storing, accessing, and sharing files between users via the smart router.

FIG. 29 illustrates graphical user interfaces of served by the smart router to client devices, for use in sharing files between two different users of different client devices. In the figure, user Sally logs on to a router interface, which has a session tab containing the existing sessions list described above, and a file sharing tab. Selection of the file sharing tab displays a list of files that user Sally has uploaded from her devices to be stored on the smart router or in a location accessible to the smart router, and which are associated with her user profile on the smart router. Selection of an "upload new files button" causes a window to be displayed by which the user may select a file to upload. Pressing the "quick send" button causes a similar window to be displayed, by which the user may select a file to send to another user. Uploaded files are typically saved in the user's profile on the smart router, while "sent" files are sent to other users via email or sms or other similar transfer means, or are directly uploaded into another user's file store on the smart router. To view files uploaded by other users, Sally may select a "view files of other users" link, upon which the files of all registered users are displayed.

Figure 30:
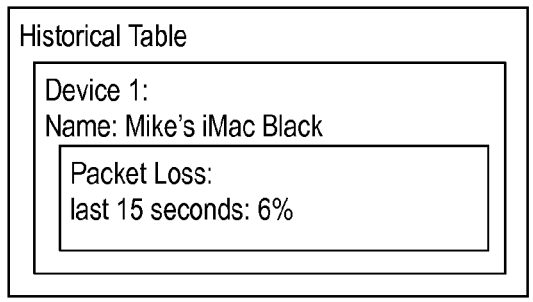
FIG. 30 is another schematic view of historical data stored at the smart router, including packet loss for a client device.

FIG. 30 depicts a historical table for a client device, with packet loss measured over a predetermined time interval, in this case the previous 15 seconds. The measured packet loss is 6%. This may be displayed to a user at the mobile device via a router GUI element displayed on a screen of the mobile device. In addition, statistics such as WLAN packet loss, RTT, etc., may be used to throttle the traffic sent the mobile device to a slower rate, for example, by adjusting a parameter such as the TCP congestion control window for the device. In addition, for mobile devices experiencing packet loss, the smart router may attempt multi-hop wireless routing through other peer mobile devices or smart routers arranged in a mesh network, to route around the cause of the packet loss.

Feature 4: Prediction of Link Traversal and Pre-Fetching of Content

Since the smart router may observe or monitor ALL traffic that is passing through it (within the LAN, between the LAN and the WAN, or within the WAN), is in the ideal location to report behavior and activity (e.g., of local users) and/or the state/performance of the various networks accessed. The smart router may execute local prediction algorithms, or by sharing that data with a cloud service, and/or with peers, can compute and access large-scale real-time predictive models, that formulate a prediction about what links are likely to be traversed on a downloaded web page by a user, or what network-accessible content is likely to be requested by a user. The smart router may pre-fetch linked content to be stored at the smart router for nearly instantaneous presentation to the user upon subsequent selection of the link.

Figure 31:
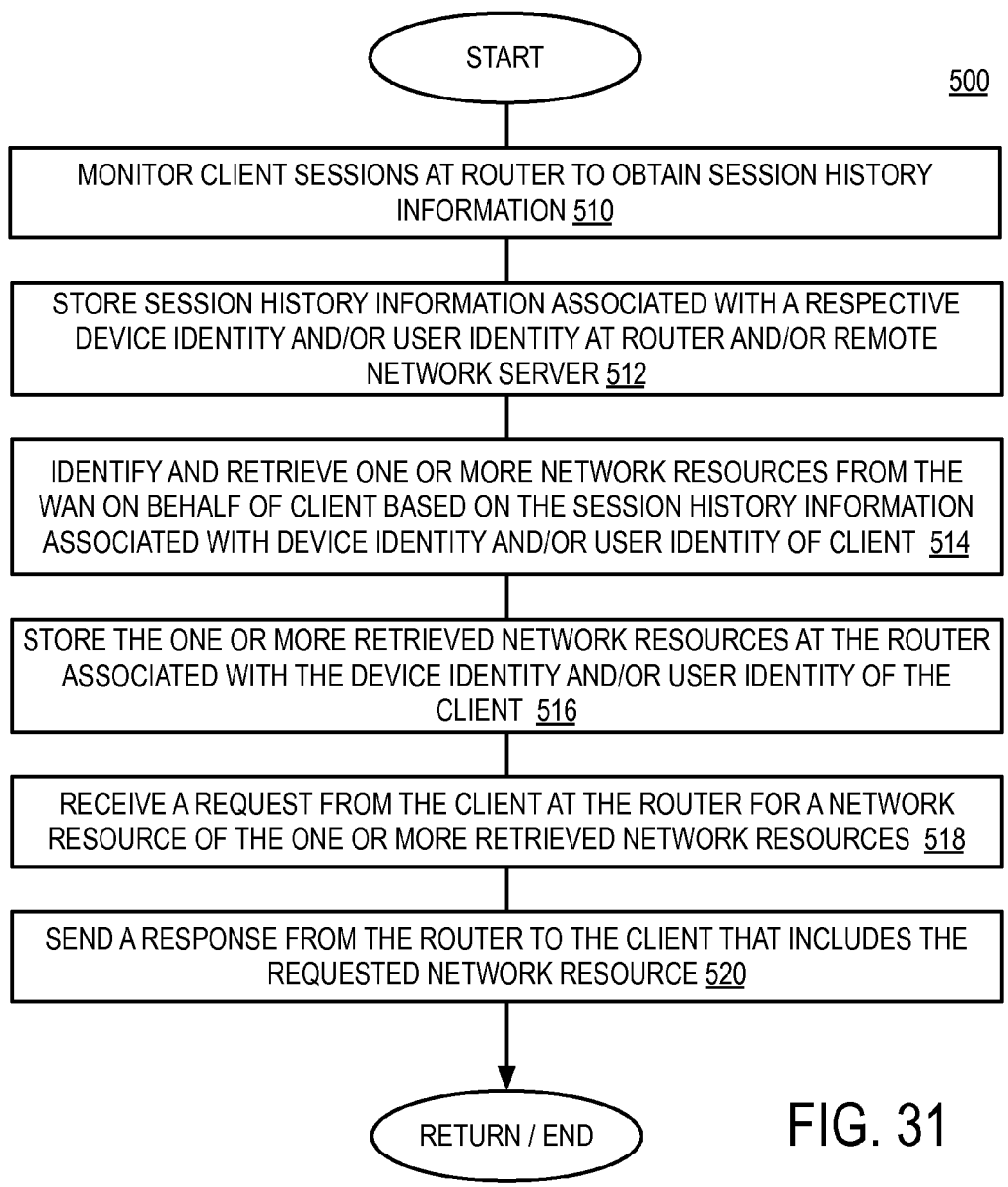
FIG. 31 is a flowchart illustrating a method for pre-fetching content at the router based upon session history information.

FIG. 31 is a schematic diagram depicting an example method. At 510, the method may include monitoring client sessions at the smart router to obtain session history information. At 512, the method may include storing session history information associated with a respective device identity and/or user identity at smart router and/or remote server device. At 514, the method may include identifying and retrieving one or more network resources from the WAN on behalf of the client based on the session history information associated with the device identity and/or user identity of the client. At 516, the method may include storing the one or more retrieved network resources at the smart router. The retrieved network resources may be associated with the device identity and/or user identity of the client. At 518, the method may include receiving a request from the client at the smart router for a network resource of the one or more retrieved network resources. At 520, the method may include sending a response from the smart router to the client that includes the requested network resource.

In some examples, the smart router sends the request URL to the cloud service at approximately the same time as the target server, and receives back from the cloud service a probabilistic click map for the downloaded page. The probabilistic click map may represent the probability of the user clicking on a given link.

In some examples, some or all of the content that is retrieved (pre-fetched) by the smart router may be obtained from peer smart routers so that the load on the origin servers is not increased or is increased by a lesser degree. The probabilistic click map may be based on actual user clicks (e.g., requests) reported from various other peer smart routers.

In some examples, a user may define a set of other users for which their network activity is to be reported to the user's device for the purpose of enabling onboard prediction and/or prefetching of information. A cloud service of the WAN could be replaced or augmented by the set of peer clients (e.g., a list of my favorite "200 P2P friends") who will report to the smart router and/or other clients what they are clicking on, so that the client and/or the smart router can perform the prediction. As one example, click information for the top 100 internet sites or top paying sites may be reported. Alternatively, the type of information that is reported may be personalized for each user according to location, day, time of day, session length, and behavior of others. This information (e.g., probabilistic map) may be used to inform the user or the user's client device which are the hottest pages of the Internet right now. As one example, a browser program at a client may expose a selector or control feature to a user to enable the user to obtain reporting from other clients.

Pre-fetching of content may also enable improved battery performance in client mobile devices. Mobile devices left unplugged can exhaust their battery reserves in a short amount of time. While processor operations of a mobile client device consume some power, a large power drain on mobile client devices is wireless communications, including Bluetooth, WI-FI, 3G, 4G, etc. The smart router, on the other hand, is plugged in to a power source such as a wall outlet.

An additional option could be presented to the client user to "join known wireless networks when awake." Under this option the mobile client device would shut down the wireless connection or enter a sleep mode when the mobile client device goes to sleep. Additionally, the smart router may be configured to prefetch content while the mobile device is asleep, and the mobile client device would get the content from the smart router when it is awakened. Thus, when the mobile client device is activated, the wireless connection would be reestablished with the smart router, and the prefetched content would be more downloaded quickly from the smart router when the mobile client device is awakened. This would prevent or reduce wireless communications based power drain at the mobile client device (e.g., during non-use).

Figure 32:
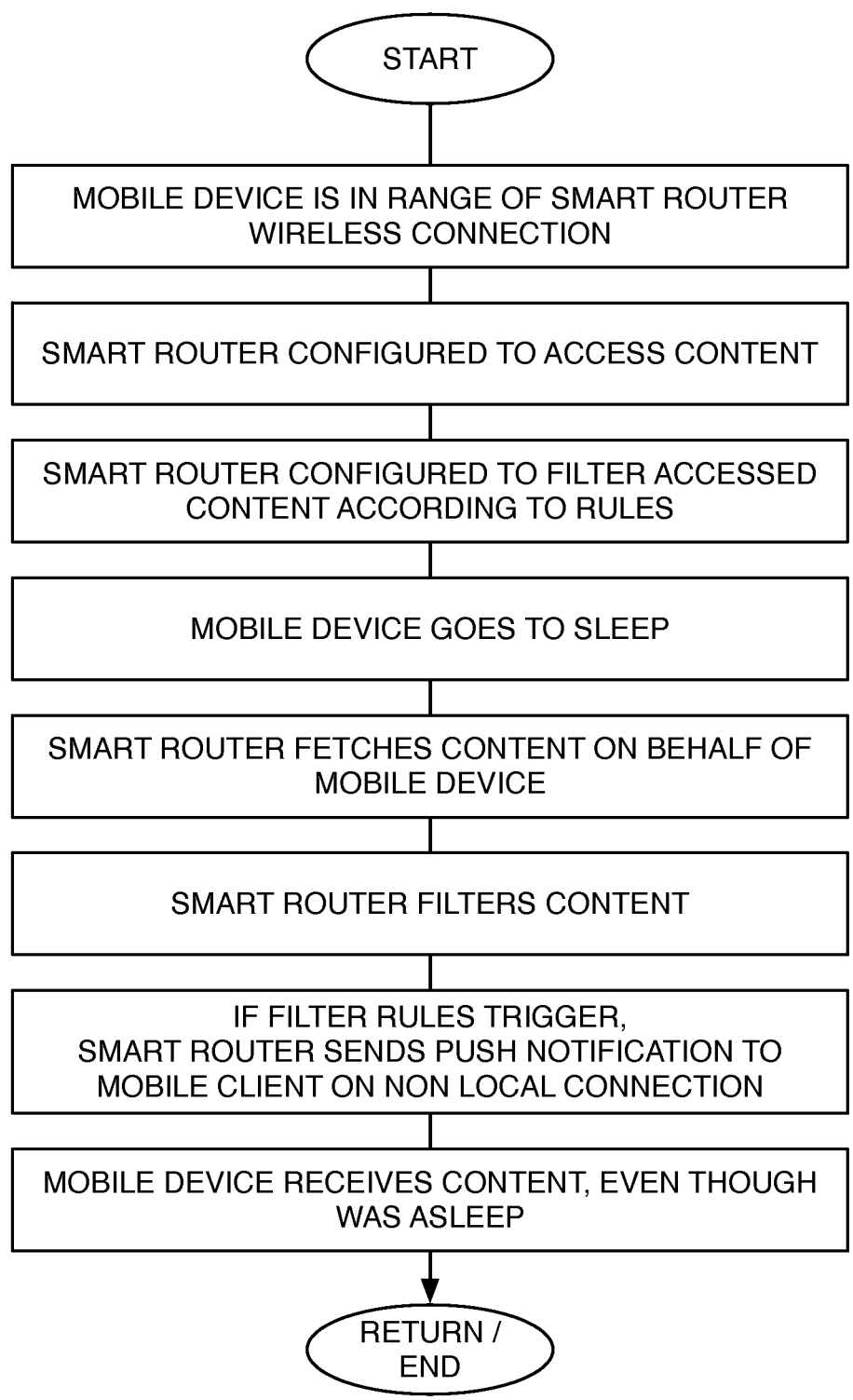
FIG. 32 is a flowchart illustrating a method for fetching content at the router on behalf of the client device when the client device is asleep, and if the fetched content matches filtering rules, notifying the smart router of the arrival of the fetched content by sending a push notification on a non-local connection.

Furthermore as shown in FIG. 32, the smart router may be configured to prefetch content while the mobile device is asleep, filter the received content, and push a message or notification to the mobile client even though it is sleeping. This can be achieved as follows. During a configuration phase, the smart router may be configured upon detecting that the mobile device is in range of the smart router wireless connection, to access content over the WAN on behalf of the mobile device, and filter accessed content according to predetermined rules. Then, when a mobile device in range of the smart router goes to sleep, the smart router may prefetch content on behalf of the mobile device from remote servers over the WAN, filter the content, and if a filter rule is triggered then send a push notification to the mobile client device on a non-local (non-WLAN) connection, such as a SMS message, push email, or other proprietary push technology. The mobile device may be configured to receive the content event though it was asleep.

Feature 5: Creating and Updating Congestion Maps for Smarter Routing and Faster Access to Remote Content Through P2P Communication with Other Smart Routers In some examples, the smart router can access a cloud based congestion map available from a service of the WAN. The smart router may obtain information from the congestion map to enable better routing decisions for a client of the LAN when accessing resources of the WAN. As one example, a smart router may utilize other peer smart routers or super peers as intermediate links to a network resource of the WAN.

The smart router can establish peer to peer connections with other smart routers or devices, for example, in response to requests received from clients of the LAN. These peer to peer connections can be used to retrieve data from peers, and to establish communications channels through peers to the requested resource of the WAN. The smart router can retrieve data such as cached content and access stats/net congestion info from other peer smart routers. Conversely, the smart router may serve as a link or gateway for other peer smart routers. In this way, the smart routers can act as a distributed cache managed by a super node, a cloud service, or each node itself in a distributed state machine type control algorithm.

Figure 34:
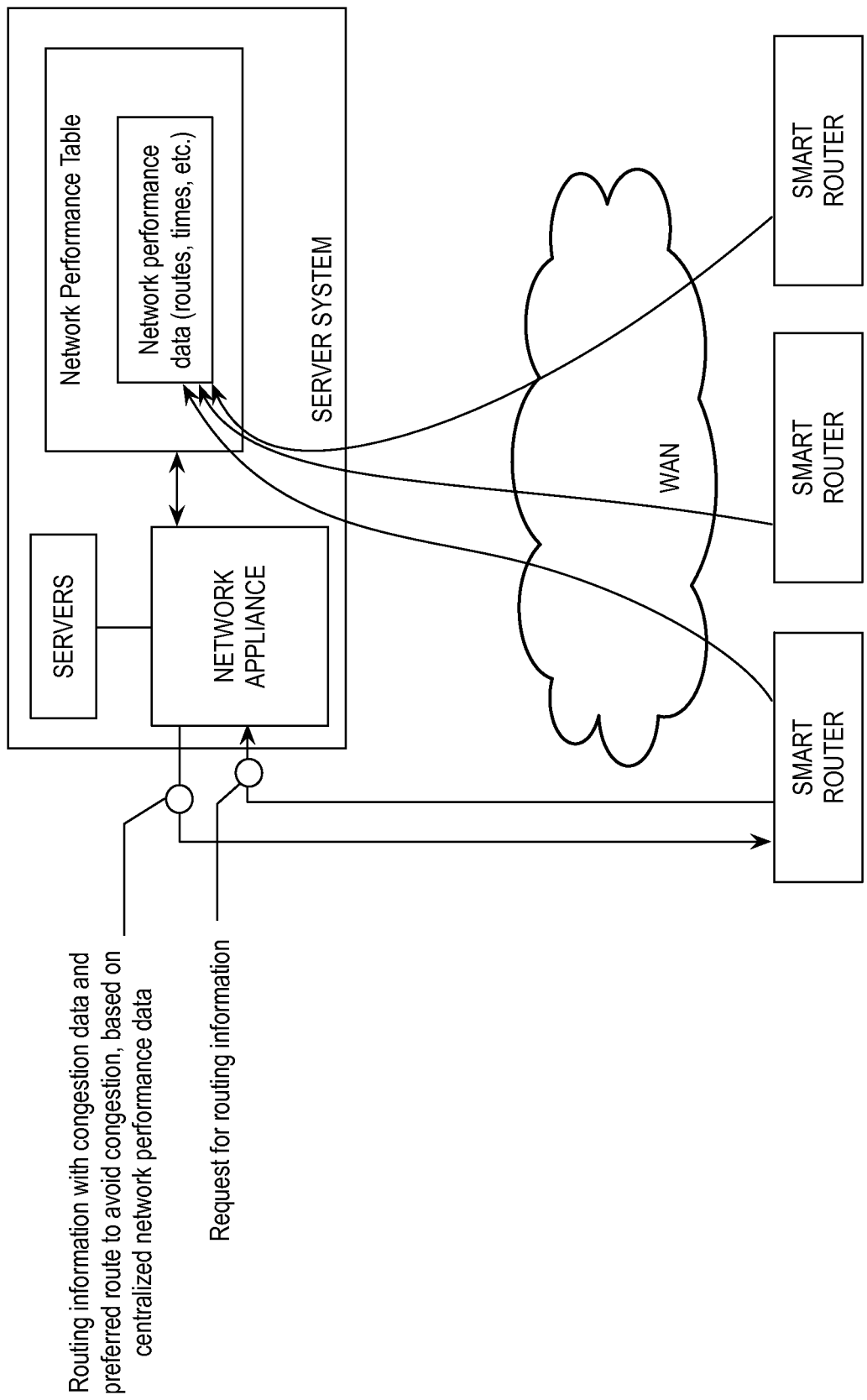
FIG. 34 is a schematic diagram illustrating a first smart router sending a request for routing information to a server, and receiving routing information based on congestion data and preferred route to a particular resource, as computed by the server based upon network performance data received from multiple other smart routers across the computer network.

Referring now to FIGS. 33 and 34, in addition to gathering information from peers and a cloud service, the smart router can interface with a network device such as a smart load balancer (such as the network appliance in FIG. 2) near the origin server to achieve active routing.

In order to participate in active routing, the smart load balancer may keep a table of network performance, from all the clients connecting to that network resource.

When the smart router requests a network resource that includes a smart load balancer, the smart router may modify the request so a smart load balancer can sense compatibility.

The smart load balancer may then compare the performance of the currently connected smart routers and suggest to any of them alternate smart router peers to connect to for faster network communication by routing around spontaneous or known choke points. While the centralization of network performance data is shown at a network appliance proximate the destination server in FIG. 34, it will be appreciated that in some embodiments this information may be collected at a smart router service (as shown in FIG. 2) executed on a server on the WAN, not proximate to the destination server, and routing information may be requested and received from the smart router service.

The smart routers can also route around network congestion using the access stats/net congestion information. The peer to peer channels can also be used as communication channels to provide another path out to the Internet, which can be used for emergency failover, prefetching on unused bandwidth, or for maximizing parallelism of connections outbound to the WAN.

Improved cross device data aggregation with user authorization may also be supported by the smart router. The smart router, since it is a choke-point for user communications from potentially multiple client devices of the LAN, can aggregate data about user sessions from those multiple devices into meta-session data, and report the aggregated data to a central service of the WAN (e.g., with user authorization). The aggregated data may include information relating to or indicating the networking activity, browsing history, detected or imputed location of the client device, etc. of the user across the multiple devices operated by the user.

Figure 35:
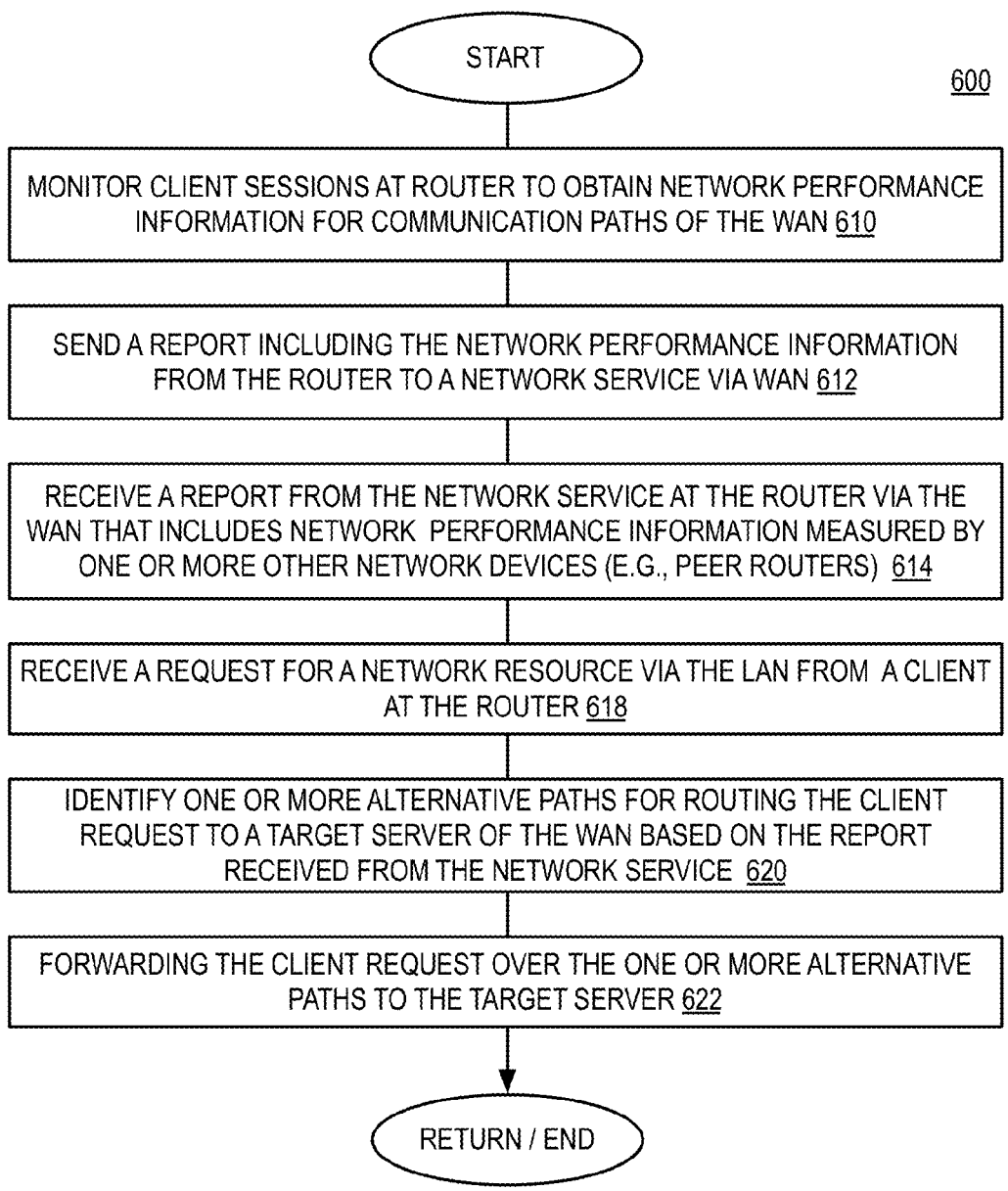
FIG. 35 is a flowchart of a method for ascertaining network performance based on information received from multiple smart routers, and providing reports to a requesting smart router to enable the requesting smart router to avoid network congestion.

FIG. 35 is a schematic diagram depicting an example method 600. At 610, the method may include monitoring client sessions at the smart router to obtain network performance information for communication paths of the WAN. At 612, the method may include sending a report including the network performance information from the smart router to a network service via the WAN. At 614, the method may include receiving a report from the network service at the smart router via the WAN. The report may include network performance information measured by one or more other network devices (e.g., peer smart routers). At 618, the method may include receiving at the smart router, a request for a network resource from a client via the LAN. At 620, the method may include identifying one or more alternative paths for routing the client request to a target server of the WAN based on the report received from the network service. At 622, the method may include forwarding the client request over the one or more alternative paths to the target server. The one or more alternative paths may include paths routed through one or more peer router devices of the WAN. In at least some implementations, an alternative path may be selected by the smart router to reduce network latency experienced by clients.

In some implementations, multiple hops among intermediate peer routers or devices may be defined by a multi-point TCP termination model that operates with end-to-end SSL. This termination model can define how decisions are made among the multi-hop devices, how smart routers communicate with each other, how they decide to become and stop being the designated peers to un-hook.

When sending data via peer devices, the smart router may utilize various privacy schemes to ensure that data regarding user identity and web browsing history is hidden from a user of the peer device. For example, it may be possible for the smart router to route such data using techniques such as Tor (The onion router) routing.

To ensure that peer devices are not overloaded, peer bandwidth and processing capacity to handle traffic routed from other peers may be signaled to a central service or super node. Alternatively, or in addition, each peer may send an emergency signal out to other peers when it has reached capacity and is unavailable to receive new traffic.

A network of super peers might be designated from within peer client devices. For example, 100 peer devices might be defined in the U.S. and 400 around the world, which are tasked with a goal of enabling peer devices on the network to quickly of enabling routing decisions to quickly rout around bad transport links on the network.

Figure 36:
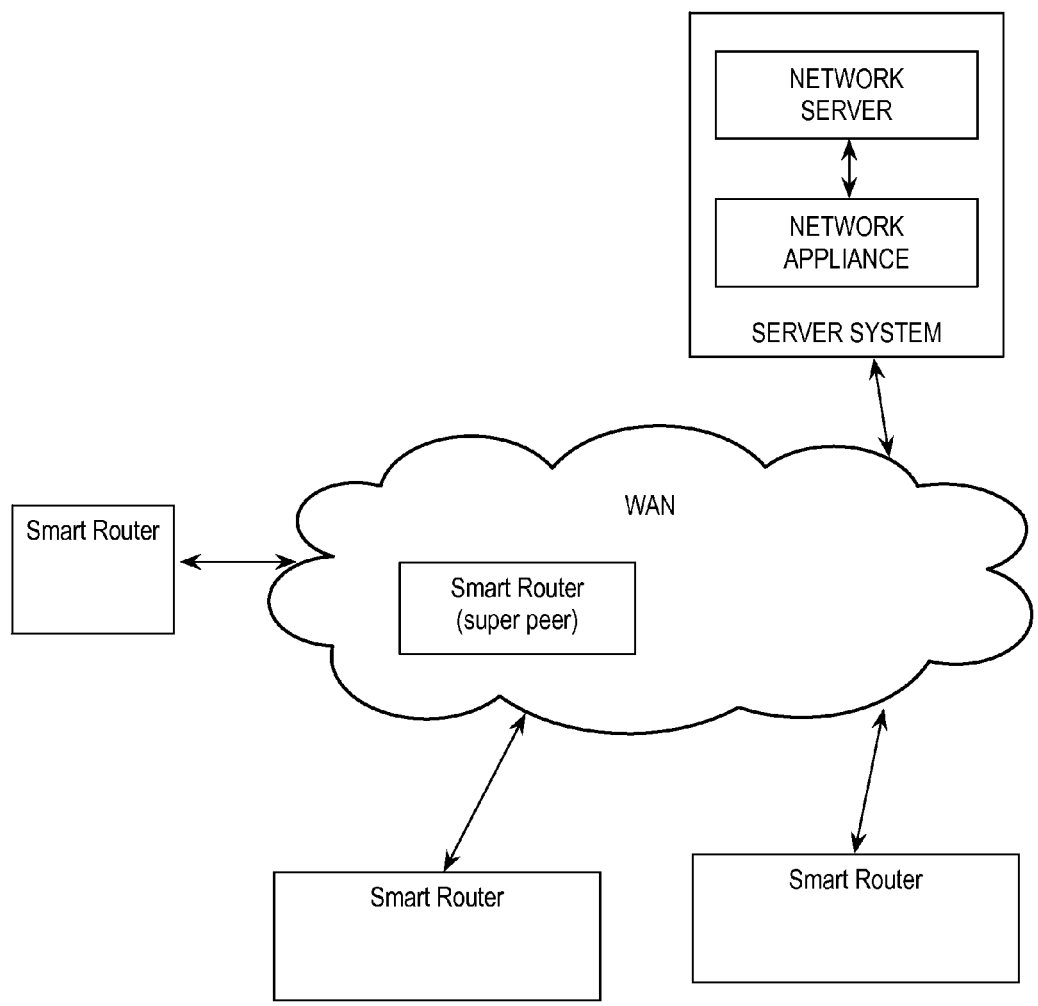
FIG. 36 is a schematic illustration of peer and super peer smart routers connected to the WAN.

As shown in FIG. 36, in some implementations alternative pathways to a particular resource of the WAN may be returned to the smart router in response to a DNS look-up. The smart router may ask the trusted DNS+ provider: what is the IP address of "site.com"? The DNS+ provider may return the IP address for "site.com", and one or more suggested pathways to that resource which route around bad links or intermediate network devices.

An example follows.

Client sends a request for DNS for dell.com on port 53.

Smart router receives the request, and sends a request to a host server over SSL (not port 53).

Smart router receives IP+routing map+health information.

Smart router returns gateway IP to client.

Client device begins downloading web page data via gateway IP address.

Smart router serves interstitial page/message area with download progress, health, routing around info.

Client device fully downloads and displays web page.

Interstitial/message area page closes.

Figure 37:
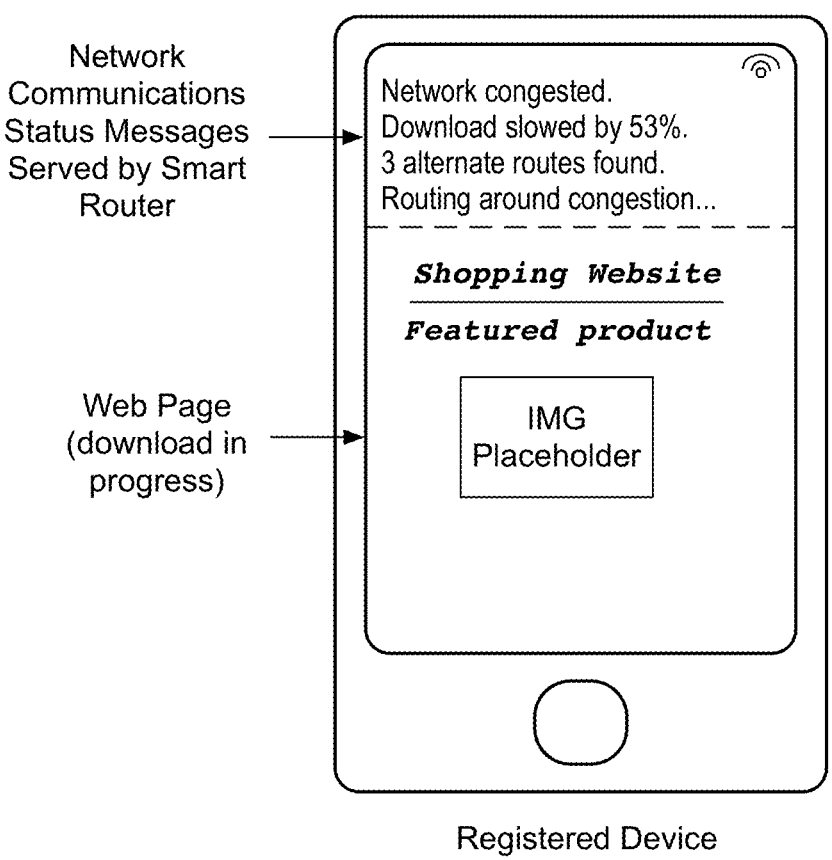
FIG. 37 is a screen of a client device with a message displayed to a user indicating that the smart router has detected network congestion and is routing around the congestion.

As the client device retrieves the destination web page from the destination server, via the gateway IP, an interstitial page served by the smart router may displayed on the client device, where the download time is estimated to be above a predetermined threshold. The interstitial page lets users know that the smart router system is working to download slow web pages faster, and provides the user updates with download progress, network congestion information, routing around info, etc. As an alternative to presenting such network communication status information in an interstitial page, the smart router may be configured to display such information via a message area in a pane, overlay, or other portion of the display of the client device, proximate the display of the web resource as it is downloading, as shown in FIG. 37. The real requested page loads as it becomes available. The interstitial page may alternatively be a semi-transparent window over the real page, or may be a pop up over the real page, etc. An example interstitial window might display the following messages "Dell.com is available."

"Estimated download completes in 15 seconds."

"Network congestion slowing download by 53%."

"3 alternate routes found."

"Now routing around congestion."

"Estimated download completes in 3 seconds."

"Download completed."

Figure 38:
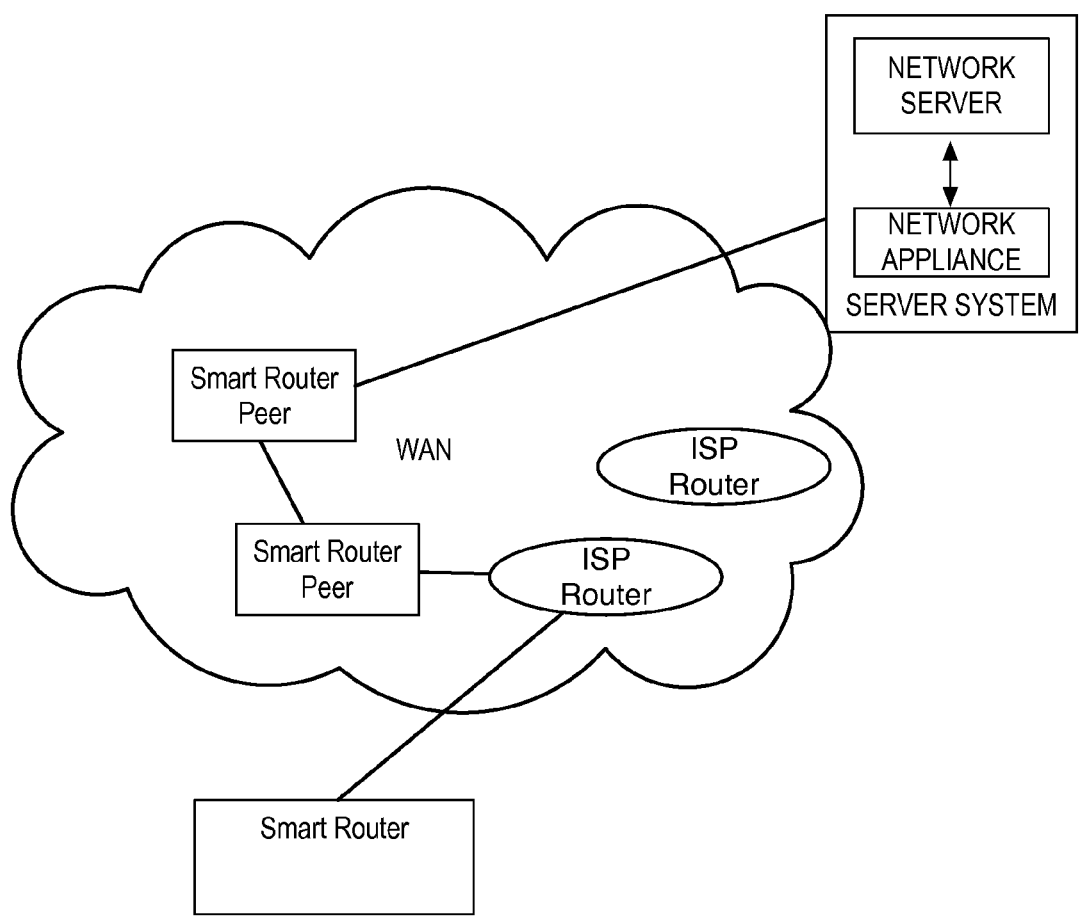
FIG. 38 is a schematic illustration of routing traffic through peer routers to avoid congestion.
Figure 39:
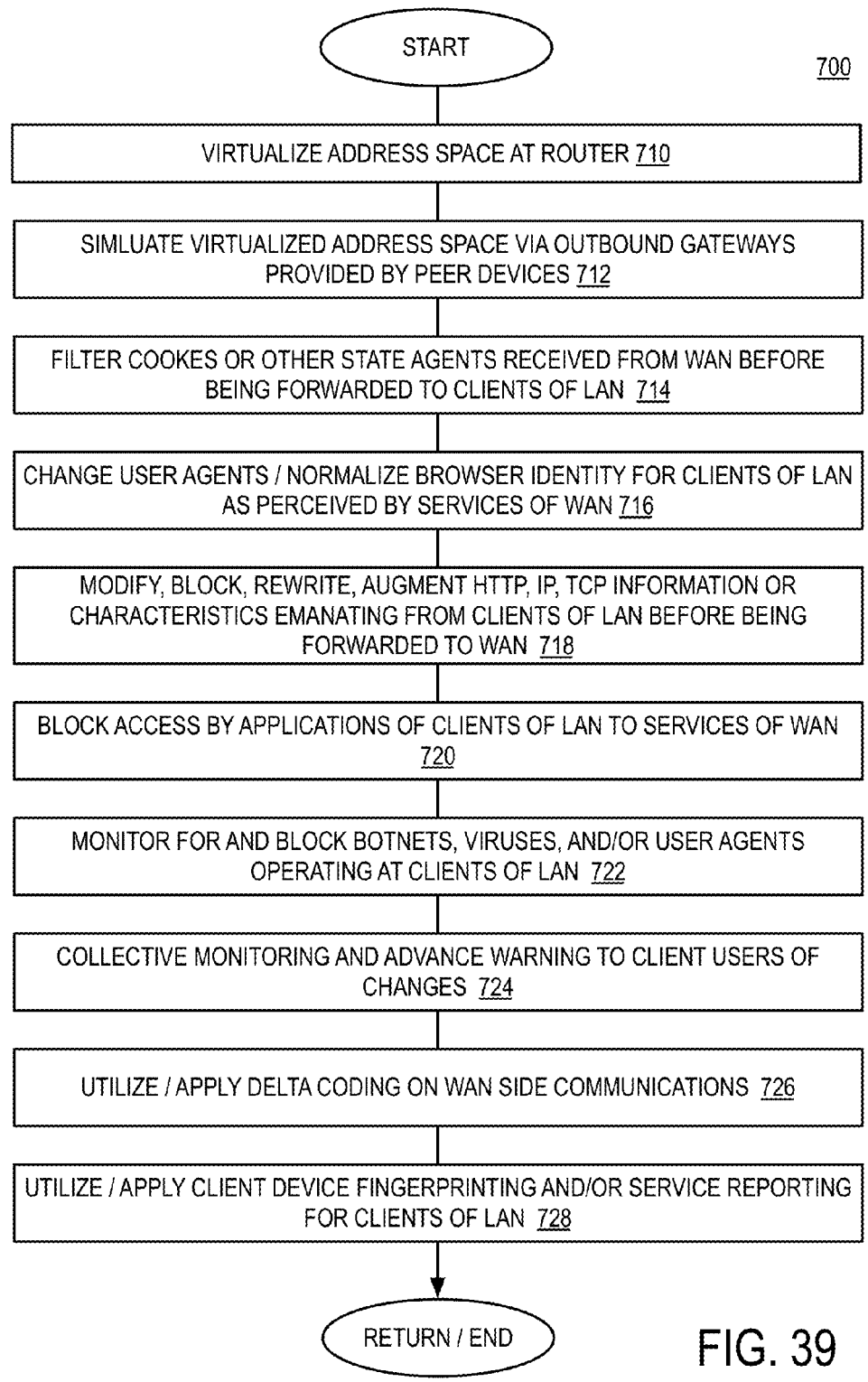
FIG. 39 is a flowchart illustrating a method for enhancing the privacy of communications traveling through the smart router, including virtualizing address space filtering cookies, and otherwise modifying the traffic flowing through the device to increase the privacy of the communications.

As shown in FIG. 38, in some implementations, the smart router may accept connections from other peer routers (e.g., as verified via an associated cloud-based service of the WAN). The smart router may shuttle the encrypted traffic received from other peer routers to the next location of the WAN. A peer router may (e.g., for Onion Routers) take a complete IP packet [SRC_IP, DST_IP+Data] and encrypt it with forward encryption. Each router may receive a message that appears to originate from the previous hop. When it finally reaches the origin server, the origin server identifies the packet as originating at the last peer router in the chain. Each peer router in the chain doesn't know the true destination of the message, but rather only one step back in the chain where that peer router received the message. In other words, once a packet passes through an intermediate peer router, the sender's identity is masked. For example, a smart router may receive a message from a peer router, and may unwrap the message received from the peer router.

In some implementations, the smart router may send a request out to the WAN over multiple paths to multiple peer routers at substantially the same time to determine the fastest network path over the WAN. To reduce or limit the amount of traffic carried by a particular peer router, the smart router may send out multiple simultaneous requests though different outbound paths for small sized data objects or with small byte ranges of larger data objects. The smart router may examine the responses received via these different outbound paths to determine which path returns the response more quickly. While a number of peer routers and/or hosts performed redundant work in fielding parallel requests, the requested data may be limited in size, to reduce overall impact to these peer routers and/or hosts.

Feature 6: Improved Security and/or Privacy for Clients of LAN

Data aggregation services such as the ChromeOS™, Google® Task Bar, GoogleDesktop™, ad network cookies, etc. may seek to obtain information relating to the identity, behavior, location, etc. of clients. The smart router may perform operations to make the clients of the LAN more opaque to data aggregation services of the WAN. The smart router may take the form of an L7 device operating at least at the application layer of the TCP/IP protocol suite to implement one or more of the features described with respect to FIG. 39.

At 710, the smart router may virtualize address space. The virtual addresses may be used to point a computing device of the WAN-side and/or a computing device of the LAN-side to a virtual network address. The smart router may associate any number of virtual network addresses with LAN addresses or WAN addresses. Thus, for traffic passing through the smart router, the smart router may virtualize address space by associating IP addresses of client computing devices on the LAN with virtual LAN-side network addresses and/or servers on the WAN with virtual WAN-side network addresses, such that each request made to servers on the WAN appears to the servers to originate from one of the LAN-side virtual network addresses, and/or such that each response received from the servers appears to the router device to originate from one of the WAN-side virtual network addresses.

At 712, the smart router may simulate virtualized address space by randomizing the selection of outbound gateways of the WAN used to access network resources of the WAN. For example, outbound gateways may include local peer smart routers, remote peer smart routers, or super peer devices. Local peer smart routers may include smart routers controlled by a common entity, customer, or person that are located at the same premises, such as two smart routers serving three client devices of a home or business. Remote peer smart routers can include smart routers controlled by other entities, customers, or persons at remote locations, such as a neighboring home or business. Super peer devices may include smart routers or other suitable networking appliances operated by a network service with which the local smart router is associated. For example, the entity that sells or supports the smart router may offer a WAN based service that enables additional functionality at the smart router. Super peer devices may have higher throughput capacity than local or remote peer smart routers.

At 714, the smart router may filter out cookies set by remote services of the WAN (e.g., such as ad servers or servers associated with application programs operating at the clients) before arriving at the clients of the LAN. As previously discussed, the smart router may terminate connections to enable deep packet inspection of communications between clients of the LAN and network services of the WAN.

At 716, the smart router may change user-agent information associated with a request from a client device. The user-agent information typically includes application name and version browser type and version, operation system information, and extensions installed with the browser and operating system. The user-agent information may be changed by, for example, normalizing, altering, or randomizing browser (or application program) identity to escape or reduce detection by services of the WAN. The smart router may terminate connections to enable further changes to the user-agents identity.

At 718, the smart router may perform other suitable operations or functions so that the TCP, IP, and/or HTTP characteristics of requests emanating from clients of the LAN on a back-end of the smart router appear different to the outside world (e.g., servers of the WAN), thereby cloaking the user in an additional layer of privacy.

At 720, the smart router may block predetermined applications operating on a client device from communicating with services of the WAN that are associated with those applications (e.g., startup, serial check, config data, etc). The smart router may block phone/voice applications from transmitting sensitive data (e.g., UUID) to services of the WAN.

At 722, the smart router may monitor communications between clients of the LAN and services of the WAN for botnets/viruses/etc. As one example, a service may be provided by the smart router that provides a periodic virus check of client devices or client communications. In at least some implementations, the smart router may insert user interface (UI) tracking information into communication sent to clients of the LAN to enable the smart router to identify UI state at the client device, user input and/or selector position via the client device. This information may be used by the smart router to determine whether viruses operating at the client device are initiating communications with the WAN as detected by communications received from the clients at the smart router that are unrelated to user activity. As another example, the smart router may track user agents and/or detect whether an application program or browser is currently operating at the client device. If the application program or browser is not currently operating, the smart router may block communications from client devices that appear to be from the application program or browser.

At 724, the smart router may improve security though collective monitoring and advance warning of changes. If devices (e.g., one or more smart routers) monitor, e.g., the DNS entries for a given host, a client can check with a monitoring service to determine whether a particular DNS entry matches what the monitoring service has observed from data obtained from the devices. If the DNS entry matches, the client can connect with increased confidence. A method for achieving this is described as follows.

At a monitoring server on the WAN, DNS entries are monitored for each of a plurality of hostnames. At the smart router a DNS query is received from a client computing device for a hostname. The smart router sends the DNS query to a DNS server, and receives a response from the DNS server, including an IP address for the hostname. The smart router then queries the monitoring server on the WAN for IP addresses associated with the hostname, and determines whether the IP address received from the DNS server matches an IP address for the hostname received from the monitoring server. If no match is determined, the smart router blocks access to the IP address received from the DNS server, or sends a warning message to the client computing device that connecting may be unsecure.

However, some hosts may change locations or services, or may otherwise make legitimate changes and obtain new IP addresses. These changes may confuse the monitoring service (e.g., "this new IP doesn't match our host records!") and cause the client users to be needlessly concerned. Hence, the hosts can publish information of pending changes, signed with their SSL certificate, or in another manner. In this way, the monitoring service can be aware of the changes in advance, and not surprised when such changes appear. This would enable hosts to make changes with no disruption of client confidence. Hackers seeking to hijack DNS/IP addresses would find their task more difficult. This technique of pre-announcing changes could also apply to VMACs/MAC, SSL certs, etc., and be applied in the LAN. The monitoring service/repository of changes could operate as a premium service requiring a subscription, as may other features described herein. A method for pre-announcing such pending changes may include receiving a notification at the monitoring service of a pending change to IP addresses associated with a hostname, and if the IP address received from the DNS server matches an IP address in the pending changes, then allowing access via the smart router to the IP address received from the DNS server.

Additional Features

Figure 40:
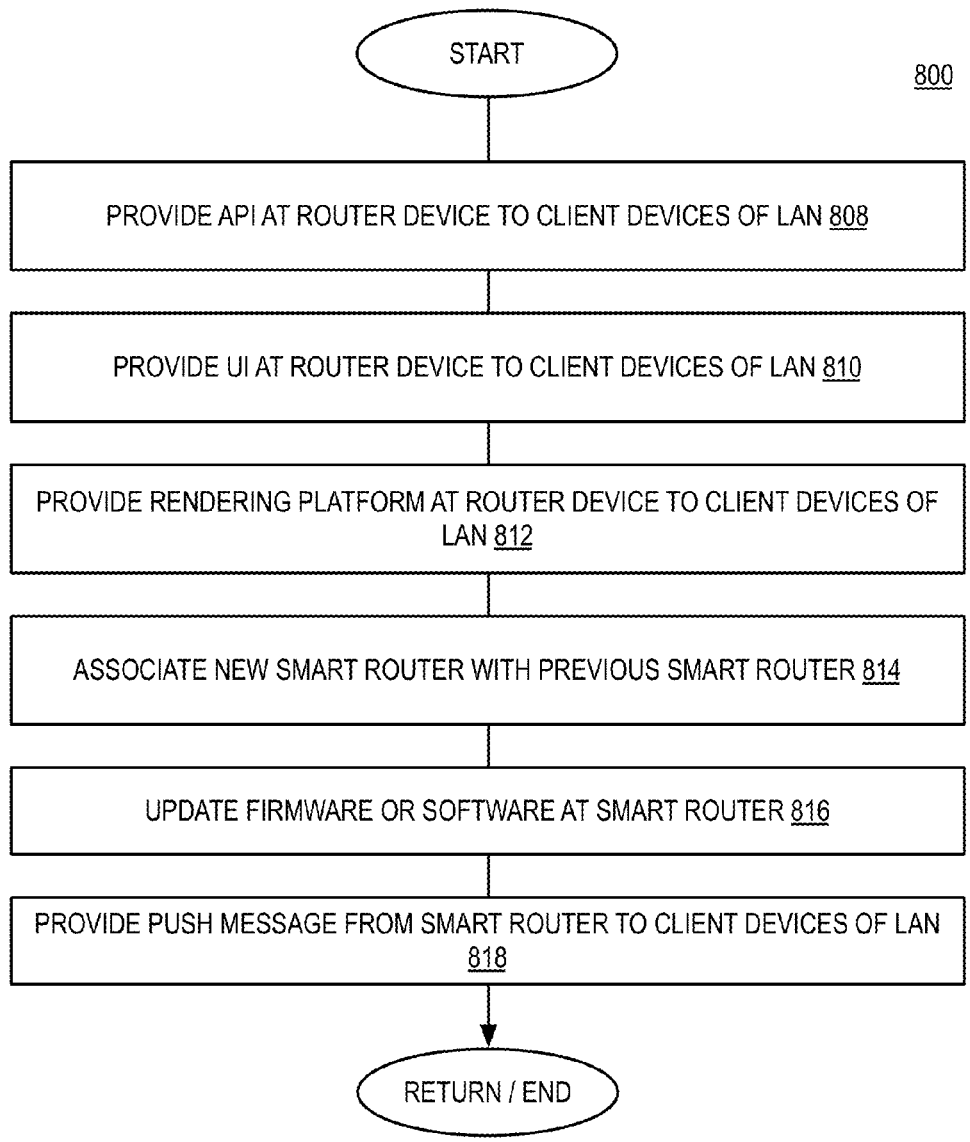
FIG. 40 is a flowchart of a various other features of the smart router, including providing APIs, UIs, rendering platform, updating tool, and push message functionality at the smart router.

FIG. 40 depicts several additional features of the smart router described herein.

At 808, the smart router may improve user experience at the client devices of the LAN through smart router based services. The smart router itself may be used to implement services that each of the multiple client devices access, via APIs, as shown in FIG. 28 above. For example, a file storage API could be made available at the smart router that enables users of clients of the LAN store files on the smart router with auto cloud (e.g., WAN-side) back up, and instant access at any connected wireless device (with sufficient privileges). It will be appreciated that this may be an HTTP level API on the smart router, which in turn generates appropriate SMB/CFS or other messages in order to read, write, and modify files on a centralized cloud based file system.

As another example, a music service could be implemented on the smart router that stores a client user's media collection on the smart router's mass storage, and communicates with a cloud based service of the WAN for new media offerings. Various client devices connected wirelessly could be streamed the media from the smart router based service. Various other proxy services typically located on the WAN-side of the smart router could be moved into the smart router, including email, calendar, etc., each of which could link to a true "cloud" service of the WAN and periodically download email, calendar, etc., then push it to each registered client device of the LAN.

Figure 41:
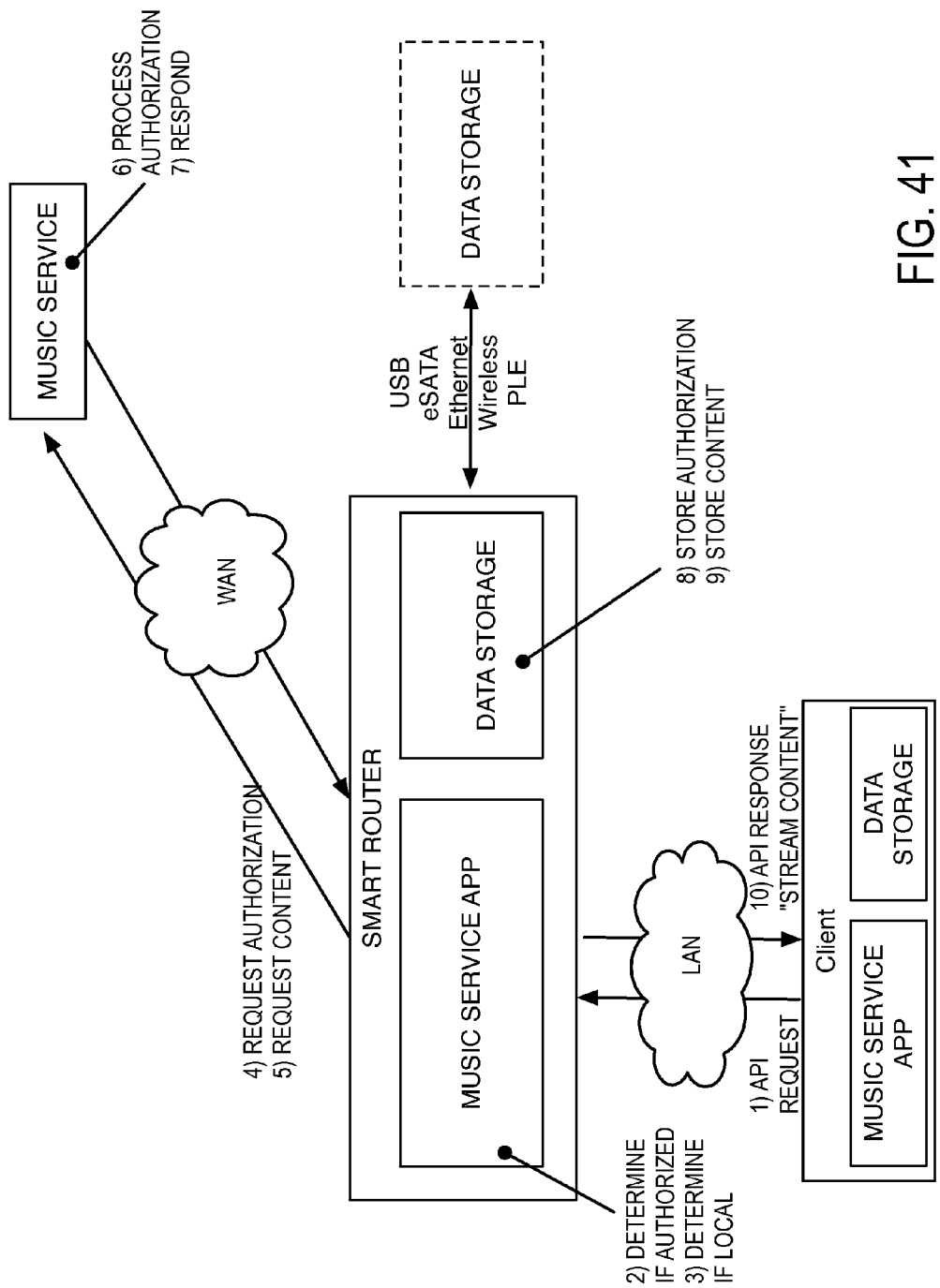
FIG. 41 is a schematic view of a use case scenario in which the smart router is used to proxy requests to a music service from a client device, and store user credentials and content on the smart router for access on multiple requesting clients.

In FIG. 41, a music service application client is executed on the smart router. Authentication requests for playing content are sent to a web based service by the smart router across the WAN. When a user requests an item of content not available in the client device and/or smart router data stores, the music service client at the smart router may communicate with the peer client devices (in a p2p model) and/or with the central web based service to locate and download the desired content. The content may be stored on the smart router and streamed to requesting client devices across the wireless LAN.

At 810, the smart router may provide improved usability through a multi-channel smart router user interface. The smart router may offer an improved user interface as compared to previous routers. Accessing previous router interfaces is often difficult for the client user, since users often forget the login address, username, and/or password. Previous router interfaces are very seldom used at all, typically at set up and after a failure of some sort, and provide only rudimentary features. The smart router may overcome these issues by offering user interface components one or more of the following three "channels".

A. Channel 1: HTTP Stream

The smart router, since it may provide DNS and data rewriting or proxy server functionality between the application and/or browser communication streams, can display a user interface directly to the user through HTML of a .js inserted into the HTTP request/response stream. A pop up java script window may prompt the user, e.g., "Smart router sees you access SocialNetwork1Website/NewspaperWebsite/etc. daily, shall I prefetch content while your devices are offline for quick access?" The smart router may instead automatically set user preferences, if the user has opted in to an automatic preference generation feature. According to this feature the smart router programmatically observes user browsing behavior and sets content preferences for content to prefetch.

With prefetching of content that has been user authorized through a pop-up interface interposed in the HTTP stream, the user may attempt to access the website from which the content was prefetched in order to enjoy the fast downloads. Similarly, if the smart router detects that user settings need updating, it may intercept or rewrite the HTTP stream, and display an option to the user to view a smart router settings GUI. New client devices may also be detected and a registration GUI may be presented via the HTTP stream. The stream may also be hijacked to present content notifications. For example, the smart router may present a pop up to client devices that says: "I see you are accessing SocialNetwork1, as of 3 mins ago, there was nothing new for you on that website but I have downloaded 5 SocialNetwork2 messages for you from your girlfriend at [link] and a new Magazine edition for you to read at [link]; or you can proceed to SocialNetwork1 [link]." For example, the smart router may perform checking tasks on behalf of client users.

B. Channel 2

For users of applications on a client device, the smart router may offer an API for prefetching of content on behalf of the application programs. The application program on the client device, upon detecting that the smart router is in the request response stream (e.g., which could occur via detection of a flag or tag set by the smart router), may be programmed to send an API request to the smart router API, that causes the smart router to prefetch content from content servers on the Internet. Use of the smart router by the application of the client device may be an "opt in" option presented to the user when the smart router is detected by the client device.

Figure 42:
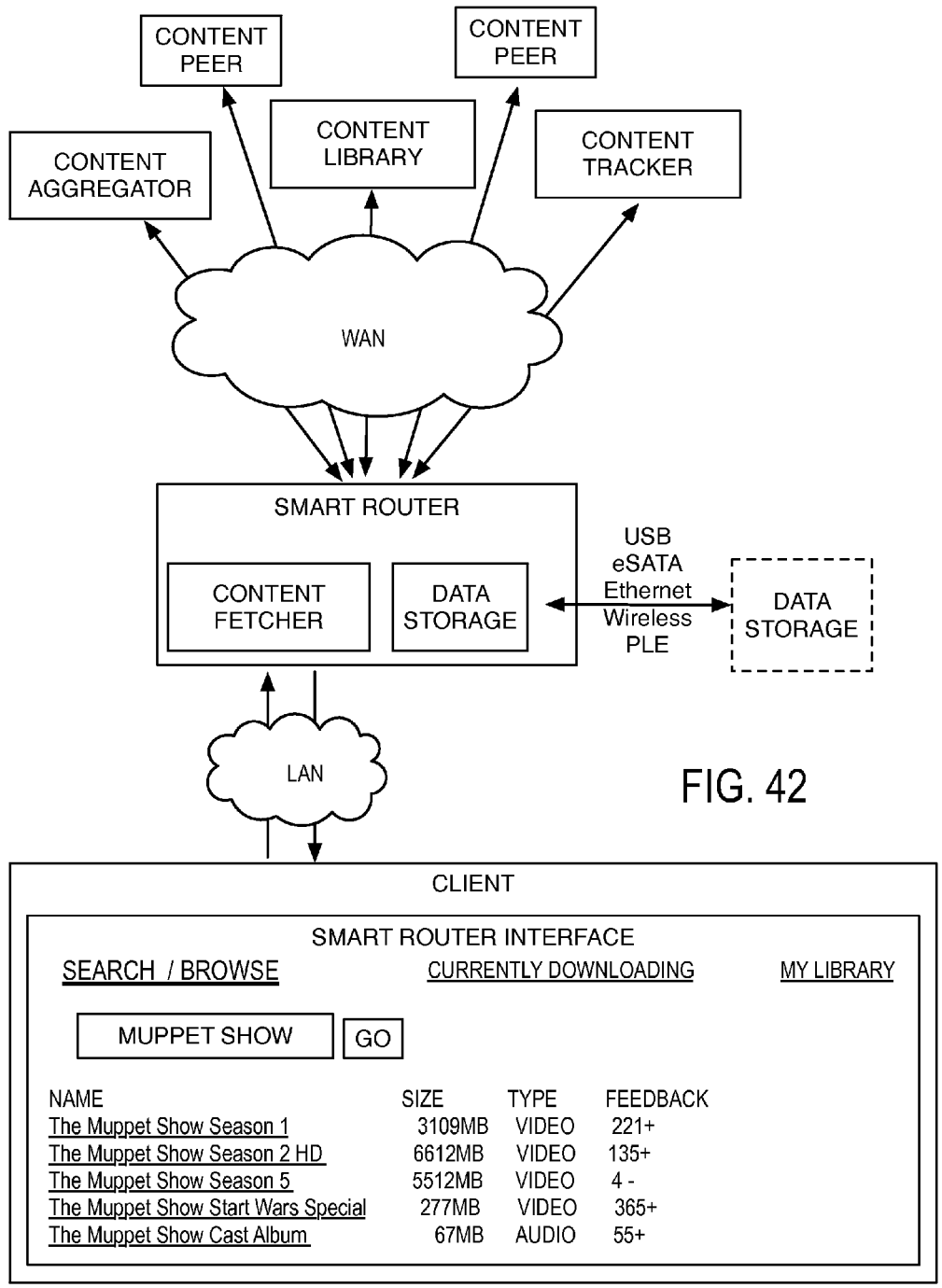
FIG. 42 is a schematic view of a use case scenario in which the smart router is configured to download media from different sources and perform consolidated media search and retrieval.

In the example of FIG. 42, the user on the client device has initiated a content search on the router. The router searches various WAN based services for the content, and displays a page to the client in a unified graphical user interface with the search results pulled from these various locations. The user may select an item of content to play, and the router will access the content from the service, by downloading a local copy or initiating streaming to the local device. In this way consolidated media search and retrieval is performed by the smart router, which is plugged into a wall socket and has capable processor resources, rather than by the client devices themselves, many of which are battery powered and have limited processing power. Further, media may be stored on the smart router for later retrieval by the same or another client.

C. Channel 3: Client Service on Each Registered Client Device

For users who wish to register a large number of websites and/or applications with the prefetching services of the smart router, the smart router may offer a client application, which may be installed and run as a service on each client device. The client application may run in the background, and when content is ready on the smart router for a website or application, an alert may be presented to the user via a GUI on the client device. In this manner, alerts may be pushed to the client device to be presented to the client user. Hence, the user need not wait until he/she next accesses a website or application in order to find that new content is waiting at the smart router. A settings GUI may also be accessible via the client device. New client devices may also be detected by the smart router upon establishment of a Wi-Fi link or other communications link, and a push notification may be sent to the client device by the smart router, for example by an SMS message or other suitable message, and a link in the message may point to a registration GUI.

At 812, usability may be improved by the smart router providing a consistent rendering platform for client devices. The smart router may use or otherwise support the latest version of webkit to render web pages, and may send rendered content (or screen) to clients of the LAN that have older browsers. The smart router as a computer device may use data virtual network computing (VNC) and/or remote desktop protocol (RDP). The smart router may enable some standardization among different current browsers by providing a consistent rendering platform. The smart router may be configured to send HD video output to dumb terminals such as TVs, projectors, or displays that don't have their own rendering engines via the smart router's HDMI port or other suitable interface. Software programs could run on the smart router, but may be displayed on the TV, projector, or display.

At 814, a new smart router or repeater node may be associated with a previously deployed smart router through wireless near-field communications (e.g., Bluetooth, Wi-Fi, etc.) with a client device. As one example, after a new smart router may be powered up for the first time, the user may tap the new smart router with a mobile client device to effect device pairing. Other methods of establishing a near field connection between the client device and the new smart router may be utilized. After near-field communications are established between the client device and the new smart router, the client device may present the user (e.g., via a graphical display) with an option to be a registered client device for that smart router. The new smart router may transmit information such as the smart router ID to the paired client device via the wireless near-field communications. The client device may then transmit the information received from the new smart router to a previously deployed smart router to set the configuration information on the new smart router. Alternatively, the client device itself may set the configuration information on the new smart router without requiring communications with the previously deployed smart router.

At 816, the firmware or software may be updated at the smart router upon the smart router being powered up and/or plugged-in to the WAN for the first time, and have it first communicate with a cloud service for configuration based on your account info. As one example, the smart router may access a cloud service over the WAN (e.g., with two factor authentication) to add/remove trusted client software, and/or modify global configuration values at anytime. This approach may increase the ease of use of the smart router, and enable users to configure settings via a client device of the LAN at a cloud based account supported by an associated network service of the WAN. However, this approach could also increase ease of use in situations in which the smart router is sold by an entity that is linked to other cloud services that users subscribe to and/or to user's broadband access provider. APPLE®, for example, may have ITUNES® running on the smart router, and may auto enable updating. As another example, NETFLIX® may offer smart router client software that operates at the smart router, and updates the smart router from a network services over the WAN during select periods (e.g., at night when users are sleeping or other suitable time).

At 818, the smart router may send a push message to awaken a client device. A telephone/voice communications application of a client device is an example of an application that would be preferable to have running all the time, were it not for power limitations of a mobile device. To reduce power consumption at a mobile device, the application may operate in a sleep mode or may be shut-down during select periods. In this context, the smart router may be configured to "push awaken" a mobile client device connected to the smart router via the LAN. For example, an IP phone client software may operate on the smart router logged in as each of a plurality of client users of the LAN. Because the smart router may draw power from a wired connection to a wall outlet, the smart router may continue to operate the application without using a sleep mode. If a call is received, the smart router may be configured to route the call to the appropriate mobile client device for the appropriate user, push awaken the phone (e.g., application) of the mobile client device, and cause it to ring.

The above example may be accomplished without changing the OS of the client device to allow push notifications by having a "forward calls over PSTN" option at the IP phone client running at the smart router. For each registered user of the IP phone client, the user could enter the telephone number of a mobile device, and then instruct the IP phone client at the smart router call over the PSTN the registered telephone number, and connect the IP phone call to the PSTN call. Some disadvantages with this approach may include the delay and the cost of a local call in some areas, or the cost of the call if the mobile device is actually in a foreign network (although the latter could be avoided if the smart router only forwards calls for mobile devices that are currently connected to the smart router). In some implementations, the smart router may send a push notification to the client device when the router has key data.

It should be understood that the embodiments herein are illustrative and not restrictive, since the scope of the invention is defined by the appended claims rather than by the description preceding them. All changes that fall within metes and bounds of the claims or equivalence of such metes and bounds thereof are therefore intended to be embraced by the claims.

The invention claimed is:

1. A computer networking method, comprising:
   at a router device configured to connect via a LAN to a client computing device, and function as a gateway for communications from the client computing device to one or more servers over a WAN,
   for traffic passing through the router, virtualizing address space by associating IP addresses of client computing devices on the LAN, including the client computing device, with virtual LAN-side network addresses and/or servers on the WAN, including the one or more servers, with virtual WAN-side network addresses, such that each request made to the servers on the WAN appears to the servers to originate from one of the LAN-side virtual network addresses, and/or such that each response received from the servers appears to the router device to originate from one of the WAN-side virtual network addresses, and at the router device, programmatically monitoring communications between client computing devices of the LAN and services of the WAN for botnets and viruses by the router device inserting user interface tracking information into a communication sent to the client computing device to enable the router device to identify user interface state at the client computing device, the user interface state including user input and/or selector position at the client computing device, and determining whether viruses operating at the client computing device are initiating communications with the WAN if communications are received from the client computing device at the router device that are unrelated to the identified user interface state.

2. The computer networking method of claim 1, wherein the virtualized address space is a simulated virtualized address space, achieved by the router device randomizing a selection of outbound gateways to the WAN used to access network resources of the WAN.

3. The computing networking method of claim 2, wherein the outbound gateways include local peer smart routers, remote peer smart routers, or super peer devices.

4. The computer networking method of claim 1, further comprising:
terminating connections at the router device, to enable deep packet inspection of traffic between the client computing devices and the servers.

5. The computer networking method of claim 4, further comprising:
filtering out cookies set by services of the WAN before arriving at the client computing devices of the LAN.

6. The computer networking method of claim 4, further comprising
changing user-agent information in a request sent from the client computing device at the router device prior to forwarding the request to a server over the WAN.

7. The computer networking method of claim 6, wherein the user-agent information is selected from the group comprising application name and version, browser type and version, operation system information, and extensions installed with a browser and an operating system.

8. The computer networking method of claim 6, wherein changing the user-agent information is accomplished at least in part by normalizing, altering, or randomizing browser or application program identity to inhibit detection by the servers of the WAN.

9. The computer networking method of claim 1, further comprising:
at the router device, blocking predetermined applications operating on the client computing device from communicating with the services of the WAN that are associated with those applications.

10. The computer networking method of claim 1, wherein programmatically monitoring communications is further accomplished by determining whether a communication received at the router device contains user agent information identifying the communication as originating from an application program or browser that is not currently operating at the client computing device.

11. A computer networking method, comprising:
at a router device configured to connect via a LAN to a client computing device, and function as a gateway for communications from the client computing device to one or more servers over a WAN, for traffic passing through the router, virtualizing address space by associating IP addresses of client computing devices on the LAN, including the client computing device, with virtual LAN-side network addresses and/or servers on the WAN, including the one or more servers, with virtual WAN-side network addresses, such that each request made to the servers on the WAN appears to the servers to originate from one of the LAN-side virtual network addresses, and/or such that each response received from the servers appears to the router device to originate from one of the WAN-side virtual network addresses, and at the router device, programmatically monitoring communications between client computing devices of the LAN and services of the WAN for botnets and viruses by the router device determining whether a communication received at the router device contains user agent information identifying the communication as originating from an application program or browser that is not currently operating at the client computing device.

12. The computer networking method of claim 11, wherein the virtualized address space is a simulated virtualized address space, achieved by the router device randomizing a selection of outbound gateways to the WAN used to access network resources of the WAN.

13. The computing networking method of claim 12, wherein the outbound gateways include local peer smart routers, remote peer smart routers, or super peer devices.

14. The computer networking method of claim 11, further comprising:
terminating connections at the router device, to enable deep packet inspection of traffic between the client computing devices and the servers.

15. The computer networking method of claim 14, further comprising:
filtering out cookies set by the services of the WAN before arriving at the client computing devices of the LAN.

16. The computer networking method of claim 14, further comprising
changing user-agent information in a request sent from the client computing device at the router device prior to forwarding the request to a server over the WAN.

17. The computer networking method of claim 16, wherein the user-agent information is selected from the group comprising application name and version, browser type and version, operation system information, and extensions installed with a browser and an operating system.

18. The computer networking method of claim 16, wherein changing the user-agent information is accomplished at least in part by normalizing, altering, or randomizing browser or application program identity to inhibit detection by the servers of the WAN.

* * * * *